(12) United States Patent
Pang

(10) Patent No.: US 12,557,193 B2
(45) Date of Patent: Feb. 17, 2026

(54) DISPLAY DEVICE AND DISPLAY CONTROL METHOD

(71) Applicant: HISENSE VISUAL TECHNOLOGY CO., LTD., Qingdao (CN)

(72) Inventor: Zhenhua Pang, Qingdao (CN)

(73) Assignee: HISENSE VISUAL TECHNOLOGY CO., LTD., Qingdao (CN)

( * ) Notice: Subject to any disclaimer, the term of this patent is extended or adjusted under 35 U.S.C. 154(b) by 21 days.

(21) Appl. No.: 18/737,168

(22) Filed: Jun. 7, 2024

(65) Prior Publication Data

US 2024/0324082 A1    Sep. 26, 2024

Related U.S. Application Data

(63) Continuation of application No. PCT/CN2022/114035, filed on Aug. 22, 2022.

(30) Foreign Application Priority Data

Dec. 14, 2021  (CN) .......................... 202111528320.0
Apr. 20, 2022  (CN) .......................... 202210415138.2
Apr. 21, 2022  (CN) .......................... 202210421396.1

(51) Int. Cl.
*H05B 45/34*    (2020.01)
*H05B 45/375*   (2020.01)
(Continued)

(52) U.S. Cl.
CPC ........... *H05B 45/375* (2020.01); *H05B 45/34* (2020.01); *H05B 45/38* (2020.01); *H05B 45/385* (2020.01)

(58) Field of Classification Search
CPC ........ H05B 45/10; H05B 45/14; H05B 45/30; H05B 45/34; H05B 45/36; H05B 45/37;
(Continued)

(56) References Cited

U.S. PATENT DOCUMENTS 8,183,795 B2 * 5/2012 Huang ................ H05B 45/382
                                                    315/300
2004/0145584 A1   7/2004 Lee et al.
(Continued)

FOREIGN PATENT DOCUMENTS

CN    102750913 A    10/2012
CN    102833912 A    12/2012
(Continued)

OTHER PUBLICATIONS

The European Patent Office (EPO) The Partial Supplementary European Search Report for Application No. 22905927.4 Mar. 7, 2025 16 Pages.
(Continued)

*Primary Examiner* — Tung X Le
(74) *Attorney, Agent, or Firm* — ANOVA LAW GROUP, PLLC

(57) ABSTRACT

A display device and a display control method. A power adjustment module is provided in a power supply circuit of a display device. The power adjustment module transmits energy between voltages outputted by a power supply circuit respectively to a main board and an LED light strip, such that the voltages provided by the power supply circuit to the main board and the LED light strip are within respective preset voltage ranges, and no large adjustments to voltage values are required. Therefore, the working efficiency of the entire power supply circuit can be improved, and the costs of the power supply circuit and the display device are reduced.

19 Claims, 36 Drawing Sheets

(51) Int. Cl.
*H05B 45/38* (2020.01)
*H05B 45/385* (2020.01)

(58) Field of Classification Search
CPC ...... H05B 45/39; H05B 45/46; H05B 45/305; H05B 45/345; H05B 45/355; H05B 45/382; H05B 45/385; G09G 3/32; G09G 3/34
See application file for complete search history.

(56) References Cited

U.S. PATENT DOCUMENTS

| | | | | |
|---|---|---|---|---|
| 2007/0146565 | A1* | 6/2007 | Jeon | H05B 45/20 |
| | | | | 349/42 |
| 2010/0052554 | A1* | 3/2010 | Zanforlin | H05B 45/382 |
| | | | | 315/210 |
| 2012/0146520 | A1* | 6/2012 | Liu | G09G 3/3406 |
| | | | | 315/192 |
| 2012/0187857 | A1* | 7/2012 | Ulmann | H05B 45/3725 |
| | | | | 315/224 |
| 2013/0285565 | A1* | 10/2013 | Feng | H02M 3/335 |
| | | | | 323/267 |
| 2014/0210700 | A1* | 7/2014 | Won | G09G 3/3677 |
| | | | | 345/102 |
| 2014/0247295 | A1* | 9/2014 | Hussain | H05B 45/46 |
| | | | | 315/192 |

FOREIGN PATENT DOCUMENTS

| | | |
|---|---|---|
| CN | 103368424 A | 10/2013 |
| CN | 111901932 A | 11/2020 |
| CN | 212967037 U | 4/2021 |
| CN | 112785971 A | 5/2021 |
| CN | 112837646 A | 5/2021 |
| CN | 113163538 A | 7/2021 |
| CN | 113436571 A | 9/2021 |
| CN | 113763868 A | 12/2021 |
| WO | 2021185150 A1 | 9/2021 |

OTHER PUBLICATIONS

Anonymous: "Click here for production status of specific part numbers. MAX38889 2.5V to 5.5V, 3A Reversible Buck/Boost Regulator for Backup Applications", Maxim Integrated, Dec. 31, 2021 (Dec. 31, 2021), pp. 1-17.
The World Intellectual Property Organization (WIPO) International Search Report for PCT/CN2022/114035 Nov. 8, 2022 6 Pages (including translation).

* cited by examiner

DISPLAY DEVICE AND DISPLAY CONTROL METHOD

CROSS-REFERENCE TO RELATED APPLICATIONS

The application is a continuation application of International Application No. PCT/CN2022/114035 filed Aug. 22, 2022, which claims priority to Chinese Patent Application No. 202111528320.0, filed on Dec. 14, 2021, in the China National Intellectual Property Administration, Chinese Patent Application No. 202210415138.2, filed on Apr. 20, 2022, in the China National Intellectual Property Administration, and Chinese Patent Application No. 202210421396.1, filed on Apr. 21, 2022, in the China National Intellectual Property Administration. The entire contents of the above applications are incorporated herein by reference.

TECHNICAL FIELD

The disclosure relates to the technical field of display apparatuses, and in particular to a display apparatus and a display control method.

BACKGROUND

With the development of electronic technology, the integration level of electronic apparatus including display apparatus such as televisions is getting higher and higher, which also places higher and higher requirements on the power supply of the display apparatus. At present, after most display apparatuses receive AC power from the mains supply through a plug, a special power supply circuit is configured to perform AC-DC conversion and voltage transformation to supply power to the loads in the display apparatuses.

In the related art, the power supply circuit of the display apparatus at least includes the following modules: a rectifier bridge, a Power Factor Correction (PFC) module, and a resonant converter (LLC) module. The power supply circuit supplies power to loads such as the main board and the LED light strip in the display apparatus via different secondary windings in the LLC module. In order to adjust the voltage provided to the LED light strip, some display apparatuses also provide a voltage adjustment module between the LLC module and the LED light strip to adjust the voltage provided by the LLC module to the LED light strip.

SUMMARY

Embodiments of the disclosure provide a display apparatus including: a circuit board; a display panel configured for image display; an LED light strip configured to light up the display panel; a power supply circuit configured to supply power to a load on the circuit board and the LED light strip and including: a first power supply branch configured to output a first voltage to the circuit board and a second power supply branch configured to output a second voltage to the LED light strip; and a power adjustment module including a first end connected with the first power supply branch, and a second end connected with the second power supply branch. The power adjustment module is configured to control energy transfer between the first power supply branch and the second power supply branch.

Embodiments of the disclosure provide a display apparatus including: a circuit board; a display panel configured for image display; an LED light strip configured to light up the display panel; a power supply circuit configured to supply power to a load on the circuit board and the LED light strip and including: a first power supply branch configured to output a first voltage to the circuit board, a second power supply branch configured to output a second voltage, and a third power supply branch configured to output a third voltage to the circuit board and a voltage adjustment module; the voltage adjustment module configured to, after converting the third voltage to a fourth voltage, output a sum of the third voltage and the fourth voltage to the LED light strip; and an output detection module including a first end connected with the voltage adjustment module and a second end connected with a voltage conversion module in the power supply circuit. The output detection module is configured to obtain a power parameter output from the voltage adjustment module, and send a feedback signal to the voltage conversion module according to the power parameter.

DETAILED DESCRIPTION

The content of the embodiments of the disclosure will be clearly and completely described below in conjunction with the drawings in the embodiments of the disclosure. Obviously, the described embodiments are only some of the embodiments of the disclosure, not all of them. Based on the embodiments in this disclosure, all other embodiments obtained by the ordinary skill in the art without making creative efforts belong to the scope of protection of this disclosure.

Firstly, the application scenarios and existing problems thereof will be described below with reference to the accompanying drawings. As people's demand for information continues to deepen, various types of display apparatuses emerge as the times require, such as computers, televisions, and projectors. The power supply circuit is one of the most important circuit structures in the display apparatus, and can provide electric energy for the display apparatus, to enable the display apparatus operating normally. Some display apparatuses are equipped with an independent power board, and a main board and the power board are respectively arranged on two different circuit boards. Some display apparatuses integrate the power board and the main board to be on one same circuit board. In some embodiments, the display apparatus is a television.

Figure 1:
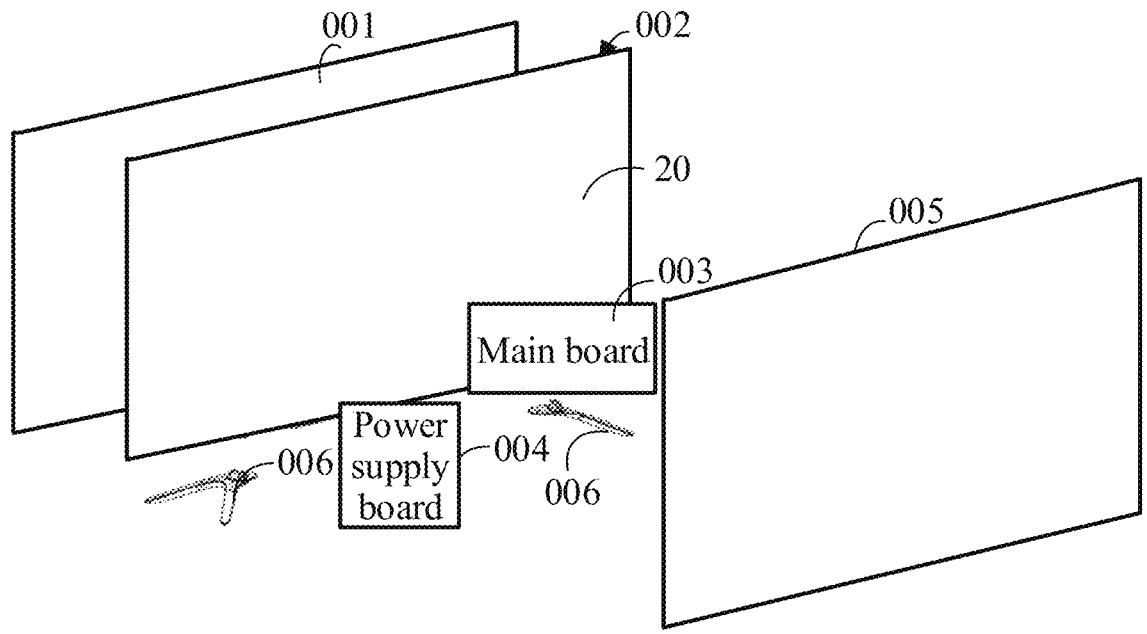
FIG. 1 is a schematic structural diagram of a display apparatus provided with an independent power board.

Taking a display apparatus with an independent power supply board as an example, the structure of the display apparatus is illustrated. As shown in FIG. 1, a schematic structural diagram of a display apparatus with an independent power supply board is shown. As shown in FIG. 1, the display apparatus includes a panel 001, a backlight component 002, a main board 003, a power board 004, a rear case 005 and a base 006. The panel 1 is configured to present images to the user. The backlight component 002 is located below the panel 1, usually includes some optical components, and is configured to supply evenly distributed light sources with sufficient brightness, so that the panel 1 can display images normally. The backlight component 002 further includes the backplane 20. The main board 003 and the power supply board 004 are arranged on the backplane 20, on which some convex hull structures are usually stamped and formed. The main board 003 and the power supply board 004 are fixed on the convex hull via screws or hooks. The rear case 005 covers the panel 1 to hide components of the display apparatus such as the backlight component 002, the main board 003 and the power board 004, so as to achieve an aesthetic effect. The base 006 is configured to support the display apparatus.

Figure 2:
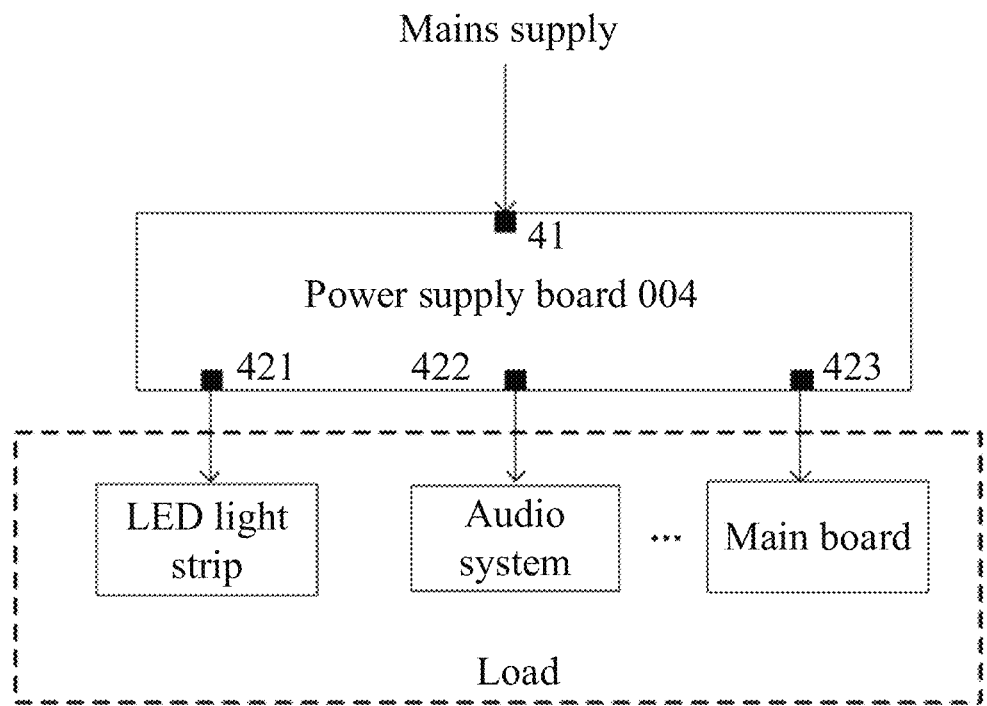
FIG. 2 is a schematic diagram illustrating a connection relationship between a power board and loads.

Further, FIG. 2 is a schematic diagram illustrating a connection relationship between the power board and loads. As shown in FIG. 2, the power board 004 includes an input end 41 and output ends 42 (the first output end 421, the second output end 422 and the third output end 423 as shown in the figure). The input end 41 is connected with the mains supply, and the output ends 42 are connected with the loads. For example, the first output end 421 is connected with the LED light strip for lighting the display panel, and the second output end 422 is connected with the audio system, and the third output end 423 is connected with the main board. The power board 004 needs to convert the AC power of the mains supply into the DC power required by the loads. The DC power usually has different specifications, such as 18V for the audio system, 12V and 18V for the main board, and so on.

Figure 3:
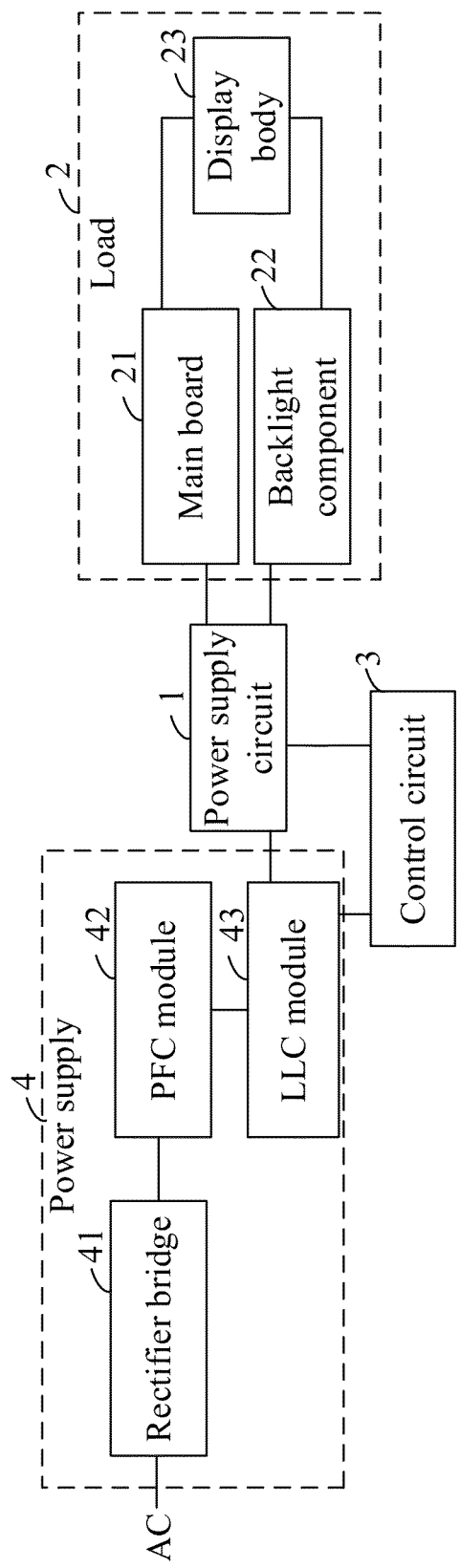
FIG. 3 is a schematic architectural diagram of a TV power supply.

Specifically, a TV is used as an example to describe the power supply of the display apparatus. FIG. 3 is a schematic diagram of the power supply of the TV. As shown in FIG. 3, the display apparatus may include: a power supply circuit 1, a load 2, a control circuit 3, and a power supply 4. The power supply 4 includes: a rectifier bridge 41, a Power Factor Correction (PFC) module 42 and a resonant converter (LLC) module 43. The LLC module 43 includes a synchronous rectification circuit. The PFC module 42 is connected with the LLC module 43. The LLC module 43 is connected with the power supply circuit 1 and the control circuit 3 respectively.

The rectifier bridge 41 is configured to rectify the input AC power, and input the full-wave signal to the PFC module 42. Before the AC power is input into the PFC module 42, an Electromagnetic Interference (EMI) filter (not shown in FIG. 3) may be connected to perform high-frequency filtering on the input AC power.

The PFC module 42 generally includes a PFC inductor, a switching power device and a PFC control chip, and mainly performs power factor correction on the input AC power, and outputs a stable DC bus voltage (such as 380V) to the LLC module 43. The PFC module 42 can effectively improve the power factor of the power supply and ensure that the voltage and current are in the same phase.

The LLC module 43 can adopt a LLC resonant conversion circuit of double MOS transistors. Usually, a synchronous rectification circuit is set in the LLC module 43. The synchronous rectification circuit mainly includes a transformer, a controller, two MOS transistors and a diode. In addition, the LLC module 43 may also include a Pulse frequency modulation (PFM) circuit, capacitors, inductors and other components. Specifically, the LLC module 43 can step down or step up the DC bus voltage input from the PFC module 42, and output a constant voltage to the load 2. Generally, the LLC module 43 can output a variety of different voltages to meet the requirements of the load 2. Alternatively, the LLC module as shown in FIG. 3 can also be replaced by a flyback module, which steps down or steps up the voltage and then outputs the voltage to the load. Alternatively, the LLC module shown in FIG. 3 may be a voltage conversion module in any other topological form such as a full bridge.

The power supply 4 may also include a flyback module (not shown in FIG. 3), which is configured to provide the PFC module 42 and the LLC module 43 with its own power supply voltage and standby power.

The control circuit 3 is connected with the power supply 4 and the power supply circuit 1 respectively, and can control the power supply circuit 1 to be turned on or off, that is, whether the electric energy output from the LLC module 43 can be supplied to the load 2 via the power supply circuit, so as to turn on or off the load. Usually, the control circuit 3 can receive a control signal from the main chip (not shown in FIG. 3), and be controlled by the main chip to control the working state of the power supply circuit 1.

The power supply circuit 1 is also connected with the LLC module and the load. When the power supply circuit 1 is conducted, the LLC module 43 can supply power to the load 2. When the power supply circuit 1 is disconnected, the LLC module 43 cannot supply power to the load 2. In fact, the power supply circuit 1 usually includes a switching element (not shown in FIG. 3), such as a MOS transistor, and the control circuit 3 controls the conduction state of the MOS transistor by controlling the voltages of the source and gate of the MOS transistor.

The load 2 includes a main board 21, a backlight component 002, a display body 23, etc. The main board 21 includes components such as a control unit, which can receive the voltage output from the LLC module 43, encode and decode the received audio and video signals, and output them to the display body 23. Optionally, the main board 21 usually needs a voltage of 12V. The backlight component 002 can receive the voltage output from the LLC module 43 to realize display on the display body 23. The display body 23 may include but not limited to a liquid crystal display.

Figure 4:
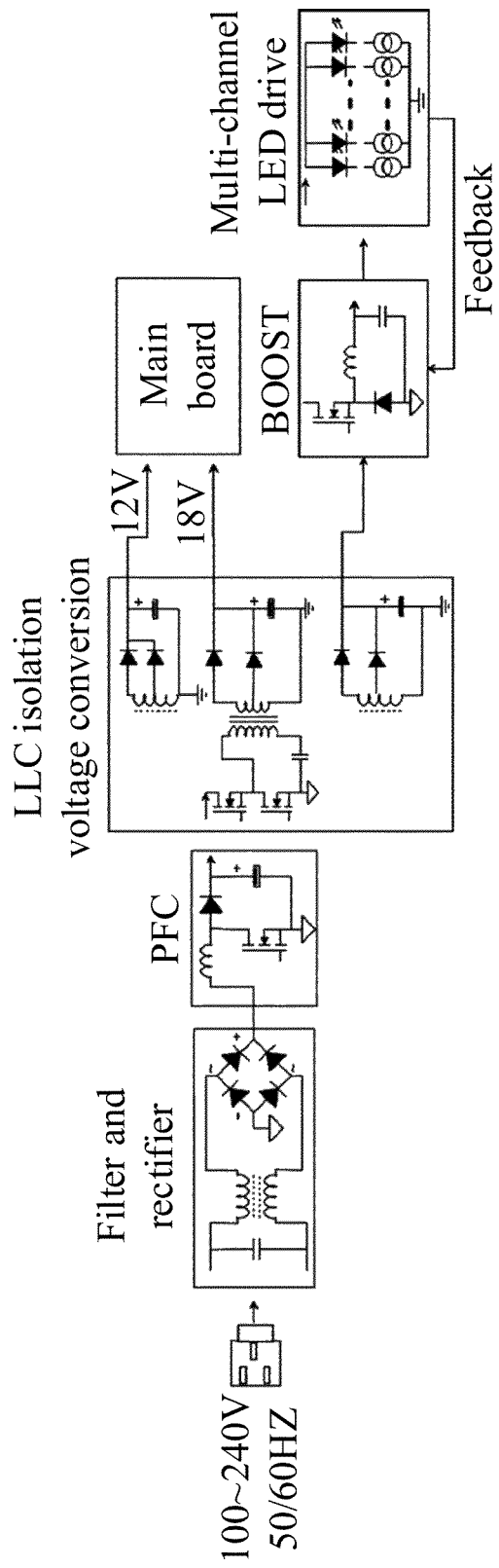
FIG. 4 is a schematic structural diagram of a power supply circuit for supplying power to a main board and a LED light strip.

More specifically, taking the display apparatus as an example of a TV, FIG. 4 shows a schematic structural diagram of a power supply circuit for supplying power to the main board and the LED light strip. The alternating current (100V-240V, 50-60 Hz) of the mains supply obtained by the power supply circuit is supplied to the main board of the display apparatus, the LED light strip as the backlight component and other loads (not shown in FIG. 4) via the filter-and-rectifier module (rectifier bridge), PFC module and LLC module in turn. The first secondary winding in the LLC module provides a voltage of 12V to the main board, the second secondary winding provides a voltage of 18V to the main board, and the third secondary winding provides voltage to the LED light strip.

Since the voltage range required by the LED light strip is related to the working environment of the multi-channel LED light strip, the hardware characteristics and the life span of the LED components, and other factors, the voltage required by the multi-channel LED light strip has a certain range of variation, and the range of variation is limited. Therefore, the secondary winding in the LLC module that supplies power to multi-channel LED bar is additionally connected with a voltage adjustment module (such as a buck circuit or a boost circuit, the boost circuit is taken as an example in FIG. 4) and a voltage driving module. The voltage adjustment module can adjust the voltage directly output from the secondary winding according to a real-time current feedback result of the multi-channel LED light strip, and then output the adjusted voltage to the voltage drive module, so that the voltage drive module controls the multi-channel LED light strip to work at the rated current according to the received voltage to prevent damage to the components due to excessive current flowing through the LED components in the multi-channel LED light strip.

Figure 5:
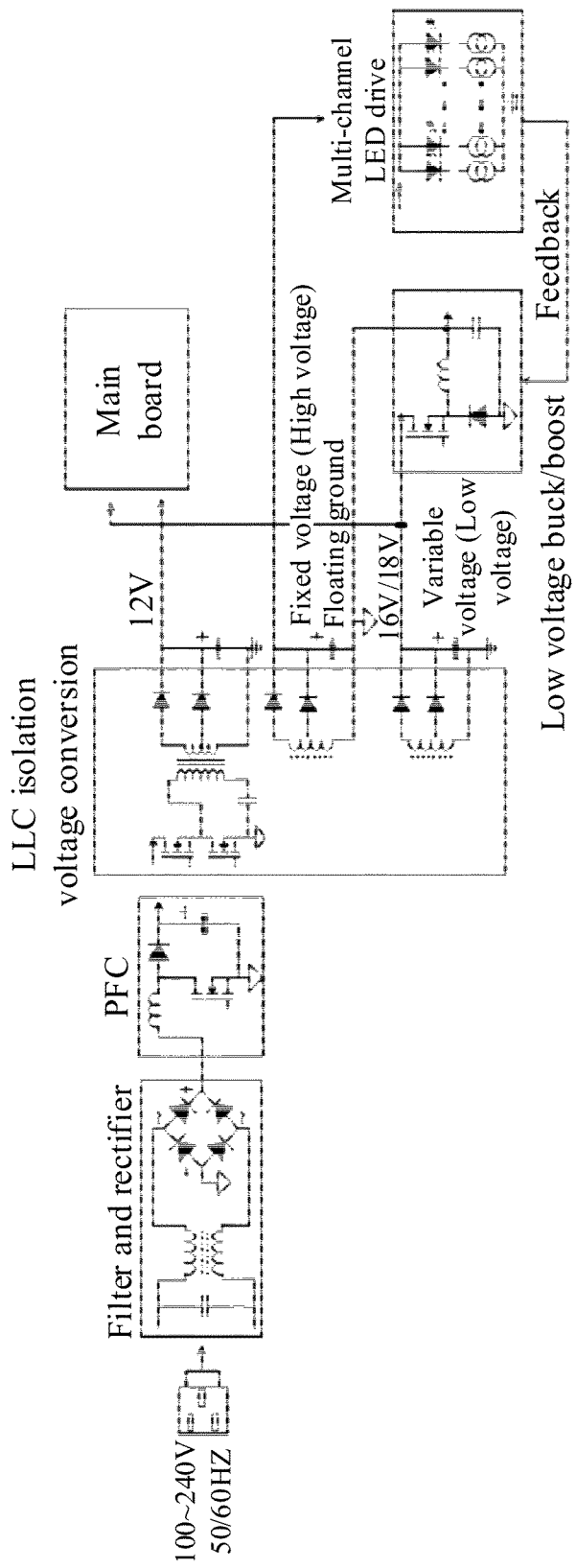
FIG. 5 is another schematic structural diagram of a power supply circuit for supplying power to a main board and a LED light strip.

FIG. 5 shows another schematic structural diagram of a power supply circuit for supplying power to the main board and the LED light strip, which is different from the power supply circuit shown in FIG. 4 in that two different LLC secondary windings in the LLC module supply power to the LED light strip by using the stepped power supply mode in this embodiment. Specifically, the power supply circuit includes three power supply branches. The first power supply branch includes the first secondary winding in the LLC module and is configured to output a first voltage of 12V to the main board. The second power supply branch includes the second secondary winding in the LLC module, and is configured to output the second voltage as a fixed voltage. The third power supply branch includes the third secondary winding in the LLC module, and is configured to output a third voltage of 16V/18V. Subsequently, after the voltage adjustment module (low voltage buck/boost) converts the third voltage into the fourth voltage, the sum of the third voltage and the fourth voltage is provided to the LED light strip. In the process of supplying power to the LED light strip, since two different voltages are output from two different secondary windings flexibly, the voltage adjustment module only needs to adjust the voltage output from the secondary winding with a smaller voltage, thereby reducing the requirements for withstand voltage values of components such as switch transistors and capacitors in the voltage adjustment module, thereby reducing an area of the PCB board where the power supply circuit is located, and finally reducing the cost of the power supply circuit.

However, the circuit structure of the above-mentioned power supply circuit shown in FIG. 4 is relatively complex, the power supply efficiency is low, and the cost is relatively high, so the circuit structure shown in FIG. 5 can be configured to reduce the structural complexity of the power supply circuit. However, in the power supply circuit shown as shown in FIG. 5, the LLC module outputs voltages of different voltage values through the same group of transformers, so that when the power supply circuit realizes stepped power supply, and the output of the voltage adjustment module is larger, the workload of the voltage adjustment module is larger, so that the output voltage of the voltage adjustment module cannot be set to an ideal value, reducing the working efficiency of the entire power supply circuit.

Assume that the voltage of 12V output from the secondary winding of the transformer of the LLC module is realized through two-turns winding, and in this case, one turn of winding corresponds to a voltage of 6V. When the working voltage required by the LED light strip is 36V, in order to prevent the transformer from being unable to adjust the output voltage when the output voltage is too large, the secondary winding of the transformer can output a fixed voltage of 30V through a five-turns winding instead of directly setting to output a fixed voltage of 36V. In this case, the voltage adjustment module needs to output a floating voltage of 6V, and then provides the LED light strip with a fixed voltage of 30V superimposed with the floating voltage of 6V. The voltage of 6V is relatively large compared with an available output voltage of the voltage adjustment module, so that the output voltage of the voltage adjustment module cannot be set to an ideal value, which reduces the working efficiency of the entire power supply circuit.

Therefore, the disclosure further provides a display apparatus. A power adjustment module is provided in the power supply circuit of the display apparatus. The power adjustment module transfers energy between the voltages input to the main board and the LED light strip respectively from the power supply circuit in such a way that the voltages provided to the main board and the LED light strip by the power supply circuit are respectively within their respective preset voltage ranges, so that there is no need to adjust a voltage value greatly, which can improve the working efficiency of the entire power supply circuit and reduce the cost of the power supply circuit and the display apparatus.

Figure 6:
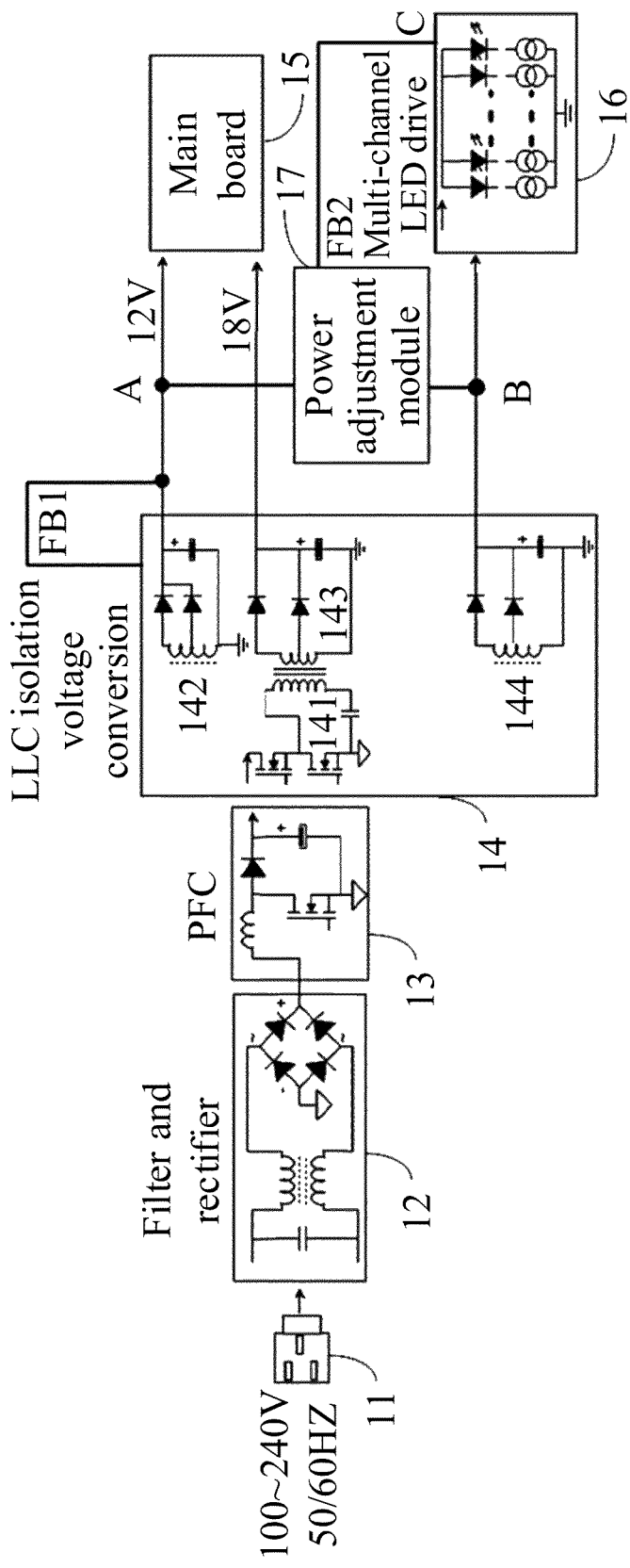
FIG. 6 is a schematic structural diagram of a display apparatus according to some embodiments.

FIG. 6 is a schematic structural diagram of a display apparatus according to some embodiments of the disclosure. The display apparatus shown in FIG. 6 includes: a circuit board, a display panel (not shown in FIG. 6), LED light strip 16 and a power supply circuit. Modules and circuits such as the processor of the display apparatus can be arranged on the circuit board, and the image content of the display apparatus is provided by the processor. The display panel is configured to display the image content. The LED light strip 16 is configured to light the display panel. The power supply circuit is configured to supply power to loads in the display apparatus. The load includes the display panel, the LED light strip 16 and the load on the circuit board, etc.

In some embodiments, as shown in FIG. 6, the display apparatus includes an independent power supply board, that is, the display apparatus includes a power supply board and a main board. The power supply board includes a power supply circuit, and the main board includes loads such as a processor. In this case, the circuit board is the main board 15 in FIG. 6, the power supply circuit on the power board can supply power to the main board 15 and the LED light strip 16. For example, the power supply circuit can provide two voltages of 12V and 18V to the main board 15, and provide the rated voltage such as 35V to the LED light strip 16. In some other embodiments, the main board and the power supply board in the display apparatus can be set on the same circuit board, so that the circuit board includes loads such as power supply circuits and processors simultaneously. The power supply circuit can supply power through the circuit board on which the power supply circuit is located to other loads such as the processor on the circuit board, and can also provide voltages such as 12V and 18V to other loads on the circuit board.

In some embodiments, the power supply circuit shown in FIG. 6 specifically includes: a power supply 11, a filter-and-rectifier module 12, a PFC module 13, and a voltage conversion module. In this embodiment of the disclosure, the voltage conversion module is an LLC module 14 as an example. The voltage conversion module can be a module of topologies such as flyback and full bridge. After the LLC module 14 receives the direct current voltage sent from the PFC module 13, the direct current is first converted into alternating current, and then passes through the primary winding 141 of the transformer, and the different secondary windings of the transformer output different voltages according to the voltage of the primary winding 141 respectively to supply power for subsequent loads. For example, the secondary winding 142 provides a voltage of 12V to the main board 15 according to the voltage of the primary winding 141, the secondary winding 143 provides a voltage of 18V to the main board 15 according to the voltage of the primary winding 141, and the secondary winding 144 provides a voltage of 35V to the LED light strip 16 according to the voltage of the primary winding 141, and the like. In the embodiment of the disclosure, the power supply 11, the filter-and-rectifier module 12, PFC module 13, and the primary winding 141 and the secondary winding 142 of the LLC module 14 in the power supply circuit are indicated as the first power supply branch, and the voltage output from the first power supply branch to the main board is indicated as the first voltage, and the power supply 11, the filter-and-rectifier module 12, the PFC module 13, and the primary winding 141 and the secondary winding 144 of the LLC module 14 in the power supply circuit are indicated as the second power supply branch, and the voltage output from the second power supply branch to the LED light strip is indicated as the second voltage.

In particular, in the embodiments of the disclosure, the power supply circuit further includes: a power adjustment module 17. As shown in FIG. 6, a first end of the power adjustment module 17 is connected with the first power supply branch at a node A, and the second end is connected with the second power supply branch at a node B. Since the power adjustment module 17 is arranged between the first power supply branch and the second power supply branch, therefore, the power adjustment module 17 can be configured to control the energy transfer between the first power supply branch and the second power supply branch, so as to realize the dynamic balance between the energy output from the two power supply branches. In this way, the second voltage output from the second power supply branch to the LED light strip can be changed so that it is stable within the rated voltage range required by the LED light strip.

Figure 7:
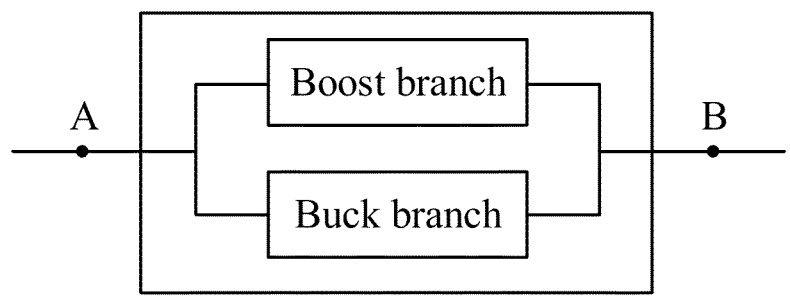
FIG. 7 is a schematic structural diagram of a power adjustment module according to some embodiments.

FIG. 7 is a schematic structural diagram of a power adjustment module according to some embodiments of the disclosure. FIG. 7 shows a schematic diagram illustrating implementation logics of a power adjustment module. The power adjustment module 17 specifically includes a boost branch and a buck branch, and is a circuit that can transfer energy in both directions. The boost branch is configured to step up the voltage at the node A at the first end of the power adjustment module 17 and output the voltage via the node B of the second end of the power adjustment module 17. A specific implementation of the boost branch may be a boost circuit or the like. The buck branch is configured to step down the voltage at the node B at the second end of the power adjustment module 17 and output the voltage via the node A of the first end of the power adjustment module 17. A specific implementation of the buck branch may be a buck circuit or the like.

In some embodiments, the power adjustment module as shown in FIG. 7 further includes a controller, which may be a processing unit such as a CPU, MCU, or SoC, and is configured to, according to whether the second voltage under which the LED light strip works satisfies a preset condition, control the power adjustment module 17 to work in a buck branch mode, control the second power supply branch to output energy to the first power supply branch, to reduce the second voltage provided to the LED light strip; or control the power adjustment module 17 to work in a boost branch mode, and control the first power supply branch to output energy to the second power supply branch, so as to step up the second voltage provided to the LED light strip.

When designing the power supply circuit shown in FIG. 7, it can be designed that the first voltage output from the first power supply branch to the main board and the voltage output from the second power supply branch to the LED light strip are both within their respective rated operating voltage ranges, for example, the first power supply branch outputs a first voltage of 12V to the main board, and the second power supply branch outputs a second voltage of 35V to the LED light strip, and so on. However, due to the problem of insufficient coupling between the secondary winding in the first power supply branch and the secondary winding in the second power supply branch, once the load connected with any power supply circuit changes, the voltage that actually outputs from the power supply circuit to the main board and the LED light strip changes, breaking this balance. In this case, since the first power supply branch has a closed-loop feedback function, that is, the feedback circuit sends a feedback signal to the LLC module according to the first voltage output from the first power supply branch, so that the LLC module controls the first voltage output from the first power supply branch to the main board to maintain at 12V.

Therefore, if the load on the main board or the load of the LED light strip changes, and the first voltage output from the first power supply branch does not change, the second voltage output from the second power supply branch to the LED light strip will rise, for example will be greater than a first preset threshold, in this case, the power adjustment module needs to step down the voltage output from the second power supply branch, by controlling the energy in the second power supply branch to flow to the first power supply branch, so that the second voltage output from the second power supply branch to the LED light strip drops, so as to maintain the stability of the entire power supply system. When the second voltage output from the second power supply branch to the LED light strip is less than a second preset threshold, the power adjustment module is required to step up the voltage output from the second power supply branch, by controlling the energy in the first power supply branch to flow to the second power supply branch, increasing the second voltage output from the second power supply branch to the LED light strip, and maintaining the stability of the entire power supply system. Therefore, when the voltage supplied to the LED light strip by the power supply circuit in the display apparatus provided by the embodiment of the disclosure changes, the power adjustment module can control the voltage of the LED light strip to be stable without adjusting a voltage value greatly, so as to ensure the stability of the entire power supply circuit and the display apparatus, and can further improve the working efficiency of the entire power supply circuit, and can reduce the design and manufacturing costs of the power supply circuit and the display apparatus under the condition that the power adjustment circuit meets adjustment requirements.

Figure 8:
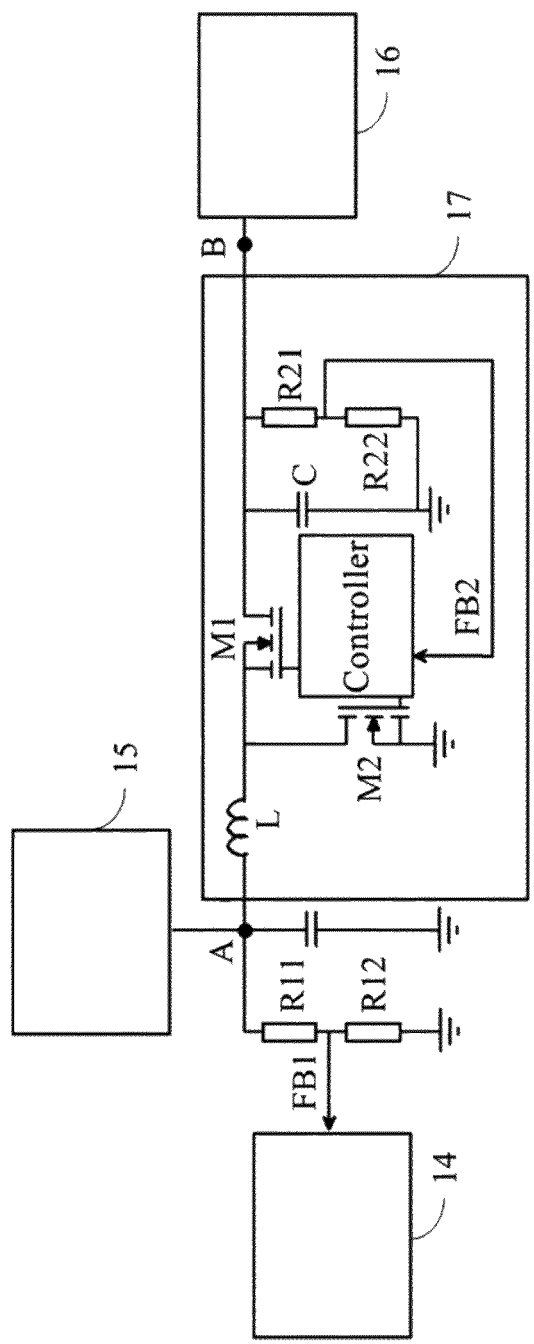
FIG. 8 is a schematic diagram of a circuit structure of a power adjustment module according to some embodiments.

FIG. 8 is a schematic structural diagram of a circuit of the power adjustment module according to some embodiments of the disclosure. As shown in FIG. 8, the power adjustment module provided in the embodiment includes: a controller, a first switch M1, a second switch M2, a capacitor C and an inductor L. A first end of the inductor L is connected with the node A of the first power supply branch, a second end of the inductor L is connected with a first end of the first switch M1 and a first end of the second switch M2. A second end of the first switch M1 is connected with a first end of the capacitor C and the node B of the second power supply branch. A second end of the second switch M2 is grounded. A second end of the capacitor C is grounded. The controller is connected with a control end of the first switch M1 and a control end of the second switch M2. The voltage dividing resistors R11 and R12 can be configured for sending a feedback signal FB1 to the LLC module according to the first voltage provided by the first power supply branch to the main board 15, so that the LLC module can adjust the first voltage output to the main board on the first power supply branch to keep the first voltage stable. The voltage dividing resistors R21 and R22 can be configured for sending a feedback signal FB2 to the controller according to the second voltage provided to the LED light strip 16 by the second power supply branch, so that the controller can adjust an on-off sequence of the first switch M1 and the second switch M2, to realize the adjustment of the second voltage provided by the second power supply branch to the LED light strip 16, so as to keep the second voltage stable.

In some embodiments, when the controller as shown in FIG. 8 determines that the second voltage provided to the LED light strip 16 is greater than the first preset threshold according to the feedback signal FB2, it is necessary to step down the voltage at node B. In this case, the controller controls the inductor L, the first switch M1 and the second switch M2 to form a buck branch. The controller first controls the first switch M1 to be turned on and the second switch M2 to be turned off, so that the voltage at the node B charges the inductor L, and then controls the first switch M1 to be turned off and the second switch M2 to be turned on, so that the inductor L releases energy to the node A on the left, to realize step-down of the voltage at the node B. When the controller determines according to the feedback signal FB2 that the second voltage provided to the LED light strip 16 is lower than the second preset threshold, the voltage of the node B needs to be stepped up. In this case, the controller controls the inductor L and the first switch M1 and the second switch M2 to form a boost branch. The controller first controls the first switch M1 to be turned off and the second switch M2 to be turned on, so that the voltage at node A charges the inductor L1, and then controls the first switch M1 to be turned on and the second switch M2 to be turned off, so that the inductor L releases energy to the node B on the right, to realize step-up of the voltage at the node B.

Figure 9:
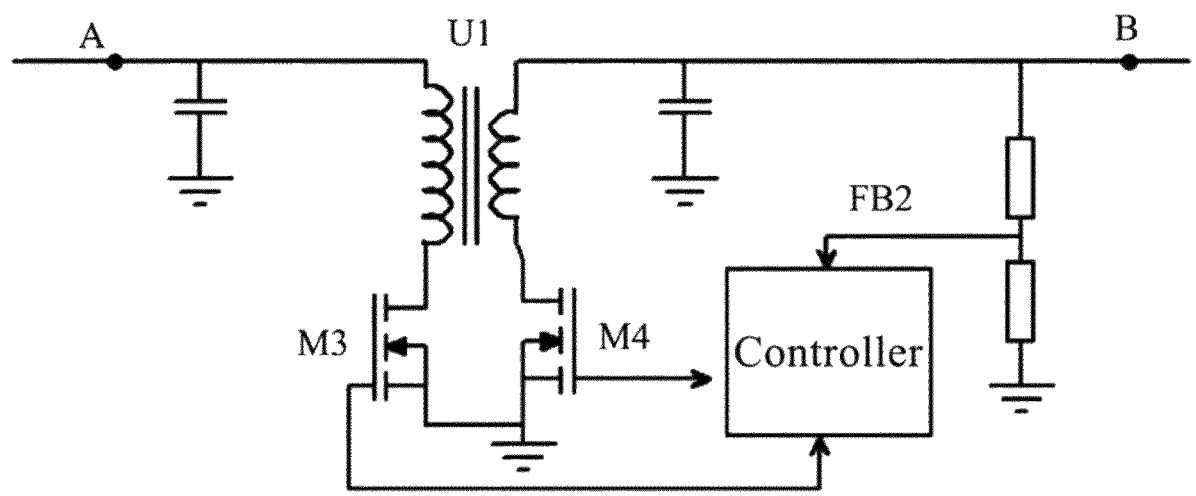
FIG. 9 is a schematic diagram of a circuit structure of a power adjustment module according to another embodiment.

FIG. 9 is a schematic structural diagram of the power adjustment module of another embodiment. As shown in FIG. 9, the power adjustment module provided by the embodiment includes: a controller, a third switch M3, a fourth switch M4 and a transformer U1. A first end of the primary winding of the transformer U is connected with the node A of the first power supply branch. A first end of the secondary winding of the transformer U is connected with the node B of the second power supply branch. A second end of the primary winding of the transformer U is connected with a first end of the third switch M3. A second end of the secondary winding of the transformer U is connected with a first end of the fourth switch M4. A second end of the third switch M3 and a second end of the fourth switch M4 are grounded. The controller is connected with a control end of the third switch M3 and a control end of the fourth switch M4. The number of turns of wire for the primary winding of the transformer U is greater than the number of turns of wire for the secondary winding.

In some embodiments, when the controller as shown in FIG. 9 determines that the second voltage provided to the LED light strip 16 is greater than the first preset threshold according to the feedback signal FB2, the voltage at node B needs to be stepped down. In this case, the controller controls the transformer U, the third switch M3 and the fourth switch M4 to form a buck branch. The controller first controls the third switch M3 to be turned on and the fourth switch M4 to be turned off so that the voltage at node B charges the transformer U, and then controls the third switch M3 to be turned off and the fourth switch M4 to be turned on, so that the transformer U releases energy to the node A on the left, to step down the voltage at the node B. When the controller determines according to the feedback signal FB2 that the second voltage provided to the LED light strip 16 is less than the second preset threshold, the voltage of the B voltage needs to be stepped up. In this case, the controller controls the transformer U and the third switch M3 and the fourth switch M4 form a boost branch. The controller first controls the third switch M3 to be turned off and the fourth switch M4 to be turned on, so that the voltage at node A charges the transformer U, and then controls the third switch M3 to be turned on and the fourth switch M4 to be turned off, so that the transformer U releases energy to the node B on the right, so as to step-up the voltage at the node B.

In the foregoing embodiments of the disclosure, the transfer and adjustment of energy between the first power supply branch and the second power supply branch can be realized through the power adjustment module 17. However, if the voltage provided by the first power supply branch and the second power supply branch deviates greatly from the rated voltage of the main board and the rated voltage of the LED light strip, the workload of the power adjustment module 17 will be increased, and the load of the power supply circuit will be increased. In severe cases, the entire power supply system may collapse. For example, if the rated voltage of the main board is 12V and the rated operating voltage of the LED light strip is 35V, the secondary winding in the first power supply branch can be set as a two-turns winding, so that the first output voltage of the first power supply branch is 12V, the secondary winding in the second power supply branch can be set as a six-turns winding, so that the second voltage output from the second power supply branch is 36V. In this case, the power adjustment module 17 needs to work as the buck branch to transfer the energy output from the second power supply branch to the first power supply branch, so that the LED light strip works at a voltage of 35V. The workload of the power adjustment circuit 17 is related to the coupling degree of the windings that provide the voltages of 12V and 35V. The better the coupling degree is, the greater the workload is. If the voltage for the LED light strip changes, the workload of the power adjustment module 17 will be further increased.

Figure 10:
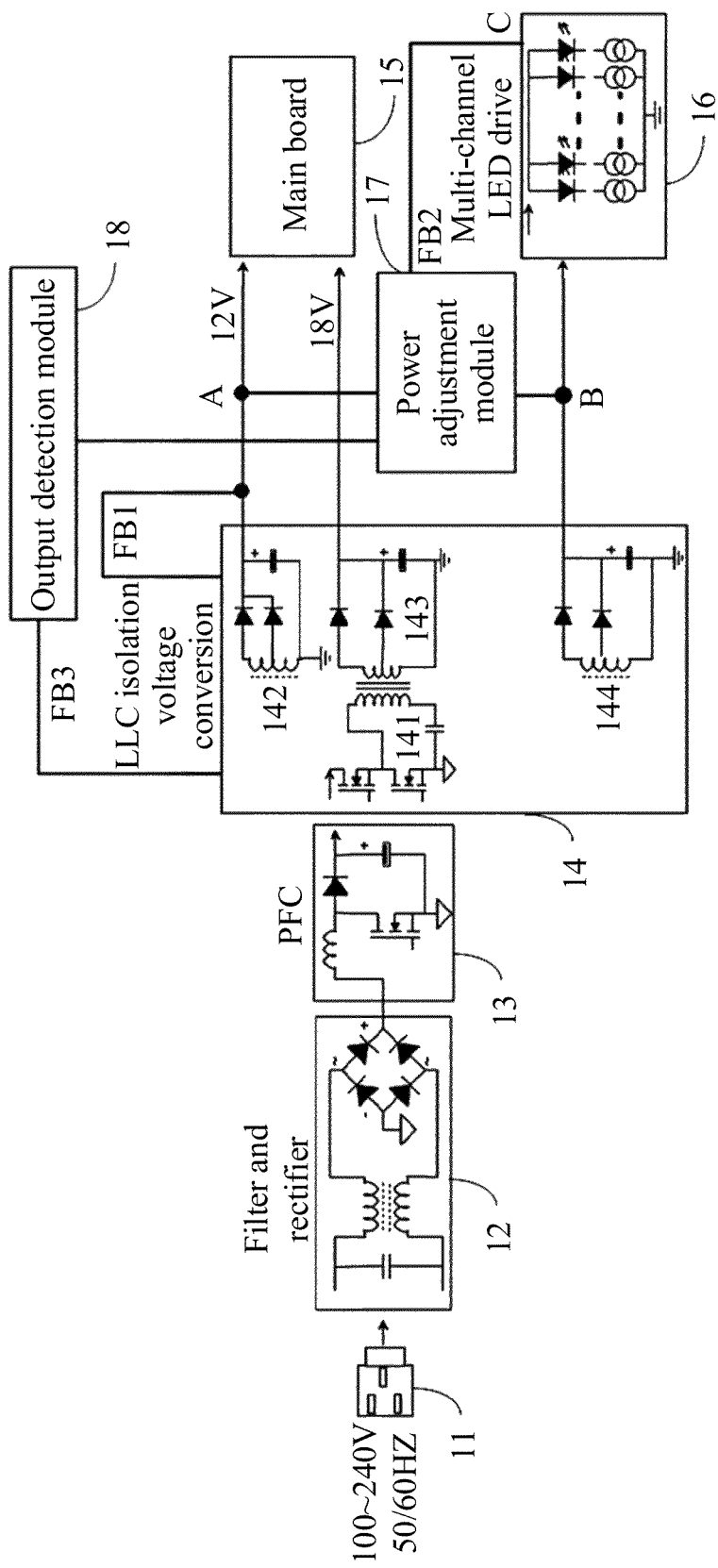
FIG. 10 is a schematic structural diagram of a display apparatus according to another embodiment.

Therefore, the disclosure also provides a display apparatus, so that the first power supply branch and the second power supply branch can respectively provide more suitable voltages, and reduce the workload during the adjustment performed by the power adjustment module 17. For example, FIG. 10 is a schematic structural diagram of a display apparatus of another embodiment provided by the disclosure. The display apparatus shown in FIG. 10 further includes an output detection module 18 on the basis of structure shown in FIG. 6. A first end of the output detection module 18 is connected with the first power supply branch, and a second end of the output detection module 18 is connected with the LLC module in the power supply circuit. The output detection module 18 can be configured to send the feedback signal FB3 according to the power parameters output from any end of the power adjustment module 17 to the LLC module, so as to dynamically feed back the workload of the power adjustment module 17 to the LLC module.

In some embodiments, the power parameter can specifically be the output current, power, etc. For the LLC module, after receiving the feedback signal FB3, if the power parameter indicated by the feedback signal FB3 does not meet a preset condition, the LLC module can adjust the first voltage output from the first power supply branch to indirectly cause the second voltage output from the second power supply branch to be changed, so that the power adjustment circuit operates within the expected operating range. Exemplarily, assuming that the LLC module determines according to the feedback signal FB3 that the current output from the power adjustment module is greater than a preset value, the first voltage output from the first power supply branch can be stepped down. Taking the working voltage of the LED light strip as 35V as an example, when the second voltage supplied to the LED light strip is greater than the preset value, so that the output current of the power adjustment module is greater than the preset value during the power adjustment module transferring the energy of the second power supply branch to the first power supply branch, then it indicates that the workload of the power adjustment module is relatively large. In this case, after the LLC module reduces the first voltage output from the first power supply branch from 12V to 35/6*2=11.67V, the second voltage provided to the LED light strip can be stabilized at 35V again, while reducing the workload of the power adjustment module and improving the power efficiency of the power adjustment module and the power supply circuit. Meanwhile, the design and manufacturing costs of the power adjustment module can also be reduced when the workload requirement of the power adjustment module is reduced.

Figure 11:
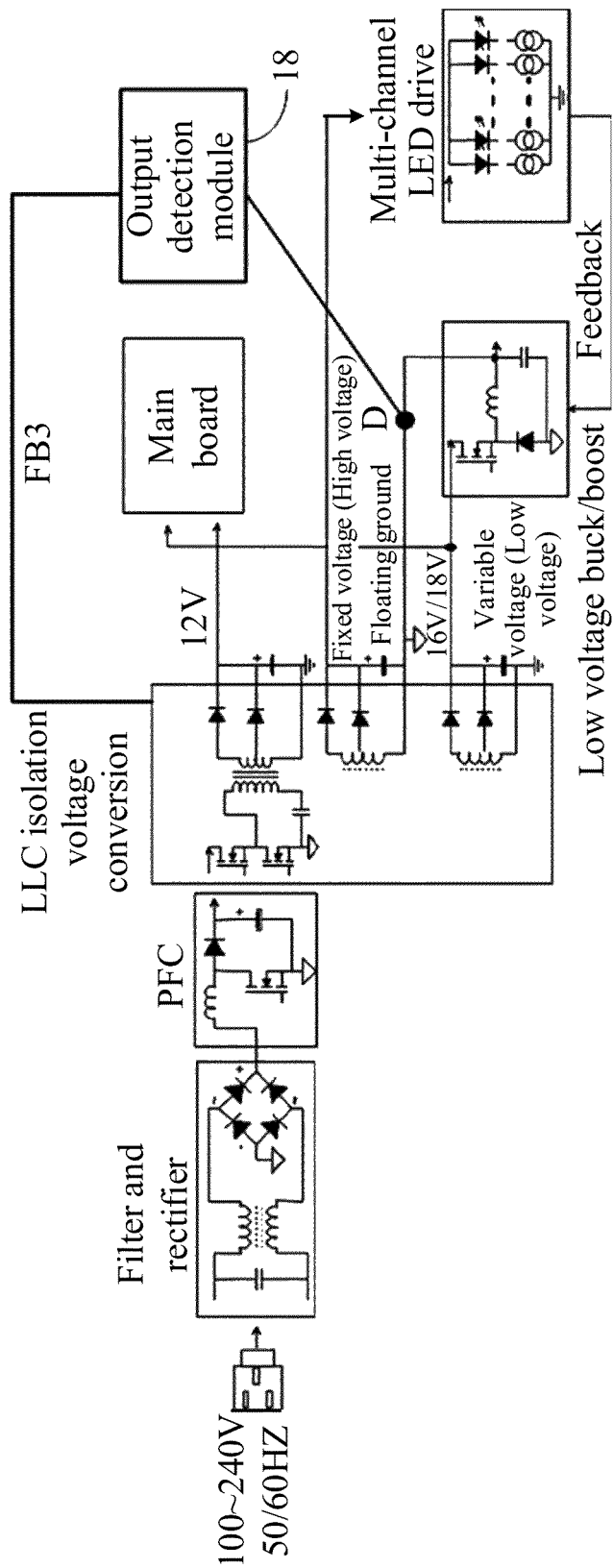
FIG. 11 is a schematic structural diagram of a display device of another embodiment.

Based on the arrangement in FIG. 10, the disclosure also provides another display apparatus, for example, FIG. 11 is a schematic structural diagram of the display apparatus of another embodiment provided by the disclosure. The display apparatus shown in FIG. 11 is on the basis of the display apparatus as shown in FIG. 5, and further includes: an output detection module. A first end of the output detection module is connected with the output end of the voltage adjustment module (low-voltage buck/boost), and a second end of the output detection module is connected with the LLC module in the power supply circuit. The output detection module can be configured to send a feedback signal FB3 to the LLC module according to the power parameter output from the voltage adjustment module. In this case, the power parameter can be voltage. For the LLC module, based on that the output voltage of the voltage adjustment module is greater than the preset value according to the feedback signal FB3, the LLC module can control the first power supply branch to step up the first voltage output from the first power supply branch, so as to step up the second voltage output from the second winding. Based on that the output voltage of the voltage adjustment module is lower than the preset value according to the feedback signal FB3, the LLC module can control the first power supply branch to step down the first voltage output from the first power supply branch, so as to step down the second voltage output from the second winding, to further keep the output voltage of the voltage adjustment module within a more reasonable preset voltage range, and reduce the workload of the voltage adjustment module.

Figure 12:
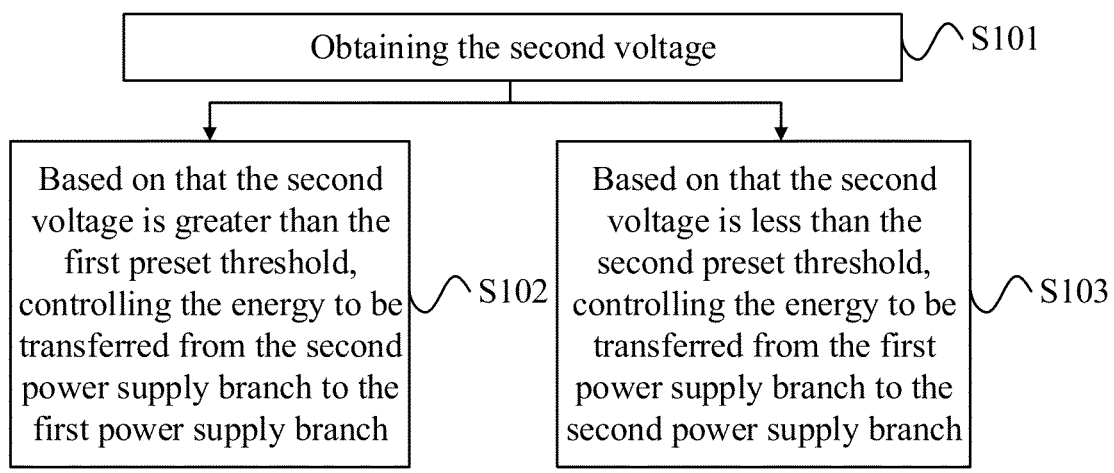
FIG. 12 is a schematic flowchart of a control method of a display device according to some embodiments.

The disclosure also provides a control method for a display apparatus, which can be applied to the display apparatus shown in FIG. 6, and is implemented by the power adjustment module 17 in the form of software. FIG. 12 is a schematic flowchart of a control method for a display apparatus according to some embodiments of the disclosure. The control method includes the following steps. S101: obtaining a second voltage of the LED light strip; S102: based on that the second voltage is greater than a first preset threshold, controlling the energy to be transferred from the second power supply branch to the first power supply branch; S103: based on that the second voltage is less than the second preset threshold, controlling the energy to be transferred from the first power supply branch to the second power supply branch. For the specific implementation manner and principle of the above method, reference may be made to that shown in FIG. 6, which will not be repeated here.

In order to use the DC voltage output from the external adapter to meet the power supply requirements of the loads in the display apparatus, the disclosure further provides the following embodiments.

Figure 13:
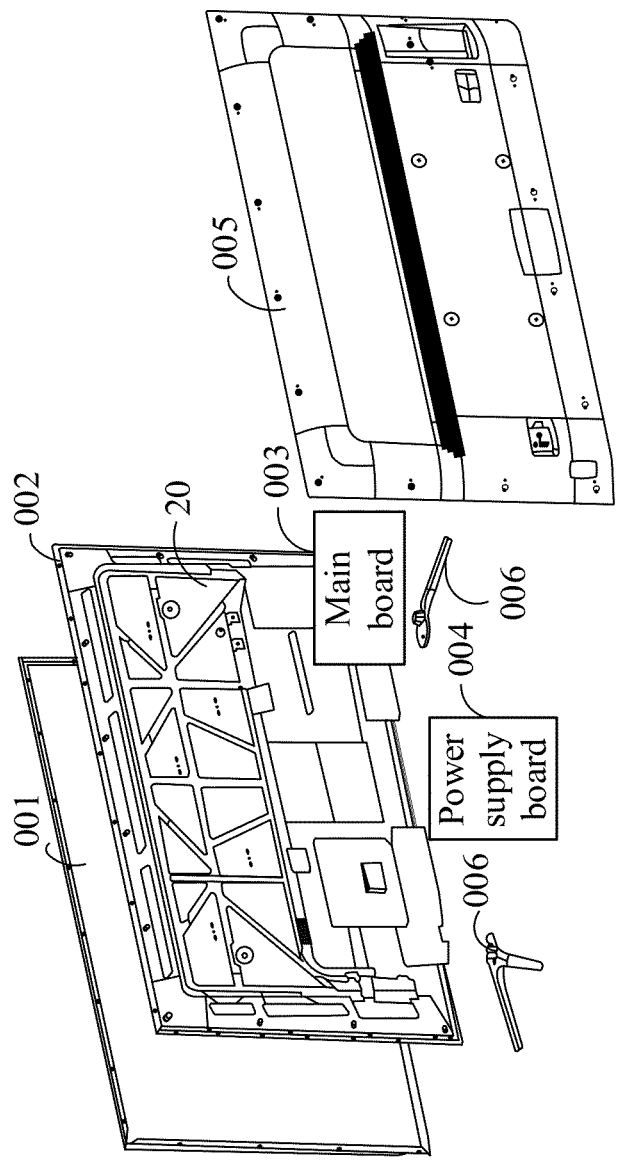
FIG. 13 is a schematic structural diagram of a display apparatus provided with an independent power supply board.

Taking a display apparatus equipped with an independent power supply board as an example, the structure of the display apparatus is described, as shown in FIG. 13, which is a schematic structural diagram of a display apparatus with an independent power supply board. As shown in FIG. 13, the display apparatus includes a display panel 001, a backlight component 002, a main board 003, a power board 004, a rear case 005 and a base 006. The display panel 001 is configured to present images to users. The backlight component 002 is located under the display panel 001, and usually includes some optical components, which are configured to supply evenly distributed light sources with sufficient brightness and so that the display panel 001 can display images normally. The assembly 002 further includes a backplane 20. The main board 003 and the power supply board 004 are arranged on the backplane 20, on which some convex hull structures are usually stamped and formed on the backplane 20. The main board 003 and the power supply board 004 are fixed on the convex hull by screws or hooks. The rear case 005 is arranged to cover the display panel 001 to hide the components of the display apparatus such as the backlight component 002, the main board 003 and the power board 004, and has an aesthetic effect. The base 006 is configured to support the display apparatus.

Figure 14:
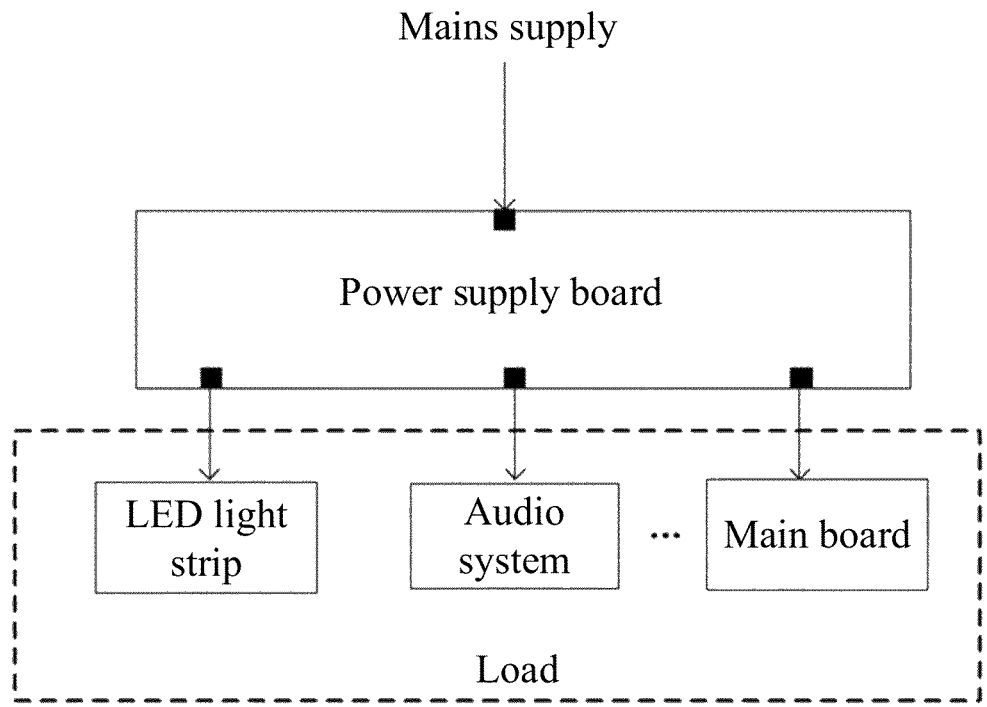
FIG. 14 is a schematic diagram illustrating a connection relationship between a power board and loads of the display apparatus.

In some embodiments, FIG. 14 is a schematic diagram illustrating a connection relationship between the power board and the load of the display apparatus, which is similar to that of FIG. 2, and reference may be made to the description of FIG. 2.

Figure 15:
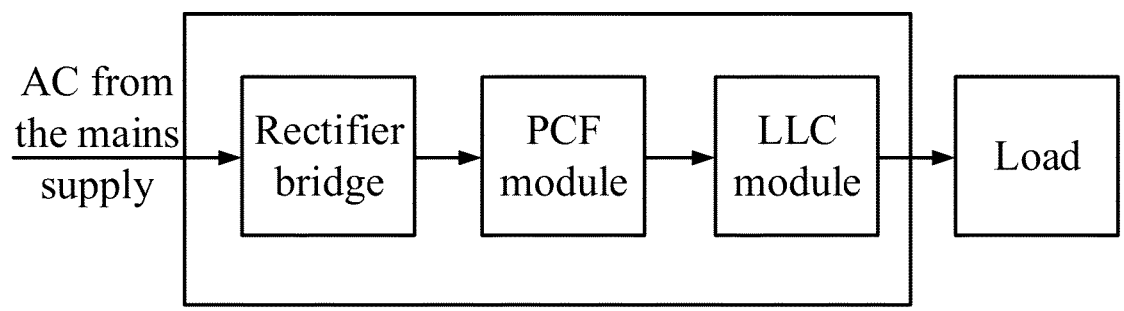
FIG. 15 is a schematic diagram of a power supply structure of a display apparatus.

In some embodiments, a TV is used as an example to introduce the power supply architecture of a display apparatus. FIG. 15 is a schematic diagram of a TV power supply architecture. As shown in FIG. 15, the power board 004 can include a rectifier bridge, a Power Factor Correction (PFC) module, and a resonant conversion circuit (LLC) module. The LLC module includes a synchronous rectification circuit (not shown in FIG. 15). The PFC module is connected with the LLC module, and the LLC module is connected with a load.

The rectifier bridge is configured to rectify the input alternating current of the mains supply, and output a full-wave signal to the PFC module. Before the AC power is input into the PFC module, an Electromagnetic Interference (EMI) filter (not shown in FIG. 15) may be connected with perform high-frequency filtering on the input AC power.

The PFC module can include a PFC inductor, a switching power device and a PFC control chip, and mainly performs the power factor correction on the input AC power, and outputs a stable DC bus voltage (such as 380V) to the LLC module. The PFC module can effectively improve the power factor of the power supply and ensure that the voltage and current are in the same phase. Alternatively, in some embodiments, the PFC module may not be set in the power architecture as shown in FIG. 15.

The LLC module can use the LLC resonant conversion circuit having double MOS transistors. Usually, the synchronous rectification circuit is set in the LLC module. The synchronous rectification circuit mainly includes a transformer, a controller, two MOS transistors and a diode. In addition, the LLC module may further include a Pulse frequency modulation (PFM) circuit, capacitors, inductors and other components. Specifically, the LLC module can step down or step up the DC bus voltage output from the PFC module, and output a constant voltage to the load. Usually, the LLC module can output a variety of different voltages to meet the needs of different loads. Alternatively, in other embodiments, the LLC module shown in FIG. 15 can be replaced by a flyback voltage conversion module, which steps down or steps up the voltage and outputs a constant voltage to the load.

Figure 16:
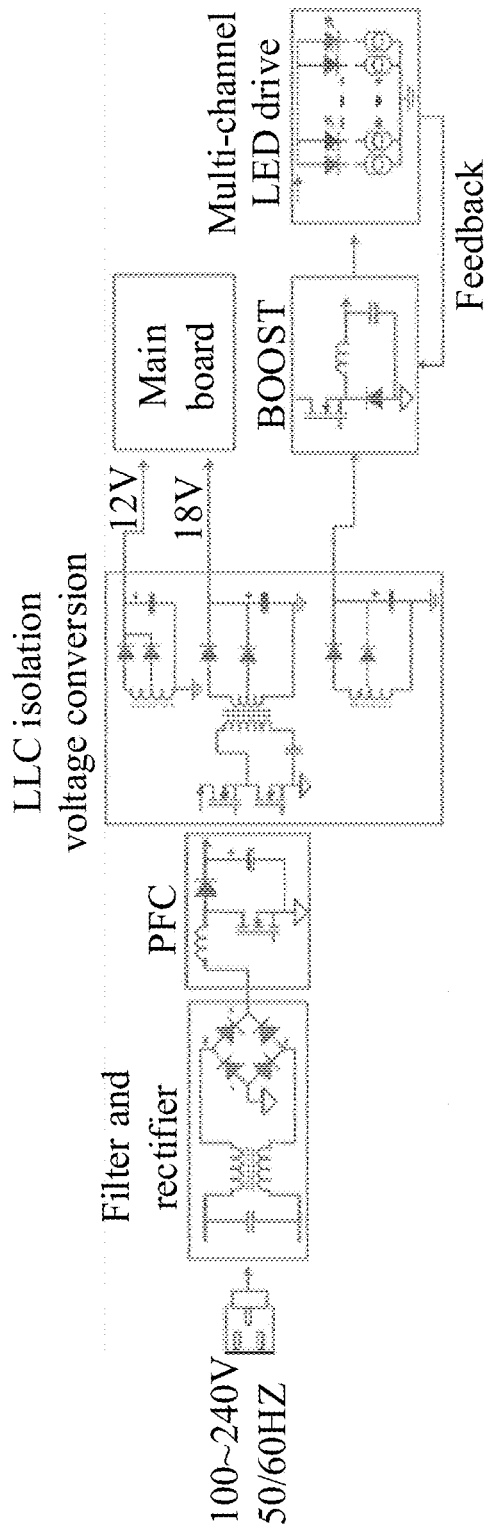
FIG. 16 is a schematic structural diagram of a power supply circuit for supplying power to a main board and a LED light strip.

More specifically, taking the TV as an example as the display apparatus, FIG. 16 is a schematic structural diagram of a power supply circuit for supplying power to the main board and the LED light strip. The alternating current (100V-240V, 50-60 Hz) of the mains supply obtained by the power supply circuit supplies power to the main board, multi-channel LED light strip and other load (not shown in FIG. 16) of the display apparatus through the filter-and-rectifier module (rectifier bridge), the PFC module and the LLC voltage conversion module in turn. The first secondary winding in the LLC voltage conversion module provides a fifth voltage (such as 12V) to the main board, the second secondary winding provides a sixth voltage (such as 18V) to the main board, and the third secondary winding supplies voltages simultaneously to the multi-channel LED light strip.

The multi-channel LED light strip is configured to light up the display panel of the TV. The LED components in the multi-channel LED light strip need to work within a certain voltage drop range to work at the rated current of the LED components. For example, the multi-channel LED light strip is a 16-way LED light strip. When each LED string includes 9 LED components, under the condition of 120 mA, the required working voltage range of multi-channel LED light strip is 51.3V-58.5V, and the total current is 1.92 A.

Because the voltage range required by the multi-channel LED light strip is related to the working environment of the multi-channel LED light strip, the hardware characteristics and the life span of the LED components, and other factors, it needs to be adjusted in real time. Therefore, in the LLC voltage conversion module, the secondary winding that supplies power to multi-channel LED light strip is additionally connected with a voltage adjustment module (such as a buck circuit or a boost circuit, and the boost circuit is taken as an example in FIG. 16). According to the real-time current feedback results for LED light strip, the voltage directly output from the third secondary winding is adjusted, so that the driver module for multi-channel LED light strip controls the multi-channel LED light strip to work at the rated current according to the received adjusted voltage to prevent over-large current flows through the LED components in the multi-channel LED light strip, causing damage to the components.

However, in the power supply circuit shown in FIG. 16, the challenge of the voltage adjustment module set for the multi-channel LED light strip in the power supply circuit is relatively large, for example, when the required voltage range of the multi-channel LED light strip is 51.3V-58.5V, the voltage adjustment module needs to adjust (to step up or step down) the voltage greater than 50V, resulting in a relatively large withstand voltage value for the switching transistors, capacitors and other components in the voltage adjustment module, which in turn occupies a larger area of the PCB board where the power supply circuit is located, ultimately increasing the cost of the power supply circuit.

Figure 17:
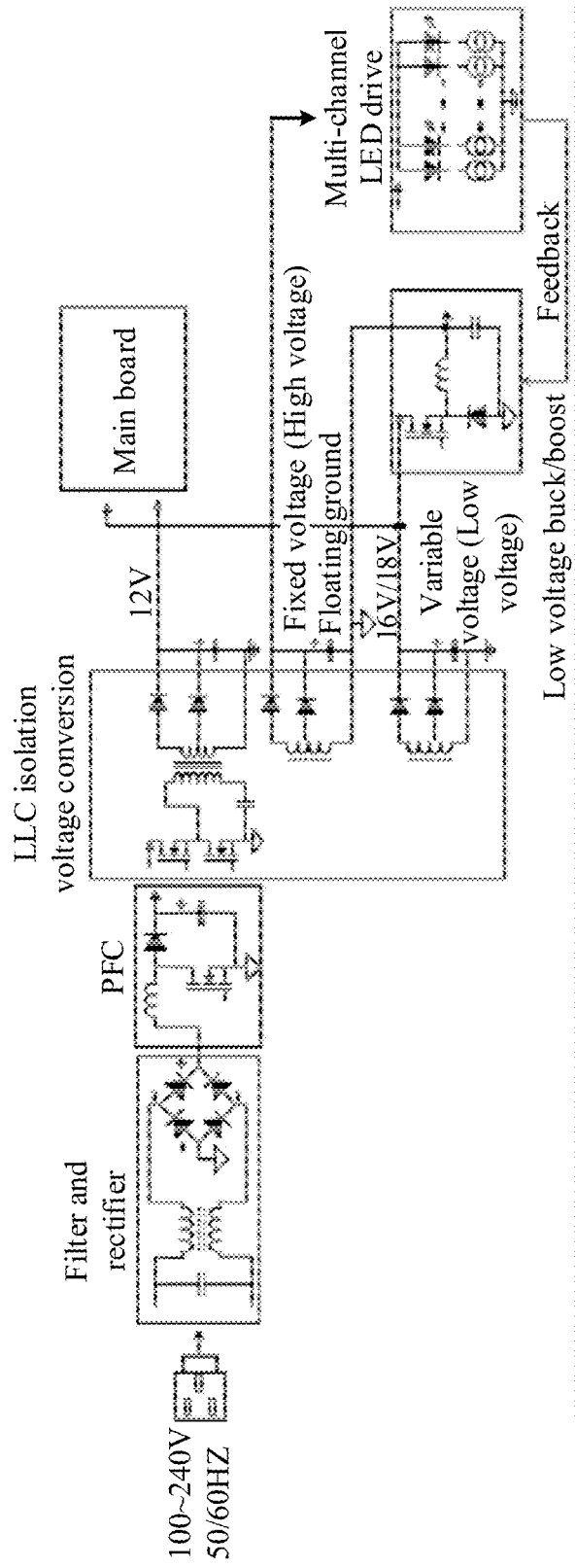
FIG. 17 is another schematic structural diagram of a power supply circuit for supplying power to a main board and a LED light strip.

FIG. 17 is another schematic structural diagram of a power supply circuit for supplying power to the main board and the LED light strip. The difference from the power supply circuit shown in FIG. 16 is that the form of "stepped power supply" is adopted in FIG. 17, and two different secondary windings of the LLC voltage conversion module supplies power to the LED light strip. Specifically, the power supply circuit includes three power supply branches. The first power supply branch includes a first secondary winding in the LLC conversion module, and is configured to output a fifth voltage (for example, 12V) to the main board. The second power supply branch includes a second secondary winding in the LLC conversion module and is configured to output a sixth voltage as a fixed voltage. The third power supply branch includes a third secondary winding in the LLC conversion module and is configured to output a seventh voltage (such as 16V or 18V). The voltage adjustment module (low voltage buck/boost) converts the seventh voltage into the eighth voltage, and provides a sum of the seventh voltage and the eighth voltage to the LED light strip. In the process of supplying power to the LED light strip, due to the flexible setting of two different voltages output from the second secondary winding and the third secondary winding respectively, the voltage adjustment module only needs to adjust the voltage output from the secondary winding with a smaller voltage, thereby reducing the requirements for withstand voltage of components such as switch transistors and capacitors in the voltage adjustment module, thereby reducing the area of the PCB board where the power supply circuit is located, and finally reducing the cost of the power supply circuit.

Figure 18:
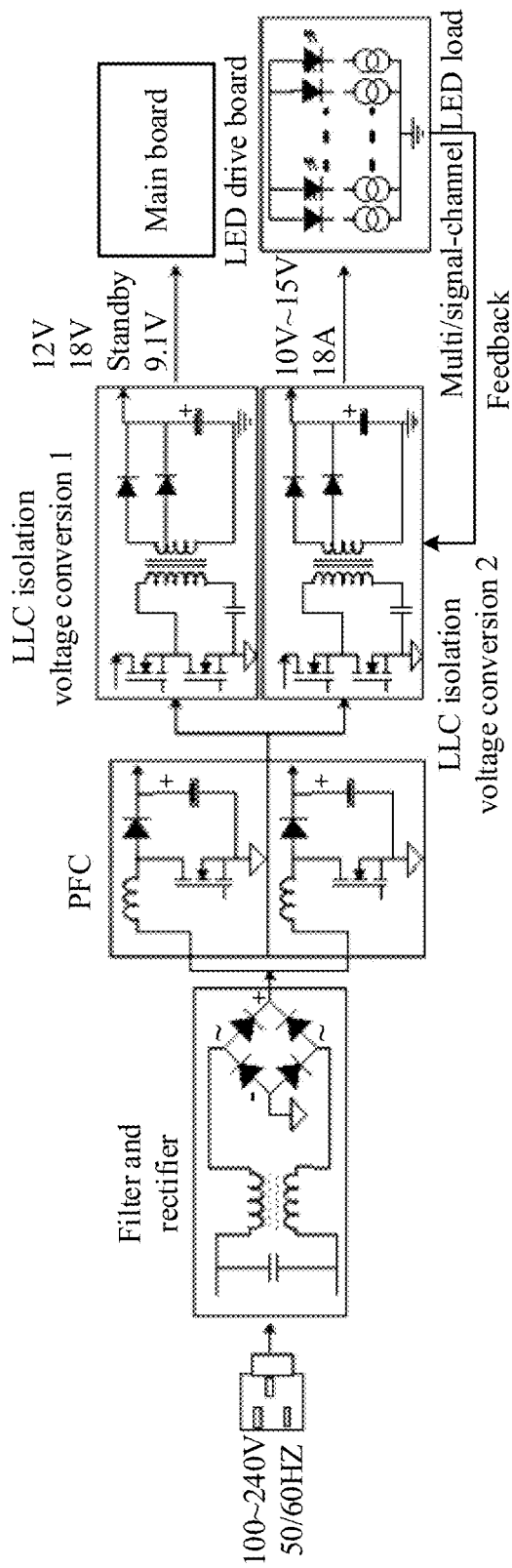
FIG. 18 is another schematic structural diagram of a power supply circuit for supplying power to a main board and a LED light strip.

FIG. 18 shows another schematic structural diagram of a power supply circuit for supplying power to the main board and the LED light strip. The AC obtained by the power supply circuit from the mains supply (100V-240V, 50-60 Hz) is output to two PFC modules through the filtering and rectifier module (i.e., a rectifier bridge). Each PFC module is connected with one LLC conversion module. One of the LLC conversion modules supplies power to the main board, a voltage of 12V, a voltage of 18V or a voltage of 9.1V in standby mode to the main board. Different voltages can be supplied to the main board by adjusting the switching frequency or duty cycle of the transistor in the LLC conversion module. The other LLC conversion module provides the voltage of 10V-15V and a constant current of 18 A to multi-channel or single-channel LED load, and adjusts the output voltage of the LLC module based on a feedback circuit.

With the development of electronic technology, the integration level of electronic apparatuses including display apparatuses such as televisions is getting higher and higher, which further proposes higher and higher requirements on the power supply of the display apparatuses. In FIG. 16, FIG. 17 and FIG. 18, the power supply structure of the display apparatus is directly connected with the AC of the mains supply, and a special power supply circuit is configured in the power board of the display apparatus to transform the AC and convert AC to DC, and at least includes the following modules: a rectifier bridge, a Power Factor Correction (PFC) module, and a resonant conversion circuit (LLC) conversion module. The LLC conversion module is configured to generate multiple DC voltages to meet the power supply requirements of the loads in the display apparatus. Since the power supply architecture includes at least one filter-and-rectifier module, at least one PFC module, and at least one LLC conversion module, and the LLC conversion module includes at least one secondary winding, the circuit structure of the power supply is relatively complicated, and accordingly, the complicated circuit is not conducive to increasing the degree of integration.

Figure 19:
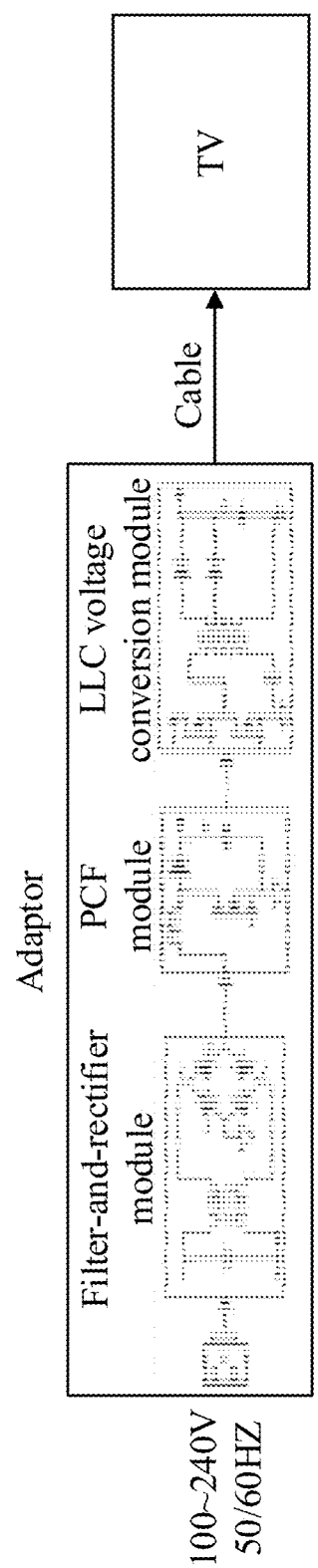
FIG. 19 is a schematic diagram of an external adapter in a power supply mode.

With the rise of power adapters and the promotion of gallium nitride devices, the power supply of display apparatuses has gradually developed into an external device, that is, the external power adapters are configured to complete the transformation of AC power, AC-DC conversion, etc., and output a fixed DC voltage. FIG. 19 is a schematic diagram of an external adapter in the power supply mode provided by embodiments of the disclosure, providing power supply to a display apparatus such as a TV. It can be seen that the display apparatus (the TV shown in FIG. 19) is connected with a single fixed DC input voltage provided by the power adapter through a cable.

In the above-mentioned display apparatus power supply architecture shown in FIG. 16, FIG. 17 and FIG. 18, multiple secondary windings of the LLC transformer module are configured to output multiple voltages to supply power for the loads of the display apparatus, which is not applicable to the external power adaptor in the power supply mode shown in FIG. 19. How to use the single fixed DC input voltage provided by the external adapter to supply power to the load of the display apparatus is an urgent problem to be solved.

Based on the above problems, a display apparatus and display control method provided by the disclosure are provided with a power supply interface connected with an external adapter to receive a DC input voltage to adapt to the power supply mode of the external adapter. The DC input voltage is configured to generate an additional voltage, and the additional voltage and the DC input voltage are superimposed to realize stepped power supply, which is beneficial to reduce heat loss. The energy storage element is configured to realize continuous power supply for the backlight control module. The power supply voltage of the backlight control module is adjusted in time through real-time feedback, so that the light-emitting diodes work stably.

The content of the disclosure and how the content of the disclosure solves the above technical problems will be described in detail below with specific embodiments. Embodiments of the disclosure will be described below in conjunction with the accompanying drawings.

Figure 20:
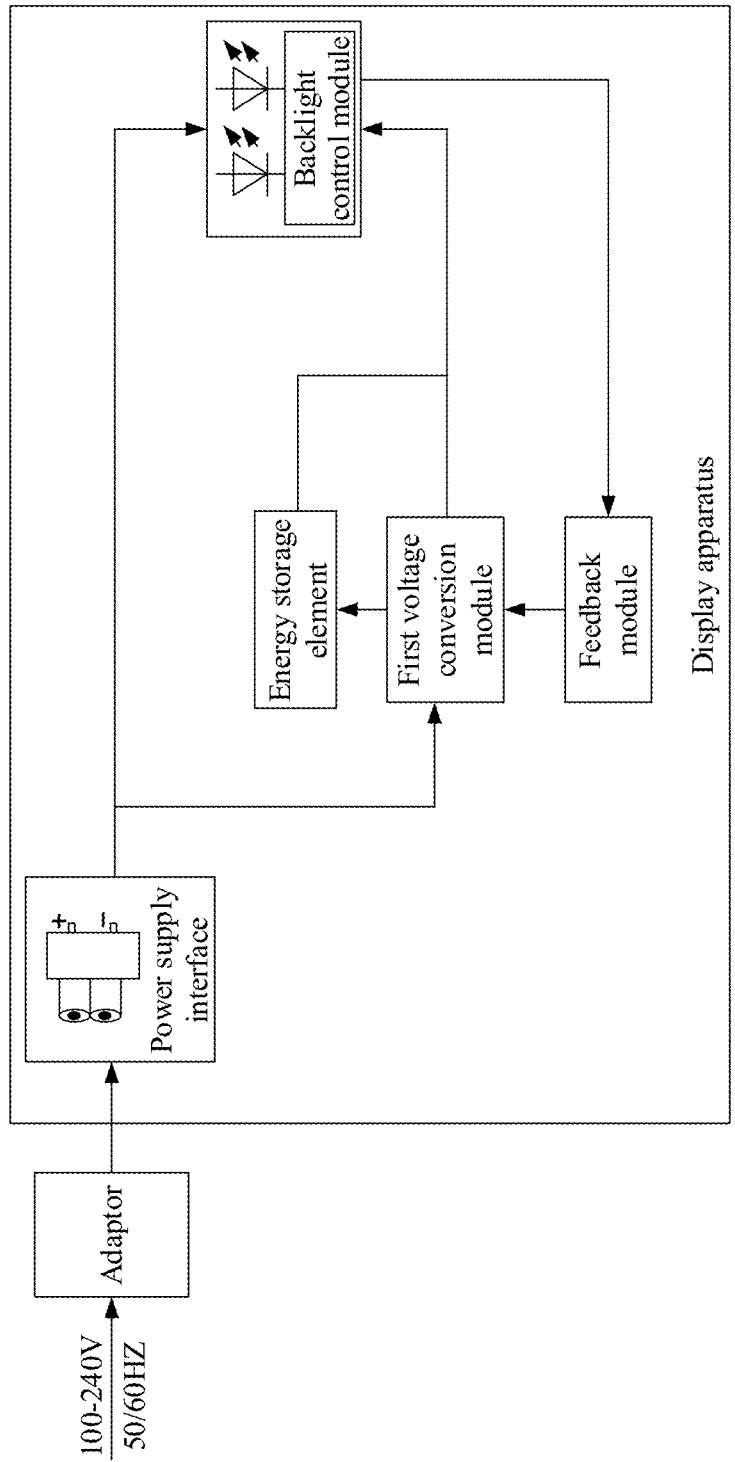
FIG. 20 is a schematic structural diagram of a power supply circuit of a display apparatus.

FIG. 20 is a schematic structural diagram of a power supply circuit of a display apparatus provided by embodiments of the disclosure, including: a backlight control module, a power supply interface, a first voltage conversion module, an energy storage element, and a feedback module.

The backlight control module is configured to control the light-emitting diodes to emit light. The light-emitting diodes are configured to light up the screen of the display apparatus. The power supply interface is configured to receive the DC input voltage provided by the external adapter. The first voltage conversion module is configured to generate the fifth voltage according to the DC input voltage. The energy storage element is connected with the first voltage conversion module and configured to store energy of the fifth voltage. The energy storage element and the first voltage conversion module alternately output the fifth voltage.

A negative electrode of the backlight control module is provided with the fifth voltage, and the fifth voltage serves as a negative reference voltage of the backlight control module. A positive electrode of the backlight control module is provided with the DC input voltage. The feedback module is configured to send a feedback signal generated by the backlight control module to the first voltage conversion module. The feedback signal is configured to instruct the first voltage conversion module to adjust the fifth voltage to adjust the required voltage of the backlight control module.

The voltage between both sides of the backlight control module is a sum of the absolute values of the DC input voltage and the fifth voltage. The DC input voltage corresponds to a "fixed voltage", and the fifth voltage corresponds to a "variable voltage". The above-mentioned circuit structure using the fixed voltage and the variable voltage to supply power to the backlight control module is "stepped power supply", which can reduce the requirements such as the withstand voltage value of the electrical components in the first voltage conversion module, so as to reduce costs and improve efficiency, and meanwhile reduce heat loss on electrical components.

As shown in FIG. 20, the external adapter receives AC power (100V-240V, 50-60 Hz) from the mains supply, and the internal circuit of the external adapter can be shown in FIG. 19, including at least a filter-and-rectifier module, a PFC module, and an LLC conversion module. This external adapter outputs a fixed DC voltage. The display apparatus is provided with a power supply interface connected with the external adapter for receiving a DC input voltage, so as to adapt to the power supply mode of the external adapter shown in FIG. 19. Compared with FIG. 16 to FIG. 18, there is no need to arrange the filter-and-rectifier module, the PFC module, and the LLC conversion module on the power board of the display apparatus, which is beneficial to simplify the circuit.

In some embodiments, the energy storage element shown in FIG. 20 may be a single energy storage capacitor or other energy storage circuits. The energy storage element cooperates with the first voltage conversion module to alternately output the fifth voltage, continuously provide a negative reference voltage for the backlight control module, and make the light-emitting diodes emit light stably.

Figure 21:
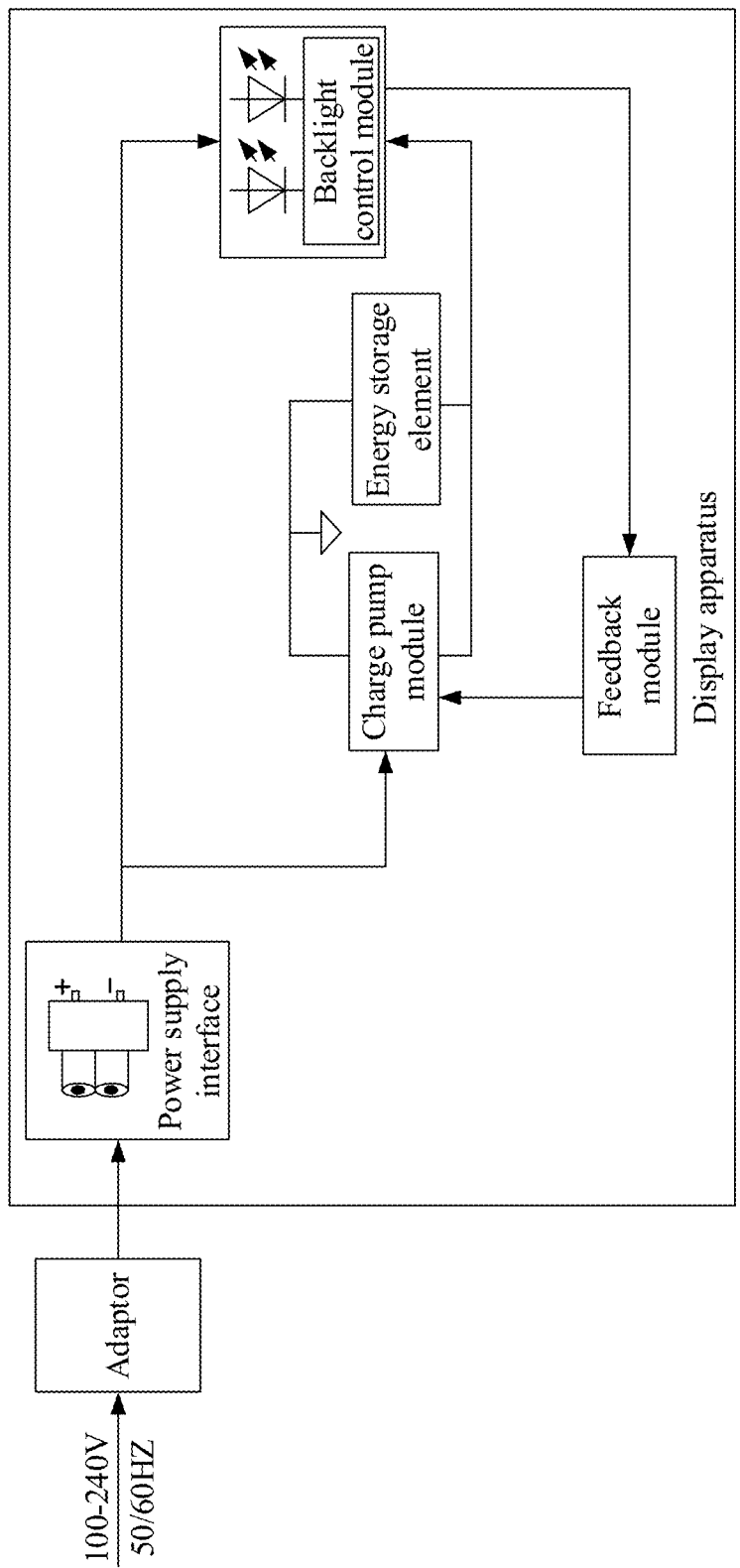
FIG. 21 is another schematic structural diagram of a power supply circuit of a display apparatus.

In some embodiments, the first voltage conversion module shown in FIG. 20 may be in the form of a charge pump. FIG. 21 is another schematic structural diagram of a power supply circuit of a display apparatus provided by embodiments of the disclosure. As shown in FIG. 21, the first voltage conversion module includes: a charge pump module. The charge pump module is configured to generate a fifth voltage in a charging state and provide the fifth voltage to the negative electrode of the backlight control module in a discharging state. A first end of the energy storage element is connected with a positive output end of the charge pump module, and grounded. A second end of the energy storage element is connected with a negative output end of the charge pump module. The energy storage element is configured to store the fifth voltage while the charge pump module is being discharged and provide the fifth voltage to the negative electrode of the backlight control module while the charge pump module is charged. The feedback signal is configured to instruct the charge pump module to adjust the fifth voltage to adjust the required voltage of the backlight control module.

The first voltage conversion module in the form of a charge pump in the embodiment is a non-inductive DC-DC power converter, that is, there is no inductive element in the voltage converter in the form of a charge pump, so the voltage conversion does not involve high-speed conversion of a magnetic field, which is a high-speed conversion of electromagnetism and magnetoelectricity, the problem of electromagnetic interference can be almost ignored. The principle of voltage conversion in the form of a charge pump is to utilize high-speed charging and discharging of internal capacitive elements, so it has the advantage of low electromagnetic interference. In addition to low electromagnetic interference, it also has the advantages of larger output voltage adjustment range, high efficiency, small size, low quiescent current, low minimum operating voltage, and low noise, etc. In addition, the integration of capacitors is easier and cheaper than the integration of inductors, so the first voltage conversion module in the form of a charge pump is easier to achieve high integration, and the cost for the overall application circuit is not high.

In some embodiments, the energy storage element shown in FIG. 21 may be a single energy storage capacitor or other energy storage circuits. The energy storage element cooperates with the charge pump module to alternately output the fifth voltage to continuously supply power to the backlight control module so that the light emitting diodes emit light stably.

The principle of coordinating power supply by the first voltage conversion module and the energy storage element will be described below in combination with the specific circuit structure schematic diagram of the charge pump module and the energy storage element.

Figure 22:
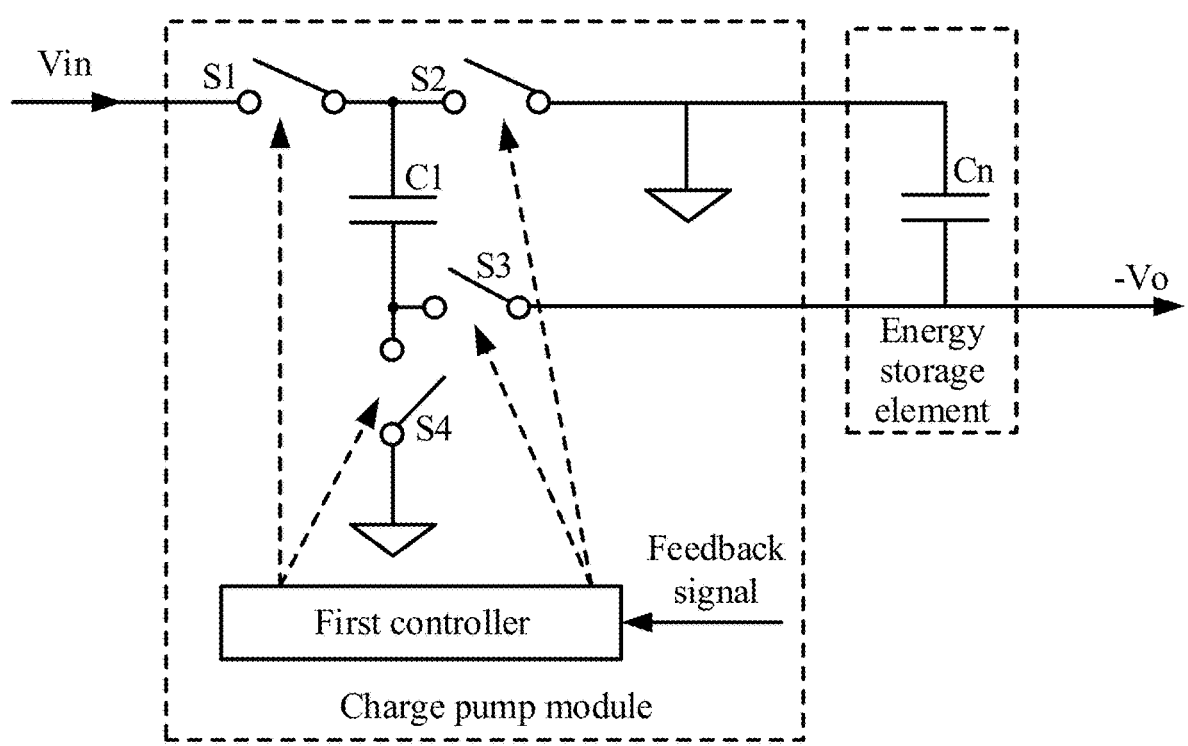
FIG. 22 is a schematic structural diagram of a power supply circuit with a charge pump module.

In some embodiments, FIG. 22 is a schematic structural diagram of a power supply circuit with a charge pump module provided in embodiments of the disclosure. The energy storage element Cn is a single energy storage capacitor as an example. The charge pump module includes: a first controller, a first energy storage capacitor C1, a first switch S1, a second switch S2, a third switch S3 and a fourth switch S4.

A first end of the first switch S1 is provided with a DC input voltage Vin, a second end of the first switch S1 is connected with a first end of the second switch S2. A second end of the second switch S2 serves as a positive output end of the charge pump module, and is connected with a first end of the energy storage element Cn and grounded. A first end of the first energy storage capacitor C1 is connected with the second end of the first switch S1 and the first end of the second switch S2. A second end of the first energy storage capacitor C1 is connected with a first end of the third switch S3 and a first end of the fourth switch S4. A second end of the fourth switch S4 is grounded. A second end of the third switch S3 serves as a negative output of the charge pump module, is connected with a second end of the energy storage element Cn, and is configured to output the fifth voltage −Vo.

The first controller is connected with control ends of the first switch S1, the second switch S2, the third switch S3 and the fourth switch S4, and is configured to control the switching frequencies of the first switch S1, the second switch S2, the third switch S3 and the fourth switch S4 according to the feedback signal, to adjust the fifth voltage −Vo. The switching states of the first switch S1 and the second switch S2 are different. The first switch S1 and the fourth switch S4 are turned off or turned on simultaneously. The second switch S2 and the third switch S3 are turned off or turned on simultaneously.

Based on the power supply circuit shown in FIG. 22, the principle of cooperation between the charge pump module and the energy storage element to provide a negative reference voltage for the negative electrode of the backlight control module is as follows.

Step (1): The first controller controls the first switch S1 and the fourth switch S4 to be turned off simultaneously, and the second switch S2 and the third switch S3 to be turned on simultaneously. In this case, the DC input voltage Vin charges the first energy storage capacitor C1 through the turned-on first switch S1. The charging time of the first energy storage capacitor C1 is controlled by controlling the turn-off time of the second switch S2 and the third switch S3, and the turn-on time of the first switch S1 and the fourth switch S4, so as to control the energy storage voltage of the first energy storage capacitor C1. Assuming that the energy storage voltage of the first energy storage capacitor C1 after charging is Vo, in this case, since the second end of the first energy storage capacitor C1 is grounded, the voltage of the first end of the first energy storage capacitor C1 is Vo.

Step (2): The first controller controls the first switch S1 and the fourth switch S4 to be turned off simultaneously, and the second switch S2 and the third switch S3 to be turned on simultaneously. In this case, the first end of the first energy storage capacitor C1 is grounded, so the voltage at the second end of the first energy storage capacitor C1 is −Vo (i.e., the fifth voltage), which is configured to provide a negative reference voltage to the negative electrode of the backlight control module. Meanwhile, the first energy storage capacitor C1 charges the energy storage element Cn, so that the energy storage voltage of the energy storage element Cn is Vo after charging. Since the first end of the energy storage element Cn is also grounded, the voltage at the second end of the energy storage element Cn is −Vo (i.e., the fifth voltage).

Step (3): The first controller controls the first switch S1 and the fourth switch S4 to be turned on simultaneously, and the second switch S2 and the third switch S3 to be turned off simultaneously. Repeat the charging process for the first energy storage capacitor C1 in Step (1). In this case, the first end of the energy storage element Cn is grounded, and the second end of the energy storage element Cn provides a negative reference voltage, i.e., the fifth voltage −Vo, to the negative electrode of the backlight control module.

The above-mentioned power supply circuit shown in FIG. 22 generates the fifth voltage −Vo based on the DC input voltage Vin, and provides the fifth voltage −Vo to the negative electrode of the backlight control module as the negative reference voltage of the backlight control module. Combined with the DC input voltage Vin inputted by the positive electrode of the backlight control module, the voltage across the backlight control module is equal to the sum of absolute values of the DC input voltage Vin and the fifth voltage Vo, that is, the required voltage Vled of the backlight control module is equal to (Vin+Vo).

For the power supply circuit shown in FIG. 22, only the magnitude of the fifth voltage −Vo needs to be controlled to control the variation of the required voltage Vled of the backlight control module. The first controller controls the switching frequency or duty cycle of the first switch S1, the second switch S2, the third switch S3, and the fourth switch S4, based on the feedback signal, to control the amount of charge transfer, so as to meet the requirements of controlling the voltage Vled of the backlight control module.

The DC input voltage Vin is relatively stable, which is considered as a "fixed voltage". The fifth voltage −Vo is considered as a "variable voltage". Since the DC input voltage Vin is relatively stable, the voltage variation range of the output fifth voltage −Vo depends on the required variation range of the required voltage Vled of the backlight control module. The above-mentioned circuit structure using fixed voltage and variable voltage to supply power to the backlight control module is "stepped power supply", which can reduce the requirements such as the withstand voltage value of the electrical components in the first voltage conversion module, so as to reduce costs, improve efficiency, and reduce heat loss on electrical components.

Figure 23:
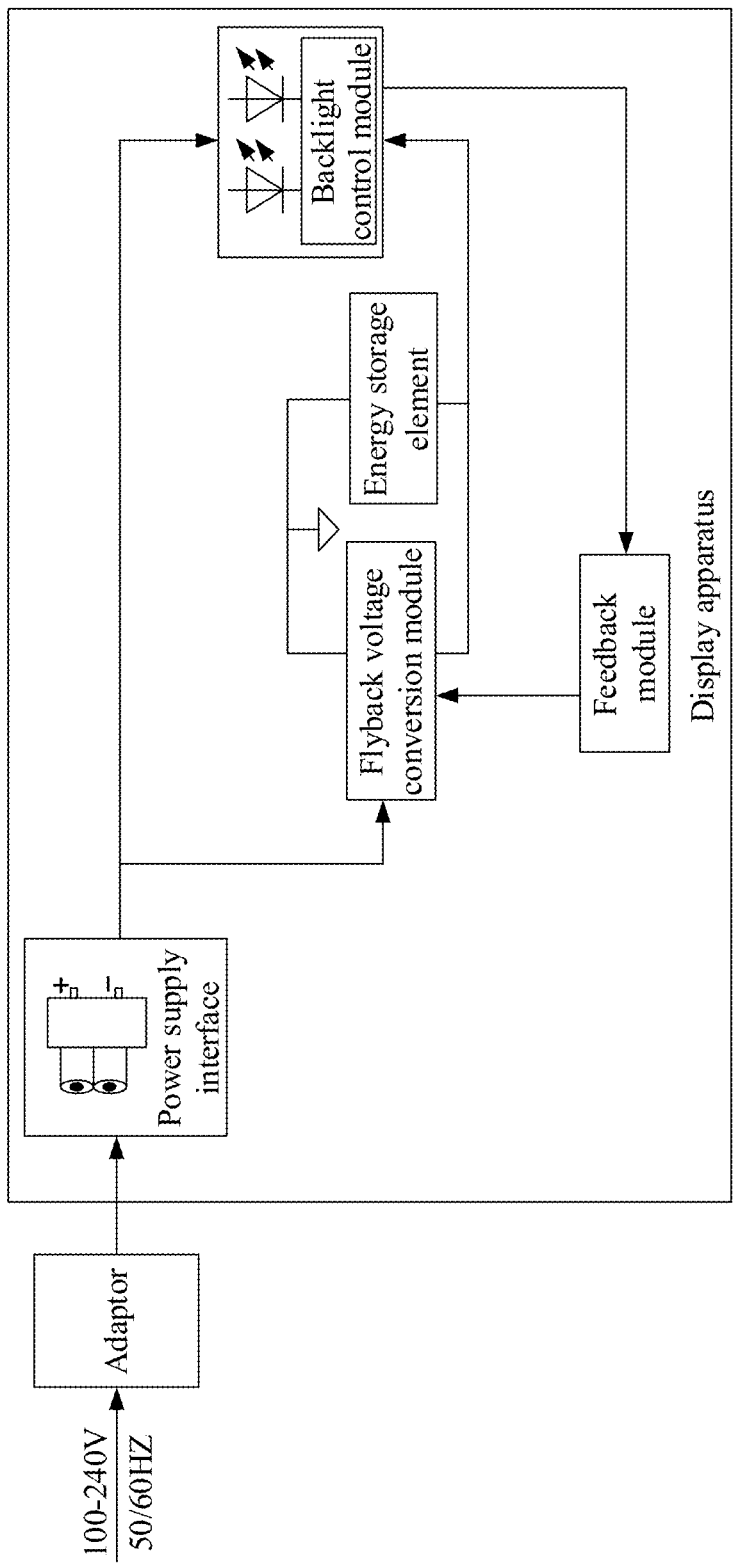
FIG. 23 is another schematic structural diagram of a power supply circuit of a display apparatus.

In some embodiments, the first voltage conversion module shown in FIG. 20 may be in the mode of flyback isolation. FIG. 23 is another schematic structural diagram of a power supply circuit of a display apparatus provided by embodiments of the disclosure. As shown in FIG. 23, the first voltage conversion module includes: a flyback voltage conversion module.

The flyback voltage conversion module is configured to generate the fifth voltage from the secondary winding while the primary winding is conducting, and transfer the fifth voltage to the negative electrode of the backlight control module. The first end of the energy storage element is connected with a positive output end of the flyback voltage conversion module and grounded, the second end of the energy storage element is connected with a negative output end of the flyback voltage conversion module. The energy storage element is configured to store the fifth voltage while the primary winding is conducting, provide the fifth voltage to the negative electrode of the backlight control module. The feedback signal is configured to instruct the flyback voltage conversion module to adjust the fifth voltage to adjust the required voltage of the backlight control module.

Specifically, in the flyback isolation voltage conversion module adopted in the embodiment, the primary winding is electrically isolated from the secondary winding. "Flyback" specifically means that when the switching transistor is turned on, the secondary winding transformer acts as an inductor, and the electric energy is converted into magnetic energy. In this case, there is no current in the output circuit. On the contrary, when the switching transistor is turned off, the secondary winding transformer releases energy, the magnetic energy is converted into the electrical energy, there is current in the output circuit. In the flyback voltage conversion module, the secondary winding transformer also acts as an energy storage inductor, which has the characteristics of fewer components, simple circuit, low cost, and small size. Meanwhile, electrical isolation improves the safety of use.

In some embodiments, the energy storage element shown in FIG. 23 may be a single energy storage capacitor or other energy storage circuits. The energy storage element cooperates with the flyback voltage conversion module to alternately output the fifth voltage, continuously providing a negative reference voltage for the backlight control module, so that the light-emitting diodes can emit light stably.

In the following, the principle of coordinating power supply between the first voltage conversion module and the energy storage element will be described in combination with the specific circuit structure schematic diagram of the flyback voltage conversion module and the energy storage element.

Figure 24:
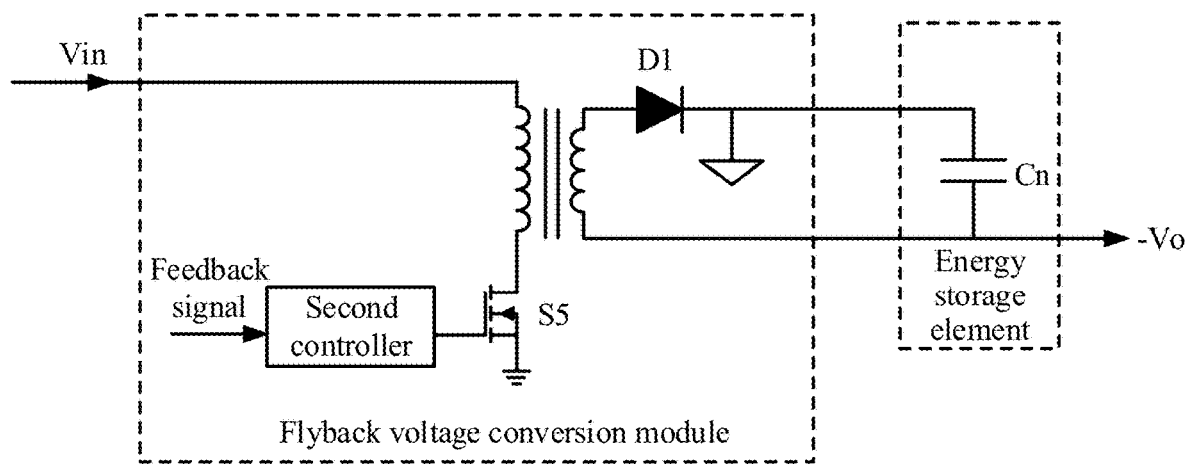
FIG. 24 is a schematic structural diagram of a power supply circuit of a flyback voltage conversion module.

In some embodiments, FIG. 24 is a schematic structural diagram of a power supply circuit with a flyback voltage conversion module provided in embodiments of the disclosure. The flyback voltage conversion module includes: a primary winding, a secondary winding, a first diode D1, a second controller and a fifth switch S5.

A first end of the primary winding is provided with the DC input voltage Vin, a second end of the primary winding is connected with a first end of the fifth switch S5. A second end of the fifth switch S5 is grounded. The secondary winding is coupled to the primary winding, and a first end of the secondary winding is connected with a positive electrode of the first diode D1. A negative electrode of the first diode D1 serves as the positive output end of the flyback voltage conversion module, and is connected with the first end of the energy storage element Cn, and grounded. A second end of the secondary winding serves as the negative output end of the flyback voltage conversion module, and is connected with the second end of the energy storage element Cn to output the fifth voltage −Vo.

The second controller is connected with a control end of the fifth switch S5, and is configured to adjust the fifth voltage −Vo by controlling the switching frequency of the fifth switch S5 according to the feedback signal.

Based on the power supply circuit shown in FIG. 24, the principle of the cooperation between the flyback voltage conversion module and the energy storage element to provide a negative reference voltage for the negative electrode of the backlight control module is as follows.

Step (1): The second controller controls the fifth switch S5 to be turned on, the current of the primary winding increases linearly, and the energy stored in the inductor increases; the first diode D1 is not turned on. The energy storage voltage of the primary winding can be controlled by controlling the switching frequency of the fifth switch S5.

Step (2): The second controller controls the fifth switch S5 to be turned off, the current of the primary winding is cut off, and the first diode D1 is turned on. The first end of the secondary winding is grounded through the first diode D1, and the second end of the secondary winding can output a fifth voltage −Vo by setting the turns ratio of the primary winding and the secondary winding, to provide a negative reference voltage to the negative electrode of the backlight control module. Meanwhile, the secondary winding charges the energy storage element Cn, so that the energy storage voltage of the energy storage element Cn is Vo after charging. Since the first end of the energy storage element Cn is grounded, the voltage at the second end of the energy storage element Cn is −Vo (i.e., the fifth voltage).

Step (3): The second controller controls the fifth switch S5 to be turned on, and step (1) of the energy storage process of the primary winding is repeated. In this case, the first end of the energy storage element Cn is grounded, and the second end of the energy storage element Cn provides a negative reference voltage, i.e., the fifth voltage −Vo, to the negative electrode of the backlight control module.

The above-mentioned power supply circuit shown in FIG. 24 generates the fifth voltage −Vo based on the DC input voltage Vin, and provides the fifth voltage −Vo to the negative electrode of the backlight control module as the negative reference voltage of the backlight control module. Combined with the DC input voltage Vin inputted by the positive electrode of the backlight control module, the voltage across the backlight control module is equal to the sum of the absolute values of the DC input voltage Vin and the fifth voltage, that is, the required voltage Vled of the backlight control module is equal to (Vin+Vo).

For the power supply circuit shown in FIG. 24, it is only necessary to control the magnitude of the fifth voltage −Vo to control the variation of the required voltage Vled of the backlight control module. Based on the feedback signal, the second controller controls the amount of charge transfer by controlling the switching frequency or duty cycle of the fifth switch S5, so as to achieve the purpose of controlling the required voltage Vled of the backlight control module.

The DC input voltage Vin is relatively stable, which is considered as a "fixed voltage". The fifth voltage −Vo is considered as a "variable voltage". Since the DC input voltage Vin is relatively stable, the voltage variation range of the output fifth voltage −Vo depends on the required variation range of the required voltage Vled of the backlight control module. The above-mentioned circuit structure using the fixed voltage and the variable voltage to supply power to the backlight control module is "stepped power supply", which can reduce the requirements such as the withstand voltage value of the electrical components in the first voltage conversion module, so as to reduce costs, improve efficiency, and reduce heat loss on electrical components.

Figure 25:
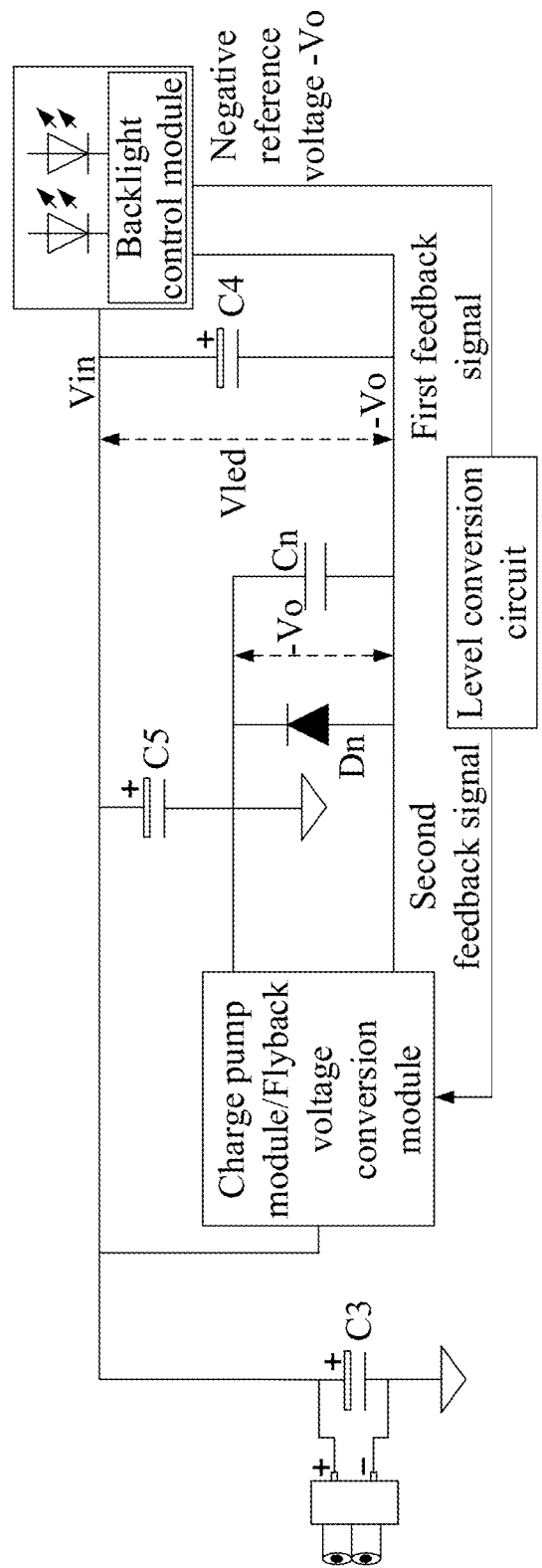
FIG. 25 is a schematic structural diagram of a level conversion circuit.

FIG. 25 is a schematic structural diagram of a level conversion circuit provided by embodiments of the disclosure. In some embodiments, the feedback module includes a level conversion circuit. The level conversion circuit is configured to receive the first feedback signal output from the backlight control module, convert the first feedback signal into a second feedback signal, and output the second feedback signal to the first voltage conversion module. The reference voltages of the first feedback signal and the second feedback signal are different.

Since the reference voltage of the backlight control module is −Vo and the reference voltage of the first voltage conversion module is 0, the first feedback signal generated by the backlight control module cannot be directly sent to the first voltage conversion module. Based on this, the level conversion circuit converts the first feedback signal whose reference low level is −Vo into the second feedback signal whose reference voltage is 0. For the level conversion circuit, a reference may be made to the related art.

In some embodiments, the display apparatus further includes a first filter module. The first filter module is connected with the power supply interface and the first voltage conversion module, and is configured to filter the DC input voltage. The first filter module may be a filter circuit including one or more grounded capacitors, or a filter circuit including capacitors and inductors. As shown in FIG. 25, the first filter module takes the first filter capacitor C3 as an example, and the first filter capacitor C3 is connected in parallel between the DC input voltage of the power supply interface and the ground. The first filter capacitor C3 is configured to filter the clutter and AC components of the power supply, smooth the pulsating DC voltage, and store electrical energy. The capacitance of the first filter capacitor C3 is related to the load current and the purity of the power supply, and a larger-capacity filter capacitor is usually selected.

In some embodiments, the first filter capacitor C3 may be an electrolytic capacitor as shown in FIG. 25. The electrolytic capacitor is a kind of capacitor. The metal foil is the positive electrode (aluminum or tantalum), and the oxide film (aluminum oxide or tantalum pentoxide) close to the metal is the dielectric. The cathode is made of conductive material, electrolyte (the electrolyte can be liquid or solid) and other materials together, because the electrolyte is the main part of the cathode. The capacitance per unit volume of the electrolytic capacitor is very large. Since the preparation materials are common industrial materials and the preparation process is also performed by a common industrial process, the electrolytic capacitors can be mass-produced, so the cost is relatively low. It should be noted that the positive and negative of electrolytic capacitors cannot be connected incorrectly.

In some embodiments, the first filter capacitor C3 can also be other types of capacitors, such as ceramic tape capacitors, film capacitors, mica capacitors, and the like. In the actual circuit, it can be selected according to the capacitance requirement.

In some embodiments, the display apparatus further includes a second filter module. The second filter module is disposed between the positive electrode and the negative electrode of the backlight control module. The second filter module may be a filter circuit including one or more grounded capacitors, or a filter circuit including capacitors and inductors. As shown in FIG. 25, the second filter module takes the second filter capacitor C4 as an example to stabilize the voltage across the backlight control module.

In the display apparatus according to some embodiments, a third filter module is further provided to filter the clutter in the DC input voltage Vin input to the positive electrode of the backlight control module. As shown in FIG. 25, the third filter module takes the third filter capacitor C5 as an example, one end of the third filter capacitor C5 is provided with the DC input voltage Vin, and the other end of the third filter capacitor C5 is grounded.

In some embodiments, the display apparatus further includes a second diode Dn. A positive electrode of the second diode Dn is connected with the second end of the energy storage element Cn, and the negative electrode of the second diode Dn is connected with the first end of the energy storage element Cn. Using the second diode Dn to make the backlight control module and the negative electrode of the power supply interface form a current loop, to prevent the current from flowing through the first voltage conversion module when the first voltage conversion module is not working, causing system malfunction or other abnormal conditions, and protect the function of the first voltage conversion module.

Figure 26:
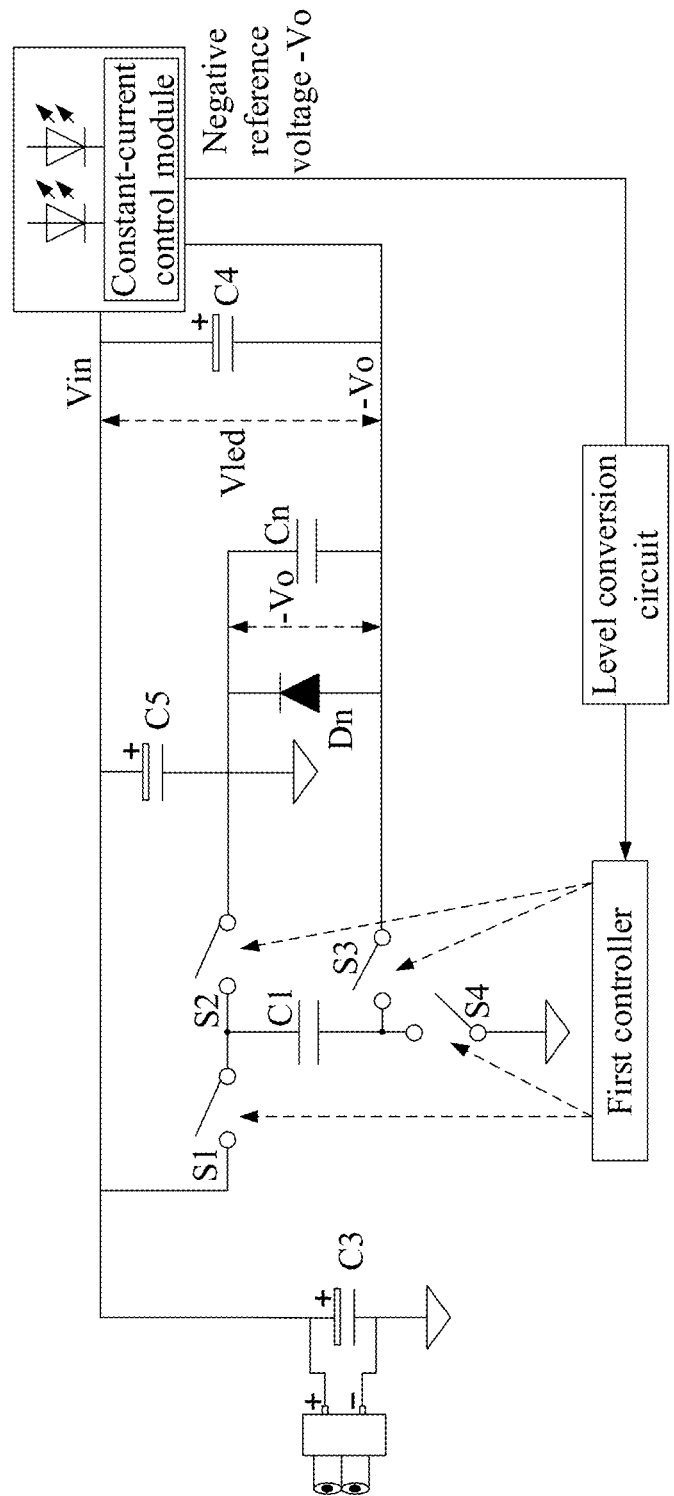
FIG. 26 is a schematic structural diagram of a level conversion circuit based on a power supply circuit with a charge pump module.
Figure 27:
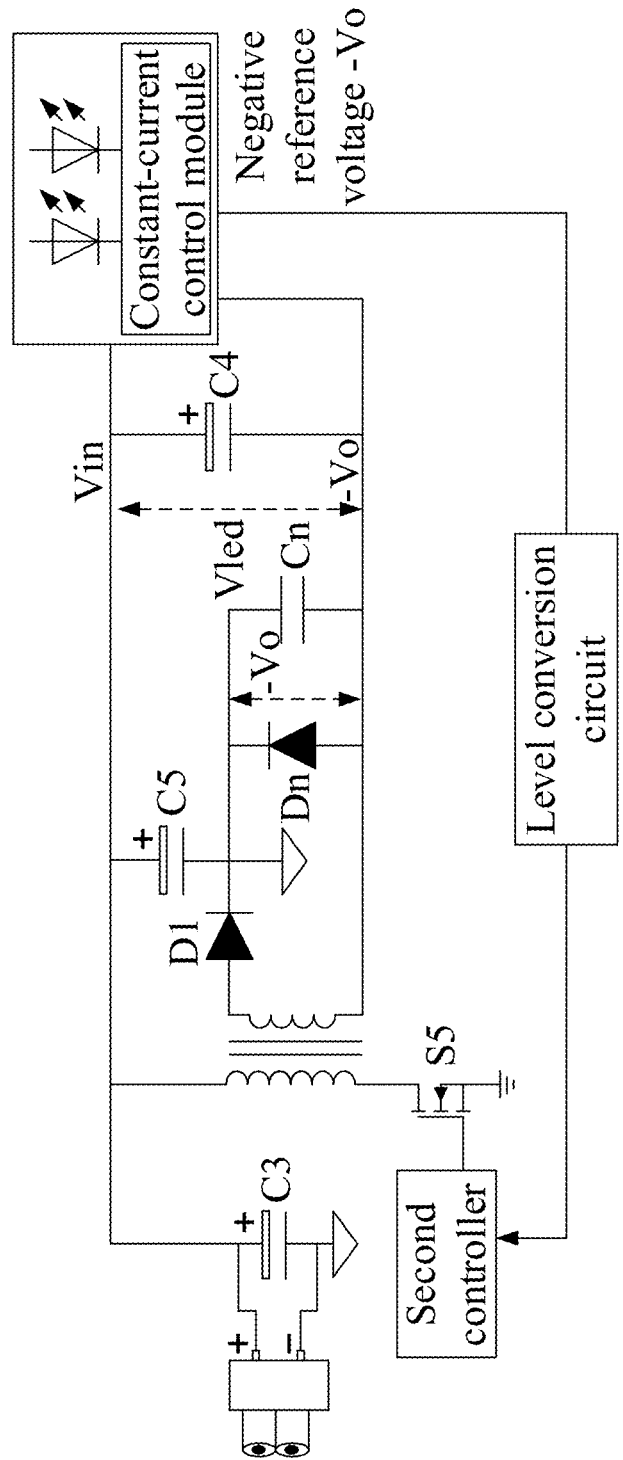
FIG. 27 is a schematic structural diagram of a level conversion circuit based on a power supply circuit of a flyback voltage conversion module.

In some embodiments, FIG. 26 is a schematic structural diagram of a level conversion circuit based on a power supply circuit with a charge pump module provided in embodiments of the disclosure. FIG. 22 is taken as an example for the charge pump module, and the power supply principle will not be repeated here. In some embodiments, FIG. 27 is a schematic structural diagram of a level conversion circuit based on a power supply circuit of flyback voltage conversion module provided in embodiments of the disclosure. The flyback voltage conversion module is shown in FIG. 24 as an example. The principle of power supply will not be repeated.

Figure 28:
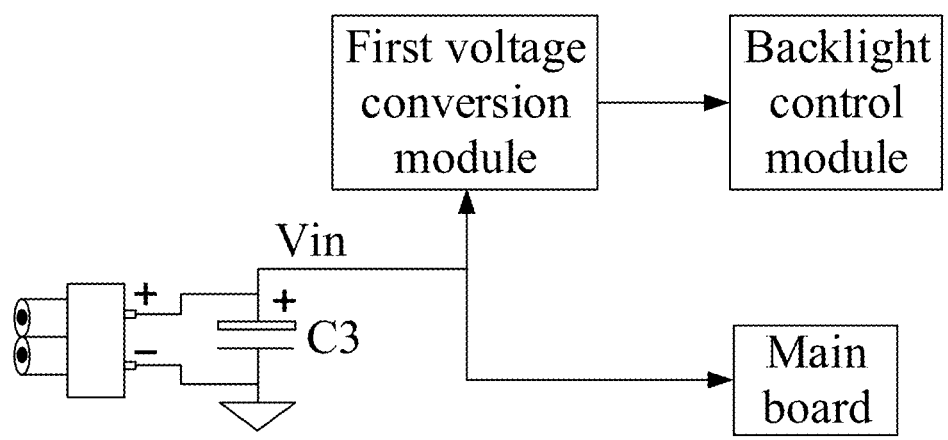
FIG. 28 is a schematic structural diagram of a circuit for supplying power to a main board.

In some embodiments, the display apparatus provided in the embodiment further includes a main board. The main board is connected with the power supply interface. The DC input voltage is used for supplying power to the main board. FIG. 28 is a schematic structural diagram of a circuit for supplying power to a main board provided by embodiments of the disclosure. When the DC input voltage is equal to the required voltage of the main board, the main board can be directly powered by the DC input voltage.

Figure 29:
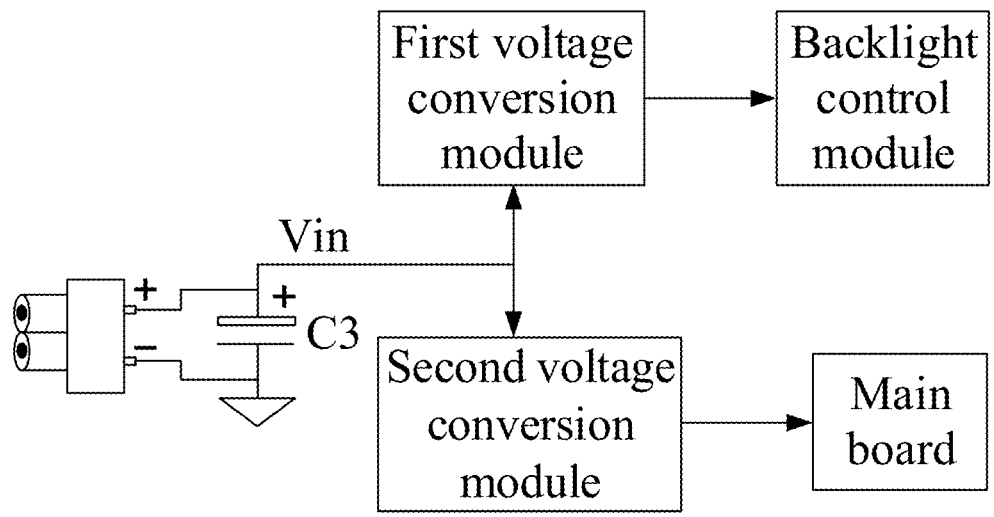
FIG. 29 is another schematic structural diagram of a circuit for supplying power to a main board.

In some embodiments, the display apparatus further includes a second voltage conversion module. The second voltage conversion module is connected with the power supply interface and the main board, and is configured to output a sixth voltage according to the DC input voltage. The sixth voltage is the required voltage of the main board. FIG. 29 is another schematic structural diagram of a circuit for supplying power to a main board provided by embodiments of the disclosure. When the DC input voltage does not meet the required voltage of the main board, the second voltage conversion module can be configured to perform DC-DC voltage conversion on the DC input voltage. When the power of the TV is high, in order to reduce the loss on the cable, the current can be reduced by increasing the voltage, so the DC input voltage will be higher than the required voltage of the main board. In some embodiments, since the main board generally requires a fixed voltage, the second voltage conversion module may use a buck circuit for stepping down voltage, a boost-buck circuit for stepping up/down voltage, or the like.

An embodiment of the disclosure further provides a display control method, which is applied to the aforementioned display apparatus. The display control method includes: receiving a feedback signal, where the feedback signal is generated by the backlight control module and sent via the feedback module; based on the feedback signal, adjusting the fifth voltage to adjust the required voltage of the backlight control module. In the embodiment, according to the real-time current feedback signal output from the backlight control module, the fifth voltage generated by the first voltage conversion module is adjusted, and then the required voltage of the backlight control module is adjusted, so that the backlight control module works at the rated current to prevent over-large current from flowing through the LED components in the LED light strip, causing damage to the LED components.

According to the display apparatus and the display control method provided by the embodiments of the disclosure, the display apparatus includes: a backlight control module configured to control light emitting diodes to emit light, where the light emitting diodes are configured to light up the screen of the display apparatus; a power supply interface configured to receive DC input voltage provided by an external adapter; a first voltage conversion module configured to generate a fifth voltage according to the DC input voltage; an energy storage element connected with the first voltage conversion module and configured to store energy of the fifth voltage; the energy storage element and the first voltage conversion module output alternately the fifth voltage; a negative electrode of the backlight control module is provided with the fifth voltage; the fifth voltage serves as a negative reference voltage of the backlight control module; a positive electrode of the backlight control module is provided with the DC input voltage; a sum of the absolute values of the DC input voltage and the fifth voltage is equal to the required voltage of the backlight control module; a feedback module configured to send a feedback signal generated by the backlight control module to the first voltage conversion module, where the feedback signal is configured to instruct the first voltage conversion module to adjust the fifth voltage to adjust the required voltage of the backlight control module.

The embodiments of the disclosure provide a power supply interface connected with an external adapter to receive the DC input voltage to adapt to the power supply mode of the external adapter. The fifth voltage generated by using the DC input voltage serves as the negative reference voltage of the backlight control module. The fifth voltage and the DC input voltage connected with the positive electrode of the backlight control module form a stepped power supply, which is beneficial to reduce heat loss. The energy storage element is configured to continuously supply power to the backlight control module. The power supply voltage of the backlight control module is adjusted in time through real-time feedback, so that the light-emitting diodes work stably.

In order to use the DC voltage output from the external adapter to meet the power supply requirements of the load in the display apparatus, the disclosure further provides the following embodiments.

Figure 30:
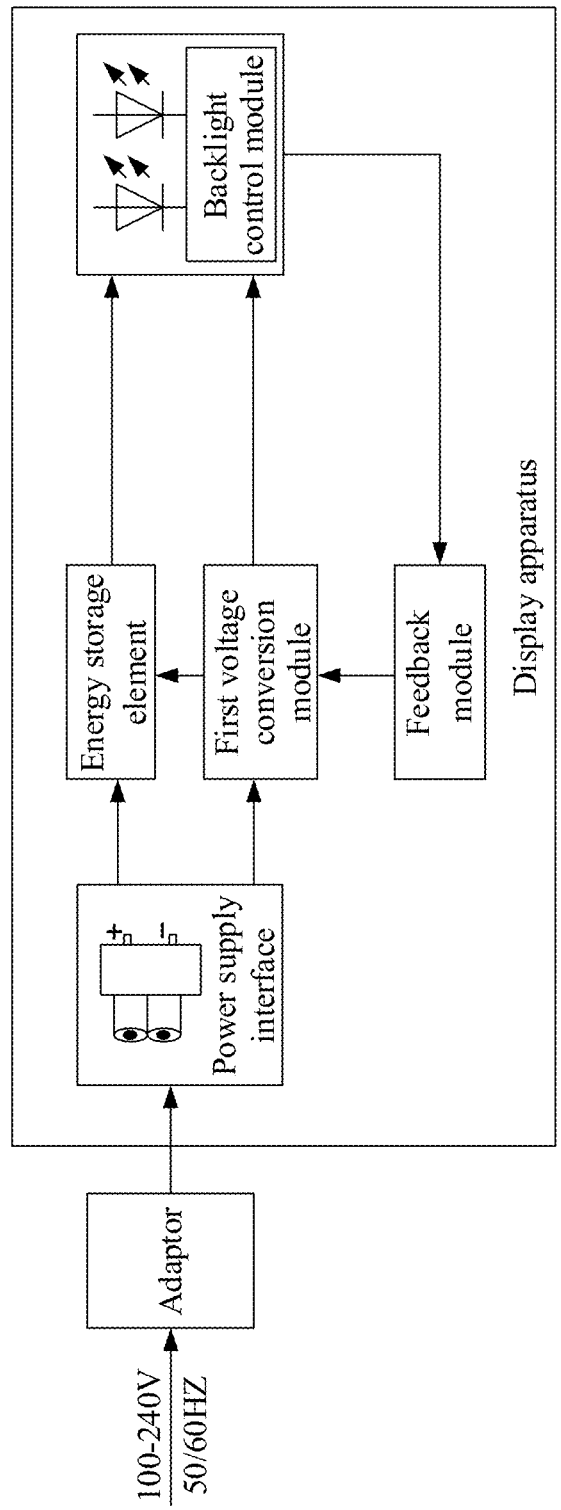
FIG. 30 is a schematic structural diagram of a power supply circuit of a display apparatus.

FIG. 30 is another schematic structural diagram of a power supply circuit of display apparatus provided by embodiments of the disclosure, and the power supply circuit includes: a backlight control module, a power supply interface, a third voltage conversion module, an energy storage element, and a feedback module.

The backlight control module is configured to control light-emitting diodes (LEDs) to emit light to light up a screen of the display apparatus. The power supply interface is configured to receive a DC input voltage provided by the external adapter. The third voltage conversion module is configured to generate an additional voltage according to the DC input voltage, and superimpose the additional voltage with the DC input voltage to output a superimposed ninth voltage, which is the required voltage of the backlight control module. A first end of the energy storage element is connected with the third voltage conversion module, and a second end of the energy storage element is provided with the DC input voltage to store the additional voltage. The energy storage element and the third voltage conversion module alternately output the ninth voltage. The feedback module is configured to send a feedback signal generated by the backlight control module to the third voltage conversion module. The feedback signal is configured to instruct the third voltage conversion module to adjust the ninth voltage.

As shown in FIG. 30, the external adapter receives AC power (100V-240V, 50-60 Hz) from the mains supply, and a internal circuit of the external adapter can be shown in FIG. 19, including at least a filter-and-rectifier module, a PFC module, and an LLC isolation voltage conversion module. This external adapter outputs a fixed DC voltage. The display apparatus is provided with a power supply interface connected with the external adapter for receiving a DC input voltage, so as to adapt to the power supply mode of the external adapter shown in FIG. 19. Compared with FIG. 16 to FIG. 18, there is no need to arrange the filter-and-rectifier module, the PFC module, and the LLC conversion module on the power board of the display apparatus, which is beneficial to simplify the circuit.

In some embodiments, the energy storage element shown in FIG. 30 may be a single energy storage capacitor or other energy storage circuits. The energy storage element cooperates with the third voltage conversion module to alternately output the ninth voltage to continuously supply power to the backlight control module so that the light-emitting diodes can emit light stably.

Figure 31:
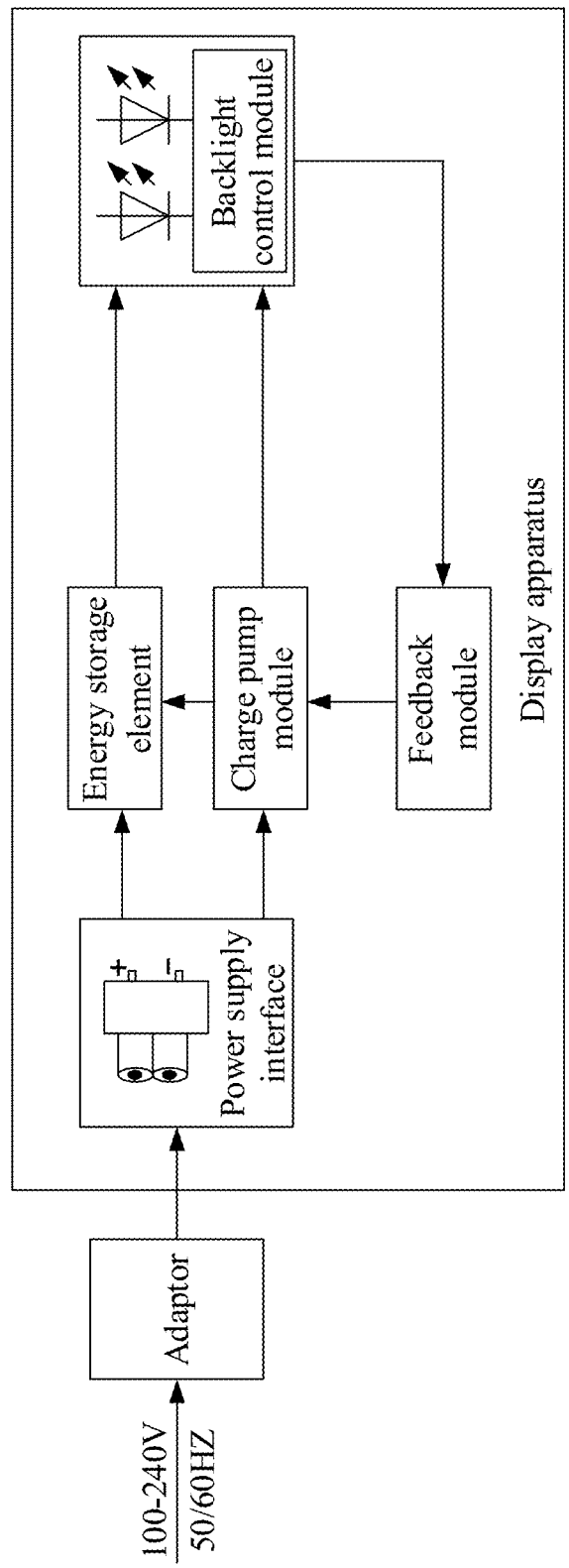
FIG. 31 is another schematic structural diagram of a power supply circuit of a display apparatus.

In some embodiments, the third voltage conversion module shown in FIG. 30 may be in the form of a charge pump. FIG. 31 is another schematic structural diagram of a power supply circuit of display apparatus provided by embodiments of the disclosure. As shown in FIG. 31, the third voltage conversion module includes: a charge pump module configured to, in a charging state, generate an additional voltage; and in a discharging state, superimpose the additional voltage and a DC input voltage to generate a ninth voltage and output the ninth voltage obtained by superposition to the backlight control module. A first end of the energy storage element is connected with an output end of the charge pump module. The energy storage element is configured to store the additional voltage while the charge pump module is discharged, and while the charge pump module is charged, superimpose the additional voltage to the DC input voltage, and output the superimposed ninth voltage to the backlight control module. The feedback signal is configured to instruct the charge pump module to adjust the ninth voltage by adjusting the additional voltage.

Specifically, the third voltage conversion module in the form of a charge pump in the embodiment is a non-inductive DC-DC power converter, that is, there is no inductive element in the voltage conversion module in the form of a charge pump, so the principle of voltage conversion does not involve high-speed conversion of a magnetic field, that is, the high-speed conversion of electricity-magnetism and magneto-electricity, the problem of electromagnetic interference can be almost ignored. The principle of voltage conversion in the form of a charge pump is to utilize high-speed charging and discharging of internal capacitive elements, so it has the advantage of low electromagnetic interference. In addition to low electromagnetic interference, it also has the advantages of larger output voltage adjustment range, high efficiency, small size, low quiescent current, low minimum operating voltage, and low noise. In addition, the integration of capacitors is easier and cheaper than the integration of inductors, so the third voltage conversion module in the form of a charge pump is easier to achieve high integration, and the cost for the overall application circuit is not high.

In some embodiments, the energy storage element shown in FIG. 31 may be a single energy storage capacitor or other energy storage circuits. The energy storage element cooperates with the charge pump module to alternately output the ninth voltage to continuously supply power to the backlight control module so that the light-emitting diodes can emit light stably.

In the following, the principle of coordinating power supply between the third voltage conversion module and the energy storage element will be described in combination with the specific circuit structure schematic diagram of the charge pump module and the energy storage element.

Figure 32:
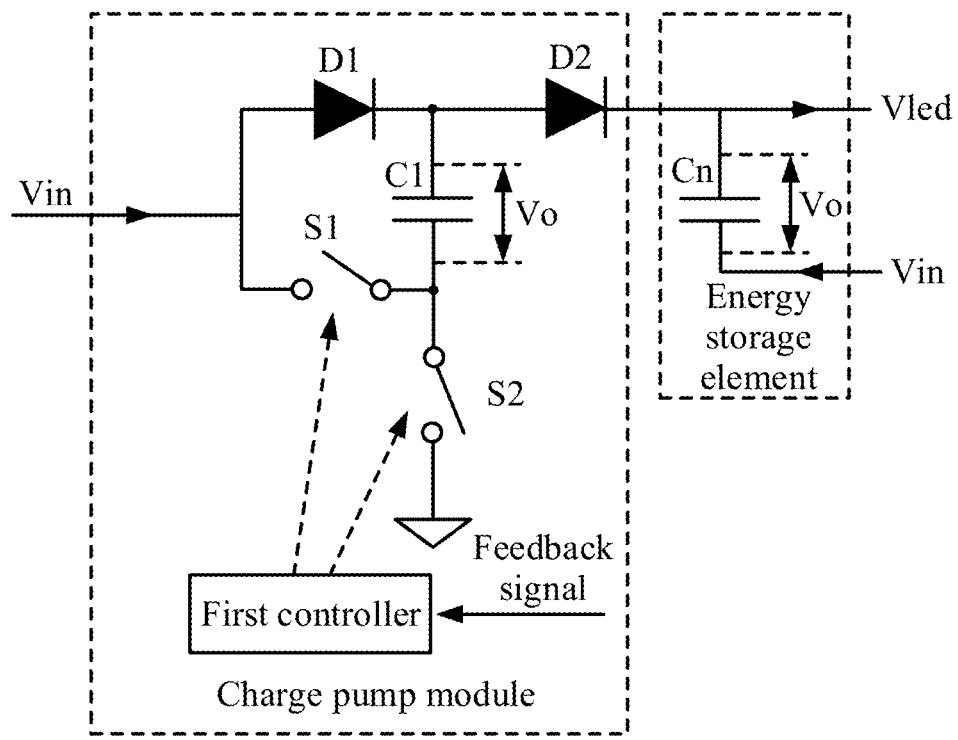
FIG. 32 is a schematic structural diagram of a power supply circuit with a charge pump module.

In some embodiments, FIG. 32 is a schematic structural diagram of a power supply circuit with a charge pump module provided in embodiments of the disclosure. The charge pump module includes: a first controller, a first storage capacitor C1, a first diode D1, a second diode D2, a first switch S1 and a second switch S2.

A positive electrode of the first diode D1 is provided with a DC input voltage Vin, and a negative electrode of the first diode D1 is connected with a positive electrode of the second diode D2. A negative electrode of the second diode D2 serves as an output end of the charge pump module, and outputs a ninth voltage Vled. A first end of the first switch S1 is connected with a positive electrode of the first diode D1, a second end of the first switch S1 is connected with a first end of the second switch S2, and a second end of the second switch S2 is grounded. A first end of the first energy storage capacitor C1 is connected with the negative electrode of the first diode D1, and a second end of the first energy storage capacitor C1 is connected with the second end of the first switch S1.

The first controller is connected with control ends of the first switch S1 and the second switch S2, and is configured to control the switching frequency of the first switch S1 and the second switch S2 according to a feedback signal, so as to adjust the additional voltage. The switching states of the first switch S1 and the second switch S2 are different.

As shown in FIG. 32, the energy storage element takes a single energy storage capacitor as an example. A second end of the energy storage element Cn is provided with the DC input voltage Vin, that is, the DC input voltage Vin is applied to the second end of the energy storage element. A physical connection can be established between the second end of the energy storage element Cn and the power supply interface, so as to apply the DC input voltage Vin to the second end of the energy storage element.

Based on the power supply circuit shown in FIG. 32, the principle of the cooperation between the third voltage conversion module and the energy storage element for power supply is as follows.

Step (1): The first controller controls the first switch S1 to be turned off, and the second switch S2 to be turned on. In this case, the DC input voltage Vin charges the first energy storage capacitor C1 via the first diode D1, so that the first end of the first energy storage capacitor C1 is at a positive voltage. By controlling the turn-off time of the first switch S1 and the turn-on time of the second switch S2, the charging time of the first energy storage capacitor C1 is controlled, thereby controlling the energy storage voltage of the first energy storage capacitor C1. Assuming that the energy storage voltage of the first energy storage capacitor C1 after charging is Vo (i.e., additional voltage), since the second end of the first energy storage capacitor is grounded, the voltage of the first end of the first energy storage capacitor is Vo.

Step (2): The first controller controls the first switch S1 to be turned on and the second switch S2 to be turned off. In this case, the DC input voltage Vin is connected with the second end of the first energy storage capacitor C1 through the first switch S1, and the first energy storage capacitor C1 is regarded as a battery whose upper end (i.e. the first end) is positive and low end (i.e. the second end) is negative, then the DC input voltage Vin is provided to the lower end of the first energy storage capacitor C1, which can be considered as two connected power supplies in series, that is, voltage superposition is performed. Therefore, the first energy storage capacitor C1 outputs the superimposed ninth voltage Vled through the negative electrode of the second diode D2. Here, Vled is equal to (Vin+Vo). In this case, for the energy storage element Cn, its first end is provided with the voltage Vled, and its second end is provided with the voltage Vin. Therefore, the energy storage element Cn is charged, and the energy storage voltage difference of the energy storage element Cn is Vo (i.e., additional voltage).

Step (3): The first controller controls the first switch S1 to be turned off, the second switch S2 to be turned on, and the charging process of the first energy storage capacitor C1 in step (1) is repeated. Meanwhile, if the energy storage element Cn is regarded as a battery whose upper end (i.e., the first end) is positive and low end (i.e., the second end) is negative, then the DC input voltage Vin is provided to the second end of the energy storage element Cn, which can be considered as two connected power supplies in serious, that is, the voltage superposition is performed. Therefore, the superimposed ninth voltage Vled is output through the first end of the energy storage element Cn. Since the voltage of the positive electrode of the second diode D2 is Vin and the voltage of the negative electrode is Vled, the conducting path is not established.

For the power supply circuit shown in FIG. 32, it is only necessary to control the magnitude of the additional voltage Vo to control the variation of the ninth voltage Vled. Based on the feedback signal, the first controller controls the amount of charge transfer by controlling the switching frequency or duty cycle of the first switch S1 and the second switch S2, so as to achieve the purpose of controlling the ninth voltage Vled. The DC input voltage Vin is relatively stable, which is considered as a "fixed voltage". The additional voltage Vo is considered as a "variable voltage". Since the DC input voltage Vin is relatively stable, the variation range of the output voltage of the additional voltage Vo depends on the required variation range of the ninth voltage Vled. The above-mentioned circuit structure using a "fixed voltage" superimposed with a "variable voltage" is a "stepped power supply", which can achieve the purpose of reducing costs and improving efficiency.

In some embodiments, the power supply circuit shown in FIG. 32 is compared to a conventional DC-DC conversion scheme. The conventional DC-DC conversion scheme uses a DC-DC circuit module to convert the DC input voltage into a required voltage. Specifically, the DC-DC circuit module may be a boost circuit, a buck circuit, a boost-buck circuit and other circuits which can step up or step voltage.

For LED components with a specification of 12V, the operating voltage range is often around 11.4-12.6V. For a light string with 4 LED components, the variation range of the power supply voltage is: 45.6-50.4V. Assuming that the input voltage is 42V, the voltage of Vled needs to be 50V, and the total output power is 100 W.

The traditional DC-DC conversion scheme takes a boost circuit as an example, assuming that the efficiency of the boost circuit is 95%, the input power is 100 W/0.95=105.2 W, and the heat loss is 5.2 W.

Based on the power supply circuit shown in FIG. 32, assuming that the additional voltage Vo is 8V, the input is 42V, and the output current is 2 A. Assuming that the efficiency of the charge pump module is 90%, the output power is 16 W, and the input power is 16 W/0.9=17.8 W, so the heat loss is 1.8 W. The overall conversion efficiency is: 100 W/(42V×2 A+17.8 W)=98.2%. The efficiency is increased by 98.2%−95%=3.2%. Meanwhile, because the conversion power of the converter is greatly reduced, the cost is also reduced.

Figure 33:
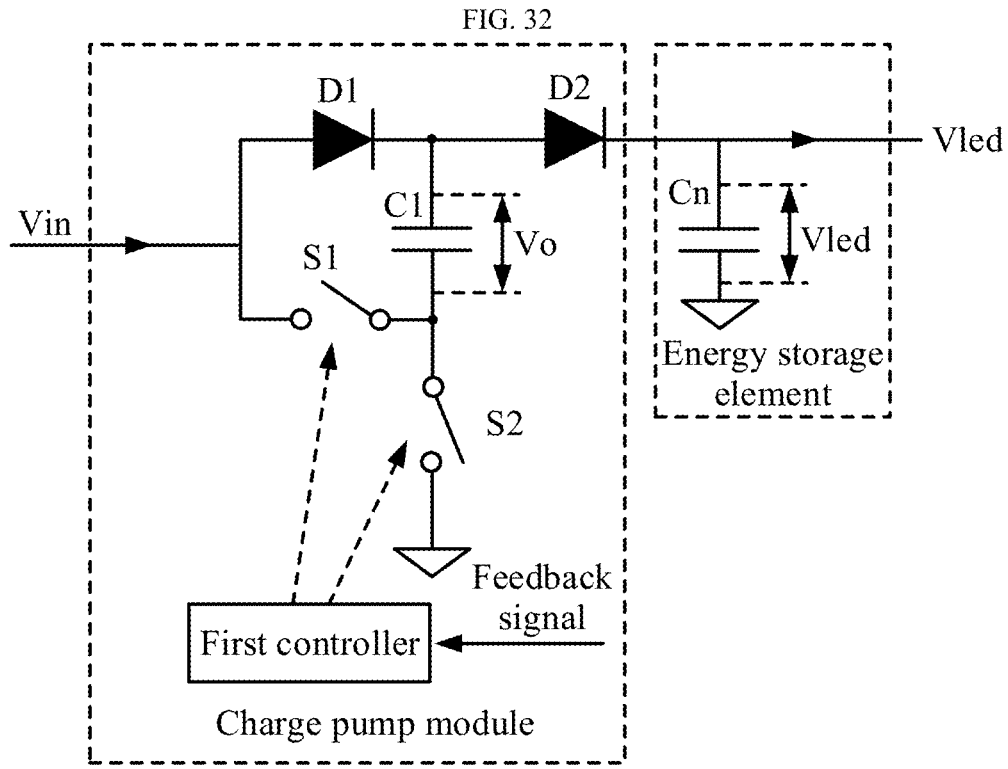
FIG. 33 is another schematic structural diagram of a power supply circuit with a charge pump module.

In some embodiments, in the power supply circuit shown in FIG. 32, the second end of the energy storage element Cn can be grounded. FIG. 33 is a schematic structural diagram of another power supply circuit of charge pump module provided by embodiments of the disclosure, which is different from FIG. 32 in that: the second end of the energy storage element Cn is grounded. Therefore, the difference between FIG. 33 and FIG. 32 in the power supply principle is that the energy storage voltage differences of the energy storage element Cn are different.

Based on the power supply circuit shown in FIG. 33, the principle of the cooperation between the third voltage conversion module and the energy storage element for power supply is as follows.

Step (1): The first controller controls the first switch S1 to be turned off, and the second switch S2 to be tuned on. In this case, the DC input voltage Vin charges the first energy storage capacitor C1 via the first diode D1, so that the first end of the first energy storage capacitor C1 is at a positive voltage. By controlling the turn-off time of the first switch S1 and the turn-on time of the second switch S2, the charging time of the first energy storage capacitor C1 is controlled, thereby controlling the energy storage voltage of the first energy storage capacitor C1. Assuming that the energy storage voltage of the first energy storage capacitor C1 after charging is Vo (i.e., superimposed voltage), since the second end of the first energy storage capacitor C1 is grounded, the voltage of the first end of the first energy storage capacitor C1 is Vo.

Step (2): The first controller controls the first switch S1 to be turned on and the second switch S2 to be turned off. In this case, the DC input voltage Vin is provided to the second end of the first energy storage capacitor C1 through the first switch S1. The first energy storage capacitor C1 is regarded as a battery whose upper end (i.e. the first end) is positive and low end (i.e. the second end) is negative, then the DC input voltage Vin is provided to the lower end of the first energy storage capacitor C1, which can be considered as two power supplies connected in series, that is, the voltage superposition is performed. Therefore, the first energy storage capacitor C1 outputs the superimposed ninth voltage Vled through the negative electrode of the second diode D2. Here, Vled is equal to (Vin+Vo). In this case, for the energy storage element Cn, its first end is provided with the voltage Vled, and its second end is provided with the voltage 0, therefore, the energy storage element Cn is charged, and the energy storage voltage difference of Cn is Vled.

Step (3): The first controller controls the first switch S1 to be turned off and the second switch S2 to be turned on, and the charging process of the first energy storage capacitor C1 in step (1) is repeated. In this case, the energy storage element Cn acts as a power supply outputting Vled to the backlight control module. Since the voltage of positive electrode of the second diode D2 is Vin and the voltage of negative electrode is Vled, a conducting path is not established.

Comparing FIG. 32 with FIG. 33, the power supply circuit shown in FIG. 32 has lower energy storage requirements for the energy storage element Cn than the power supply circuit shown in FIG. 11. Requirements on energy storage are low, and costs are low accordingly.

Figure 34:
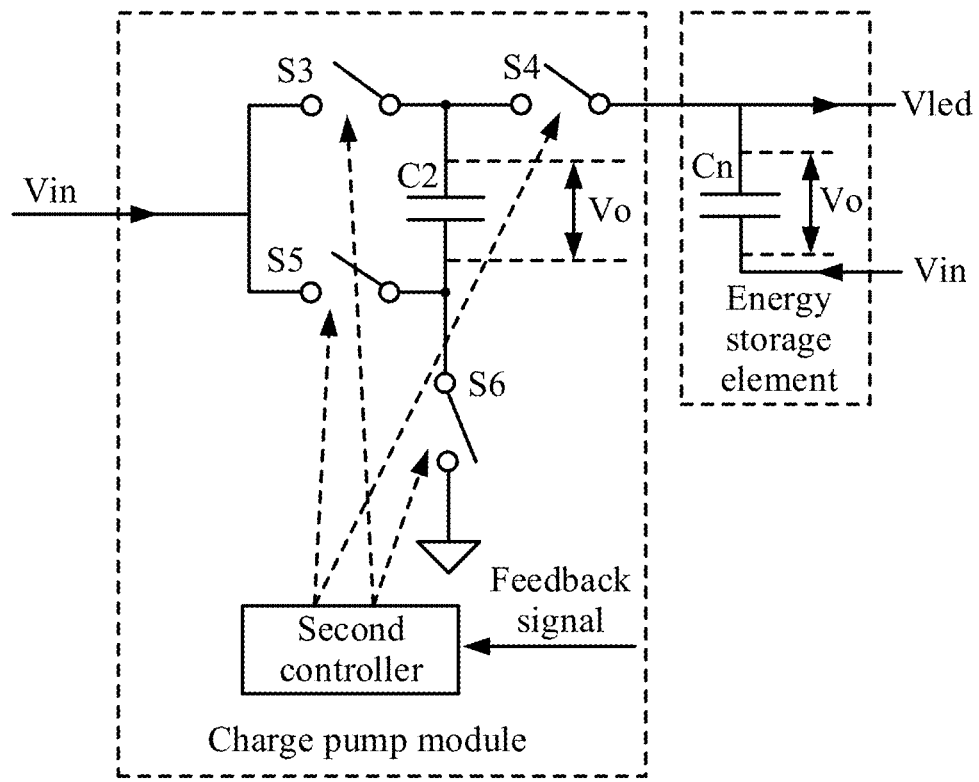
FIG. 34 is another schematic structural diagram of a power supply circuit with a charge pump module.

In some embodiments, in the power supply circuits shown in FIG. 32 and FIG. 33, the first diode D1 and the second diode D2 can be replaced with switching elements. FIG. 34 is another schematic structural diagram of a power supply circuit of charge pump module provided by embodiments of the disclosure. The charge pump module includes: a second controller, a second energy storage capacitor C2, a third switch S3, a fourth switch S4, a fifth switch S5 and a sixth switch S6.

A first end of the third switch S3 is provided with the DC input voltage Vin, a second end of the third switch S3 is connected with a first end of the fourth switch S4. A second end of the fourth switch S4 serves as an output end of the charge pump module, and outputs the ninth voltage Vled. A first end of the fifth switch S5 is connected with the first end of the third switch S3, a second end of the fifth switch S5 is connected with a first end of the sixth switch S6. A second end of the sixth switch S6 is grounded. A first end of the second energy storage capacitor C2 is connected with the second end of the third switch S3, and a second end of the second energy storage capacitor C2 is connected with the second end of the fifth switch S5.

The second controller is connected with control ends of the third switch S3, the fourth switch S4, the fifth switch S5 and the sixth switch S6, and is configured to adjust the additional voltage according to the feedback signal by controlling the switching frequency of the third switch S3, the fourth switch S4, the fifth switch S5 and the sixth switch S6. The switching states of the third switch S3 and the fourth switch S4 are different, and the third switch S3 and the sixth switch S6 are turned off or on simultaneously. The switch S4 and the fifth switch S5 are turned off or turned on simultaneously.

Based on the power supply circuit shown in FIG. 34, the principle of the cooperation between the third voltage conversion module and the energy storage element for power supply is as follows.

Step (1): The second controller controls the fourth switch S4 and the fifth switch S5 to be turned off simultaneously, and the third switch S3 and the sixth switch S6 to be turned on simultaneously. In this case, the DC input voltage Vin charges the second energy storage capacitor C2 through the turn-on third switch S3, so that the first end of the second energy storage capacitor C2 is at a positive voltage. By controlling the turn-off time of the fourth switch S4 and the fifth switch S5, and the turn-on time of the third switch S3 and the sixth switch S6, the charging time of the second energy storage capacitor C2 is controlled, and then the storage energy voltage of the second energy storage capacitor C2 is controlled. Assuming that the energy storage voltage of the second energy storage capacitor C2 after charging is Vo (i.e., additional voltage), since the second end of the second energy storage capacitor C2 is grounded, the voltage at the first end of the second energy storage capacitor C2 is Vo.

Step (2): The second controller controls the fourth switch S4 and the fifth switch S5 to be turned on simultaneously, and the third switch S3 and the sixth switch S6 to be turned off. In this case, the DC input voltage Vin is provided to the second end of the second energy storage capacitor C2 through the fifth switch S5. The second energy storage capacitor C2 is regarded as a battery whose upper end (i.e., the first end) is positive and low end (i.e., the second end) is negative, then the DC input voltage Vin is provided to the lower end of the energy capacitor C2, which can be considered as two power supplies connected in series, that is, the voltage is superimposed. Therefore, the second energy storage capacitor C2 outputs the superimposed ninth voltage Vled through the fourth switch S4. Here, Vled is equal to (Vin+Vo). In this case, for the energy storage element Cn, its first end is provided with the voltage Vled, and its second end is provided with the voltage Vin. Therefore, the energy storage element Cn is charged, and the energy storage voltage difference of Cn is Vo.

Step (3): The second controller controls the fourth switch S4 and the fifth switch S5 to be turned off simultaneously, the third switch S3 and the sixth switch S6 to be turned on simultaneously, and step (1) to charge the second energy storage capacitor C2 is repeated. Meanwhile, if the energy storage element Cn is regarded as a battery whose upper end (i.e., the first end) is positive and low end (i.e., the second end) is negative, then the DC input voltage Vin is provided to the second end of the energy storage element Cn, which can be considered as two power supplies connected in series, that is, the voltage superposition is performed. Therefore, the superimposed ninth voltage (Vin+Vo), i.e., Vled, is output through the first end of the energy storage element Cn.

For the circuit shown in FIG. 34, the change of the ninth voltage Vled can be controlled only by controlling the magnitude of the additional voltage Vo. Based on the feedback signal, the second controller controls the switching frequency or duty cycle of the third switch S3, the fourth switch S4, the fifth switch S5, and the sixth switch S6 to control the amount of charge transfer, so as to control the ninth voltage Vled. The DC input voltage Vin is relatively stable, which is considered as a "fixed voltage"; the superimposed voltage Vo is considered as a "variable voltage". Since the DC input voltage Vin is relatively stable, the variation range of the output voltage of the superimposed voltage Vo depends on the required variation range of the ninth voltage Vled. The above-mentioned circuit structure using a "fixed voltage" superimposed with a "variable voltage" is a "stepwise power supply", which can achieve the purpose of reducing costs and improving efficiency.

Figure 35:
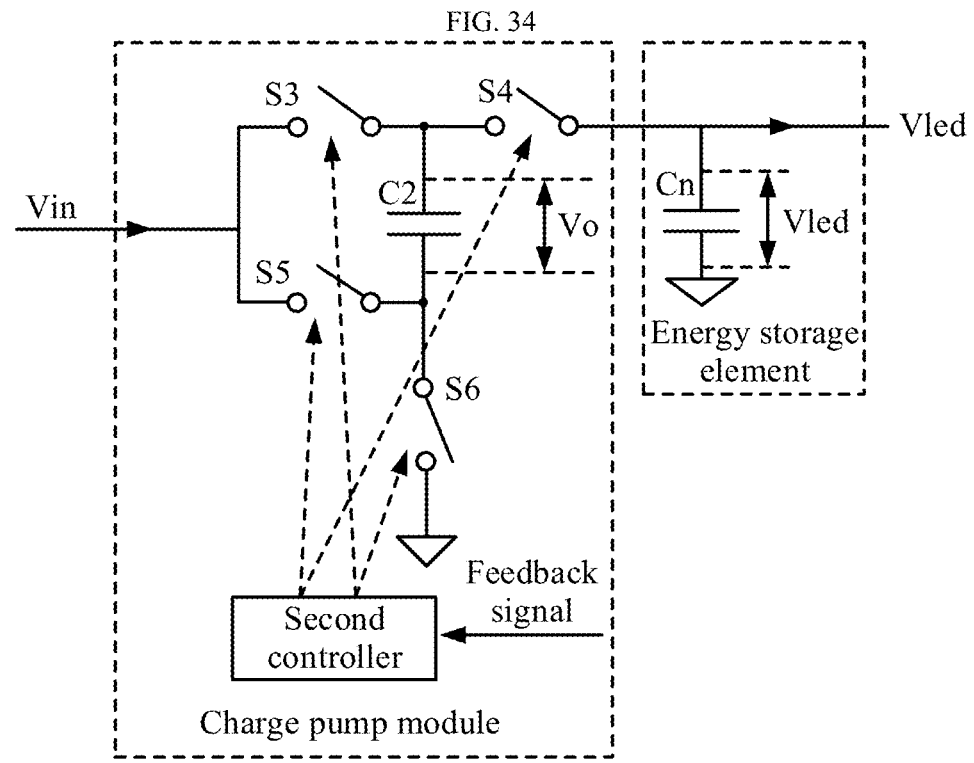
FIG. 35 is another schematic structural diagram of a power supply circuit with a charge pump module.

In some embodiments, in the power supply circuit shown in FIG. 34, the second end of the energy storage element Cn can also be grounded. FIG. 35 is a schematic structural diagram of another power supply circuit of charge pump module provided by embodiments of the disclosure, which is different from FIG. 34 in that: the second end of the energy storage element Cn is grounded. Therefore, the difference between the power supply principles in FIG. 35 and FIG. 34 is that the energy storage voltage differences of the energy storage element Cn are different.

Based on the power supply circuit shown in FIG. 35, the principle of the cooperation between the third voltage conversion module and the energy storage element for power supply is as follows.

Step (1): The second controller controls the fourth switch S4 and the fifth switch S5 to be turned off simultaneously, and the third switch S3 and the sixth switch S6 to be turned on simultaneously. In this case, the DC input voltage Vin charges the second energy storage capacitor C2 through the turn-on third switch S3, so that the first end of the second energy storage capacitor C2 is at a positive voltage. By controlling the turn-off time of the fourth switch S4 and the fifth switch S5, and the turn-on time of the third switch S3 and the sixth switch S6, the charging time of the second energy storage capacitor C2 is controlled, and then the storage energy voltage of the second energy storage capacitor C2 is controlled. Assuming that the energy storage voltage of the second energy storage capacitor C2 after charging is Vo (i.e., additional voltage), since the second end of the second energy storage capacitor C2 is grounded, the voltage of the first end of the second energy storage capacitor C2 is Vo.

Step (2): The second controller controls the fourth switch S4 and the fifth switch S5 to be turned on simultaneously, and the third switch S3 and the sixth switch S6 to be turned off simultaneously. In this case, the DC input voltage Vin is provided to the second end of the second energy storage capacitor C2 through the fifth switch S5, and the second energy storage capacitor C2 is regarded as a battery whose upper end (i.e., the first end) is positive and low end (i.e., the second end) is negative, then the DC input voltage Vin is provided to the lower end of the second energy storage capacitor C2, which can be considered as two power supplies connected in series, that is, the voltage is superimposed. Therefore, the second energy storage capacitor C2 outputs the superimposed ninth voltage Vled through the fourth switch S4. Here, Vled is equal to (Vin+Vo). In this case, for the energy storage element Cn, its first end is provided with the voltage Vled, and its second end is provided with the voltage 0, therefore, the energy storage element Cn is charged, and the energy storage voltage difference of Cn is Vled.

Step (3): The second controller controls the fourth switch S4 and the fifth switch S5 to be turned off simultaneously, the third switch S3 and the sixth switch S6 to be turned on simultaneously, and the charging process of the second energy storage capacitor C2 in step (1) is repeated. In this case, the energy storage element Cn acts as a power output Vled to supply power to the backlight control module.

Comparing FIG. 35 with FIG. 34, the power supply circuit shown in FIG. 34 has lower energy storage requirements for the energy storage element Cn than the power supply circuit shown in FIG. 13. Requirements on energy storage are low, and costs are low accordingly.

Figure 36:
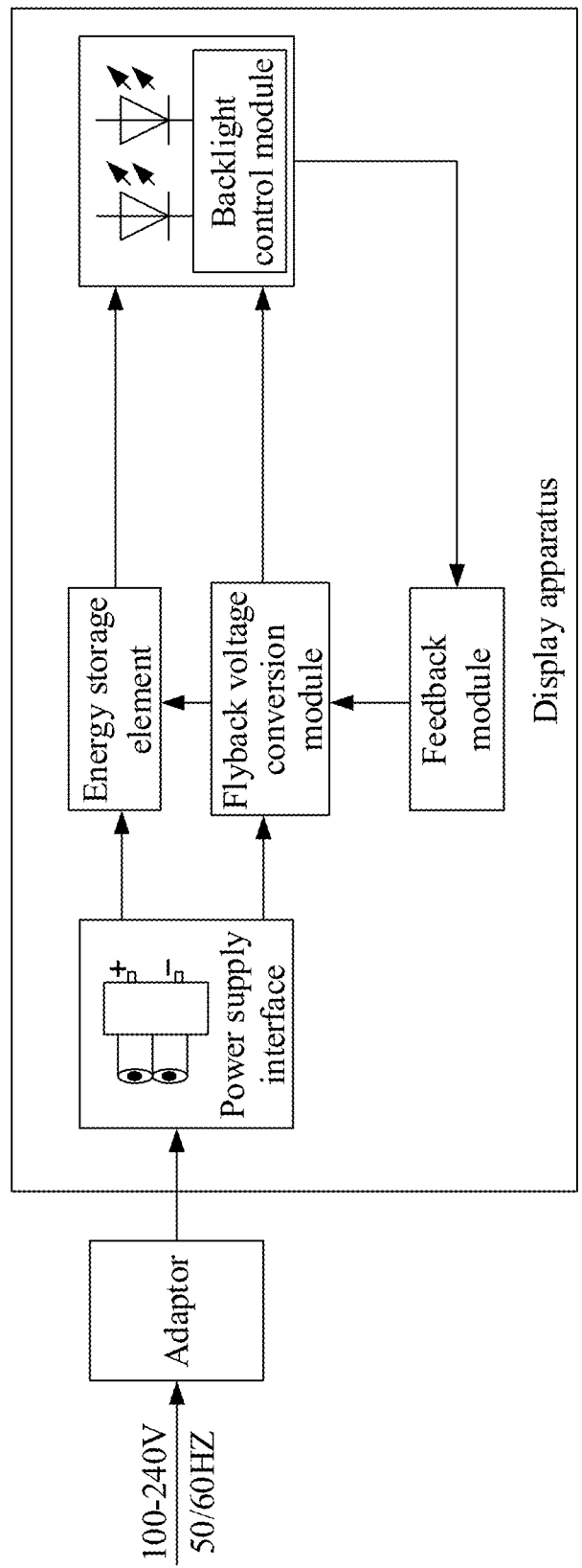
FIG. 36 is another schematic structural diagram of a power supply circuit of a display apparatus.

In some embodiments, the third voltage conversion module shown in FIG. 30 may be in the mode of flyback isolation. FIG. 36 is another schematic structural diagram of a power supply circuit of the display apparatus provided by embodiments of the disclosure. As shown in FIG. 36, the third voltage conversion module includes: a flyback voltage conversion module. The flyback voltage conversion module is configured to superimpose an additional voltage generated by the secondary winding on a DC input voltage when the primary winding is cut off, and output the superimposed ninth voltage to the backlight control module. The first end of the energy storage module is connected with an output end of the flyback voltage conversion module. The energy storage element is configured to store the additional voltage while the primary winding is cut off, and superimpose the additional voltage to the DC input voltage and output the superimposed ninth voltage to the backlight control module while the primary winding is conducting. The feedback signal is configured to instruct the flyback voltage conversion module to adjust the ninth voltage by adjusting the superimposed voltage.

Specifically, in the voltage conversion module in the mode of flyback isolation used in the embodiment, the primary winding and the secondary winding are electrically isolated, so that voltage superposition can be better completed. "Flyback" specifically means that when the switching transistor is turned on, the secondary winding transformer acts as an inductor, and the electric energy is converted into magnetic energy. In this case, there is no current in the output circuit. On the contrary, when the switching transistor is turned off, the secondary winding transformer releases energy, the magnetic energy is converted into the electric energy, there is current in the output circuit. In the flyback voltage conversion module, the secondary winding transformer also acts as an energy storage inductor, which has the characteristics of fewer components, simple circuit, low cost, and small size. Meanwhile, the electrical isolation improves the safety of use.

In some embodiments, the energy storage element shown in FIG. 36 may be a single energy storage capacitor or other energy storage circuits. The energy storage element cooperates with the flyback voltage conversion module to alternately output the ninth voltage to continuously supply power to the backlight control module so that the light-emitting diodes can emit light stably.

The power supply principle of the third voltage conversion module and the energy storage element will be described below in combination with the specific circuit structure schematic diagram of the flyback voltage conversion module and the energy storage element.

Figure 37:
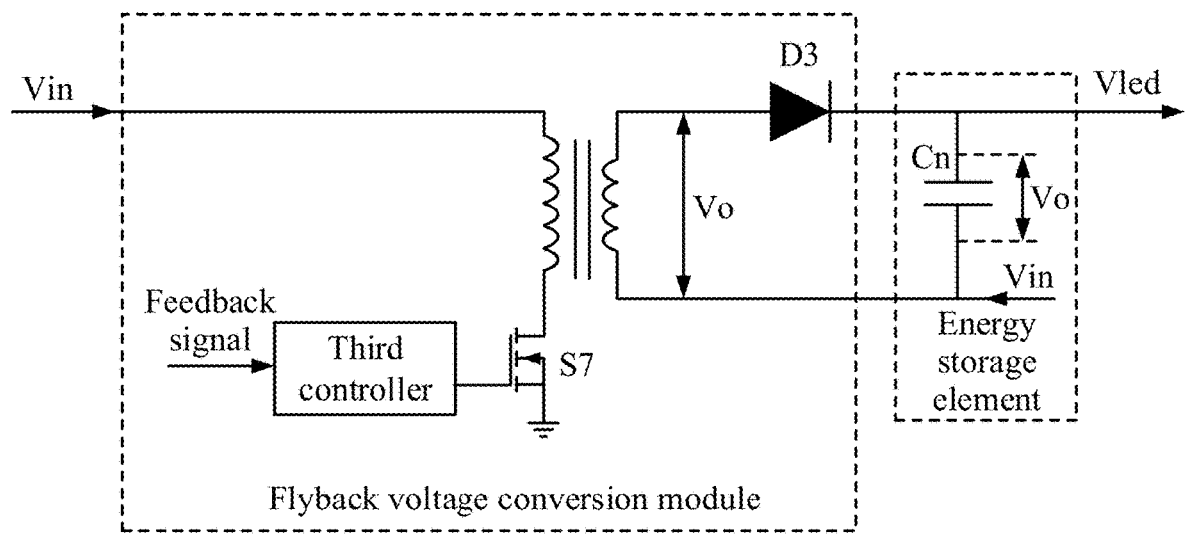
FIG. 37 is a schematic structural diagram of a power supply circuit of a flyback voltage conversion module.

In some embodiments, FIG. 37 is a schematic structural diagram of a power supply circuit with a flyback voltage conversion module provided in embodiments of the disclosure. The flyback voltage conversion module includes: a primary winding, a secondary winding, a third diode D3, a third controller, and a seventh switch S7.

A first end of the primary winding is provided with the DC input voltage Vin, a second end of the primary winding is connected with a first end of the seventh switch S7. A second end of the seventh switch S7 is grounded. The secondary winding is coupled to the primary winding, and a first end of the secondary winding is connected with a positive electrode of the third diode D3, and a second end of the secondary winding is provided with the DC input voltage Vin. A negative of the third diode D3 serves as an output end of the flyback voltage conversion module, and is configured to output the ninth voltage Vled.

The third controller is connected with a control end of the seventh switch S7, and is configured to control the switching frequency of the seventh switch S7 according to a feedback signal to control the primary winding to be conducting or cut off, so as to adjust the additional voltage.

The second end of the secondary winding is provided with the DC input voltage Vin, that is, the DC input voltage Vin is applied to the second end of the secondary winding. In some embodiments, a physical connection may be established between the second end of the secondary winding and the first end of the primary winding, so as to apply the DC input voltage Vin to the second end of the secondary winding. In some embodiments, a physical connection can be established between the second end of the secondary winding and the power supply interface, so as to apply the DC input voltage Vin to the second end of the secondary winding, which is more conducive to achieving electrical isolation.

Based on the power supply circuit shown in FIG. 37, the principle of the cooperation between the third voltage conversion module and the energy storage element for power supply is as follows.

Step (1): The third controller controls the seventh switch S7 to be turned on, the primary winding is conducting, the current in the primary winding increases linearly, and the energy stored in the inductor increases; the third diode D3 is not turned on, and the secondary winding is cut off. The energy storage voltage of the primary winding can be controlled by controlling the switching frequency of the seventh switch S7.

Step (2): The third controller controls the seventh switch S7 to be turned off, the primary winding is cut off, and the current of the primary winding is cut off; the third diode D3 is turned on, and the secondary winding is conducting. By setting the turns ratio of the primary winding and the secondary winding, the secondary winding can generate an additional voltage Vo. Meanwhile, since the second end of the secondary winding is provided with the DC input voltage Vin, after voltage superposition, the first end of the secondary winding output the superimposed ninth voltage Vled. Vled=Vin+Vo. In this case, for the energy storage element Cn, its first end is provided with the voltage Vled, and its second end is provided with the voltage Vin. Therefore, the energy storage element Cn is charged, and the energy storage voltage difference of the energy storage element Cn is Vo.

Step (3): The third controller controls the seventh switch S7 to be turned on, and step (1) of the energy storage process of the primary winding is repeated. Meanwhile, if the energy storage element Cn is regarded as a battery whose upper end (i.e., the first end) is positive and lower end (i.e., the second end) is negative, then the DC input voltage Vin is connected to the second end of the energy storage element Cn, which can be considered as two power supplies connected in series, that is, the voltage superposition is performed. Therefore, the superimposed ninth voltage Vled is output through the first end of the energy storage element Cn.

For the power supply circuit shown in FIG. 37, the change of the ninth voltage Vled can be controlled only by controlling the magnitude of the additional voltage Vo. Based on the feedback signal, the third controller controls the switching frequency or duty cycle of the seventh switch S7 to control the amount of charge transfer, so as to achieve the purpose of controlling the ninth voltage Vled. The DC input voltage Vin is relatively stable, which is considered as a "fixed voltage"; the additional voltage Vo is considered as a "variable voltage". Since the DC input voltage Vin is relatively stable, the voltage variation range of the output additional voltage Vo depends on the required variation range of the ninth voltage Vled. The above-mentioned circuit structure using a "fixed voltage" superimposed with a "variable voltage" is a "stepped power supply", which can achieve the purpose of reducing costs and improving efficiency.

Figure 38:
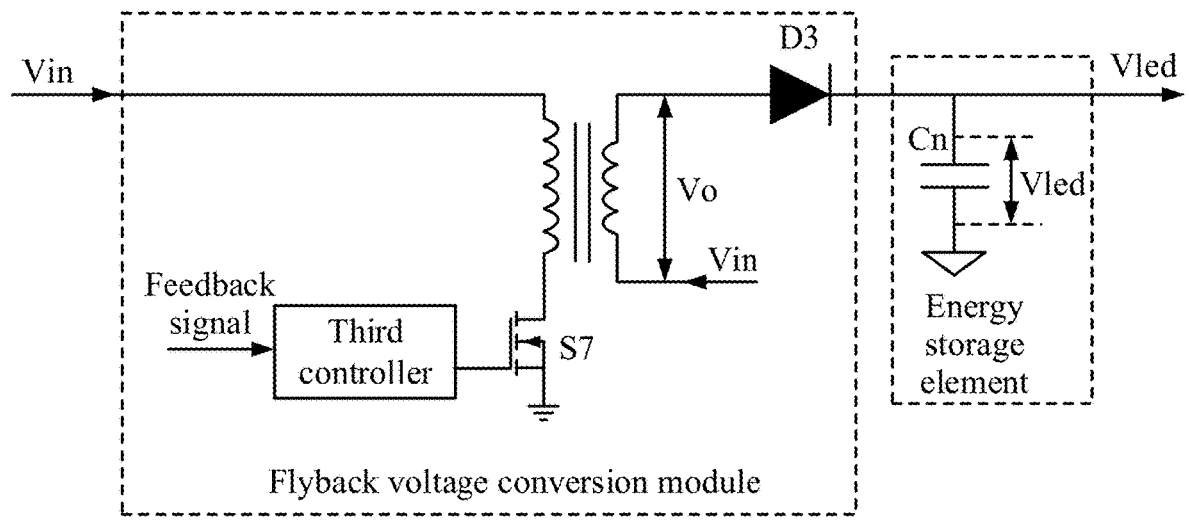
FIG. 38 is another schematic structural diagram of a power supply circuit of a flyback voltage conversion module.

In some embodiments, in the power supply circuit shown in FIG. 37, the second end of the energy storage element Cn can be grounded. FIG. 38 is another schematic structural diagram of a power supply circuit of flyback voltage conversion module provided in embodiments of the disclosure, which is different from FIG. 37 in that: the second end of the energy storage element Cn is grounded. Therefore, the difference between FIG. 38 and FIG. 37 in the power supply principle is that the energy storage voltage differences of the energy storage element Cn are different.

Based on the power supply circuit shown in FIG. 38, the principle of the cooperation between the third voltage conversion module and the energy storage element for power supply is as follows.

Step (1): The third controller controls the seventh switch S7 to be turned on, the primary winding is conducting, the current in the primary winding increases linearly, and the energy stored in the inductor increases; the third diode D3 is not turned on, and the secondary winding is cut off. The energy storage voltage of the primary winding can be controlled by controlling the switching frequency of the seventh switch S7.

Step (2): The third controller controls the seventh switch S7 to turn off, the primary winding is cut off, and the current of the primary winding is cut off; the third diode D3 is turned on, and the secondary winding is conducting. By setting the turns ratio of the primary winding and the secondary winding, the secondary winding can generate an additional voltage Vo. Meanwhile, since the second end of the secondary winding is provided with the DC input voltage Vin, after voltage superposition, the first end of the secondary winding outputs the superimposed ninth voltage Vled. Here, Vled=Vin+Vo. In this case, for the energy storage element Cn, its first end is provided with the voltage Vled, and its second end is provided with the voltage 0, therefore, the energy storage element Cn is charged, and the energy storage voltage difference of Cn is Vled.

Step (3): The third controller controls the seventh switch S7 to be turned on, and step (1) of the energy storage process of the primary winding is repeated. In this case, the energy storage element Cn is regarded as a battery whose upper end (i.e., the first end) is positive and low end (i.e., the second end) is negative, and outputs Vled to supply power to the backlight control module.

Comparing FIG. 38 with FIG. 37, the power supply circuit shown in FIG. 37 has lower energy storage requirements for the energy storage element Cn than the power supply circuit shown in FIG. 37. Energy storage requirements are low and, accordingly, costs are low.

In some embodiments, the display apparatus provided in the embodiment further includes a first filter module. The first filter module is connected with the power supply interface and the third voltage conversion module, and is configured to filter the DC input voltage. The first filter module may be a filter circuit including one or more grounded capacitors, or a filter circuit including capacitors and inductors.

Figure 39:
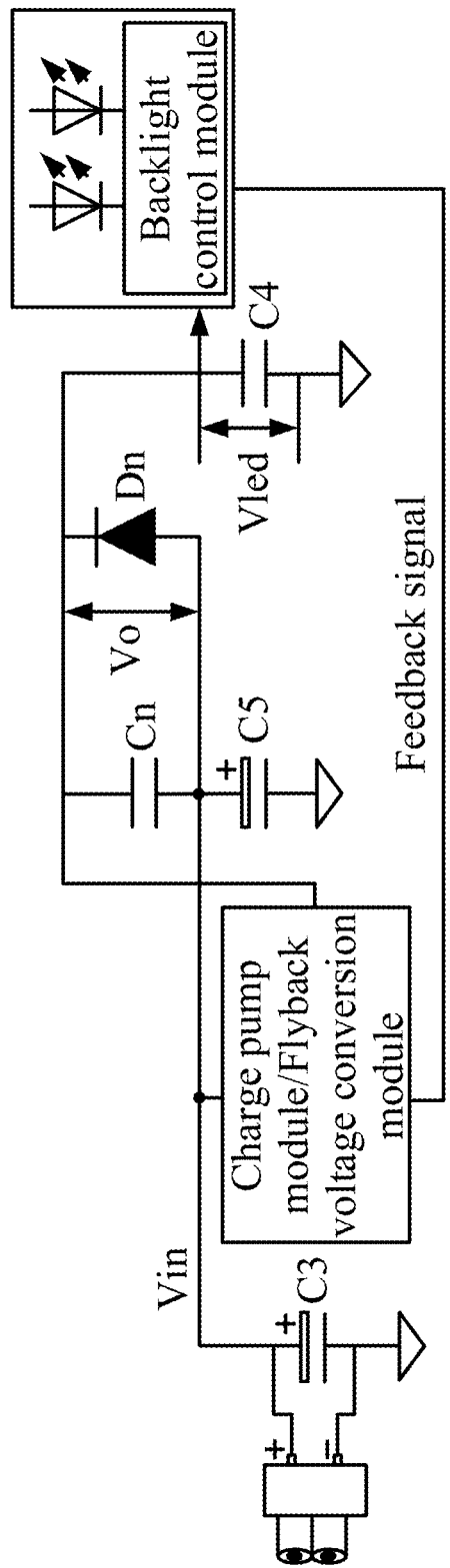
FIG. 39 is a schematic structural diagram of a filter module.

Exemplarily, FIG. 39 is a schematic structural diagram of a filter module provided in embodiments of the disclosure. The first filter module takes a grounded capacitor as an example. Specifically, a first filter capacitor C3 is connected in parallel between the DC input voltage of the power supply interface and the ground, and is configured to filter the clutter and AC components of the power supply, smooth the pulsating DC voltage, and store electrical energy. The capacitance of the first filter capacitor C3 is related to the load current and the purity of the power supply. A larger-capacity filter capacitor is usually selected.

In some embodiments, the first filter capacitor C3 may be an electrolytic capacitor as shown in FIG. 39. The electrolytic capacitor is a kind of capacitor. The metal foil is the positive electrode (aluminum or tantalum), and the oxide film (aluminum oxide or tantalum pentoxide) close to the metal is the dielectric. The cathode is made of conductive material and electrolyte (the electrolyte can be liquid or solid) and other materials together. Because the electrolyte is the main part of the cathode, the capacitance per unit volume is very large. Since the preparation materials are common industrial materials and the preparation process is performed by common industrial devices, it can be mass-produced, so the cost is relatively low. It should be noted that the positive and negative of electrolytic capacitors cannot be connected incorrectly.

In some embodiments, the first filter capacitor C3 can be other types of capacitors, such as ceramic tape capacitors, film capacitors, mica capacitors, and the like. In the actual circuit, it can be selected according to the capacitance requirement.

In some embodiments, the display apparatus provided in the embodiment further includes a second filter module. The second filter module is connected with the output end of the third voltage conversion module, and is configured to filter the ninth voltage. The second filter module may be a filter circuit including one or more grounded capacitors, or a filter circuit including capacitors and inductors. Exemplarily, as shown in FIG. 39, the filtering is performed by taking the grounded second filter capacitor C4 as an example.

As shown in FIG. 39, the second end of the energy storage element Cn is provided with the DC input voltage Vin. During the power supply process, the charge pump module or the flyback voltage conversion module cooperates with the energy storage element Cn to alternately output the ninth voltage Vled. A filter module may be provided at the connection between the DC input voltage Vin and the second end of the energy storage element Cn, for filtering the clutter and the like in the DC input voltage Vin input to the energy storage element Cn.

In some embodiments, the display apparatus provided in the embodiment further includes a fourth diode Dn. A positive electrode of the fourth diode Dn is connected with the second end of the energy storage element Cn, and a negative electrode of the fourth diode Dn is connected with the first end of the energy storage element Cn. The fourth diode Dn is configured to input the DC transfer voltage Vin to the backlight control module to form a current loop to prevent the current from flowing through the third voltage conversion module while the third voltage conversion module is not working, causing system malfunction or other abnormal conditions, and playing the role of protecting the third voltage conversion module.

Figure 40:
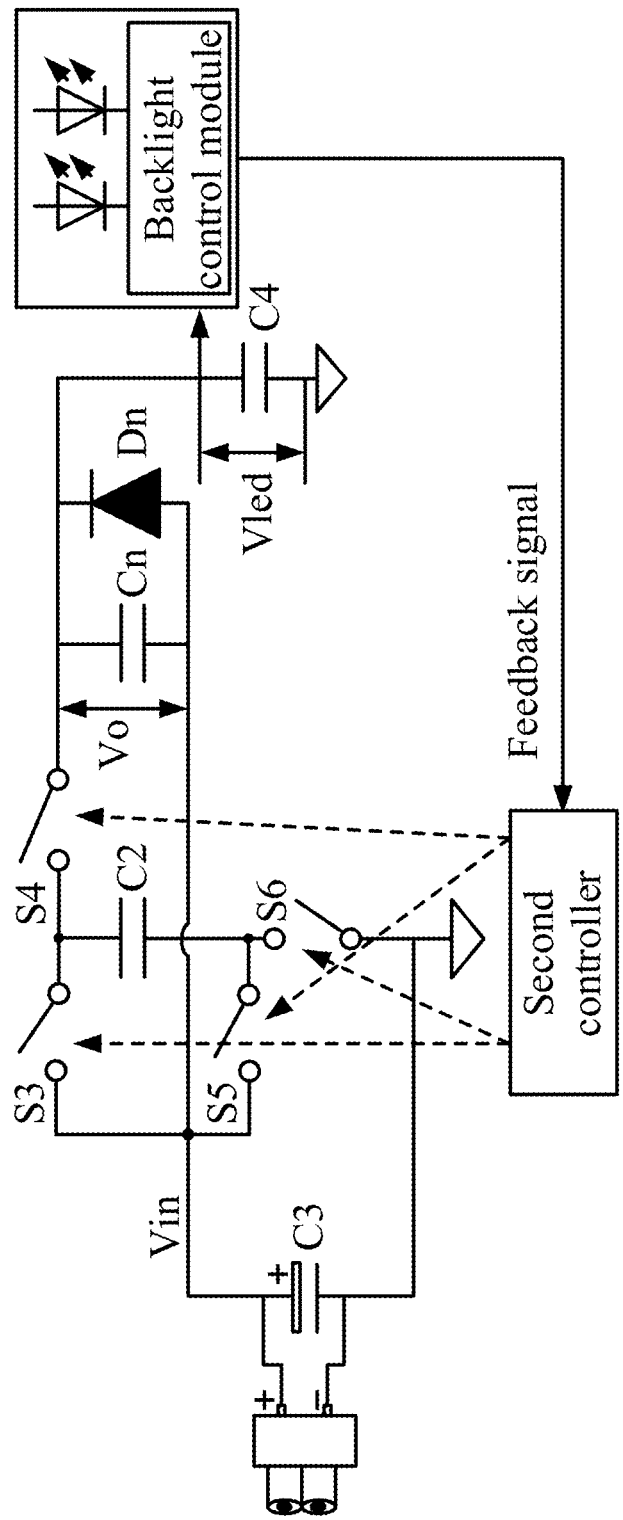
FIG. 40 is a schematic structural diagram of a filter module in a power supply circuit based on a charge pump module.
Figure 41:
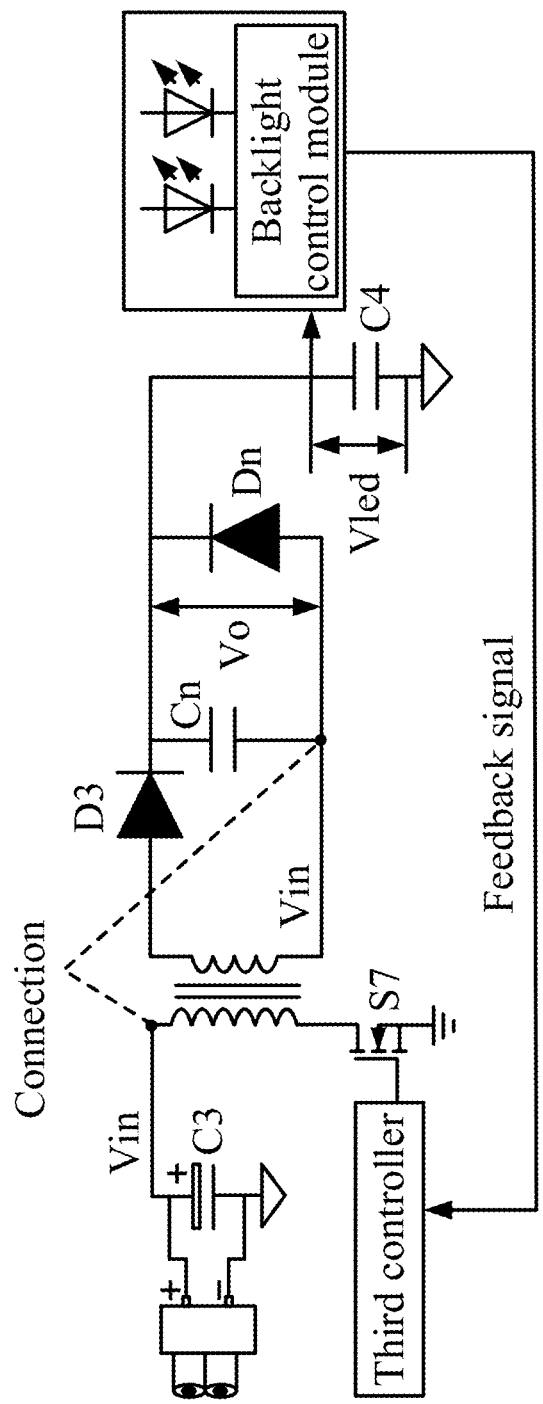
FIG. 41 is a schematic structural diagram of a filter module in a power supply circuit based on a flyback conversion module.

In some embodiments, FIG. 40 is a schematic structural diagram of a filter module in a power supply circuit based on a charge pump module provided in embodiments of the disclosure. FIG. 34 is taken as an example for the charge pump module, and the power supply principle will not be repeated here. In some embodiments, FIG. 41 is a schematic structural diagram of a filter module in a power supply circuit based on a flyback voltage conversion module provided in embodiments of the disclosure. The flyback voltage conversion module is shown in FIG. 37 as an example. By establishing a physical connection between the second end of the secondary winding and the first end of the primary winding, the DC input voltage Vin is applied to the second end of the secondary winding, and the power supply principle will not be repeated here.

Figure 42:
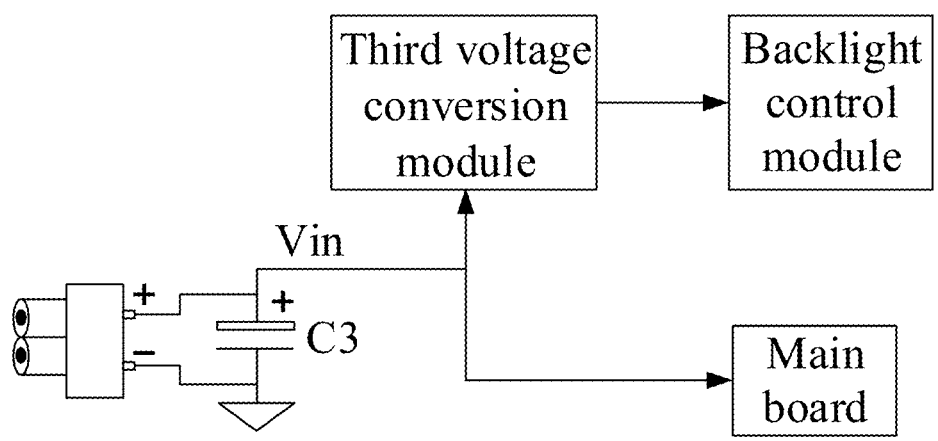
FIG. 42 is a third schematic diagram of a circuit for supplying power to a main board.

In some embodiments, the display apparatus provided in the embodiment further includes: a main board. The main board is connected with the power supply interface. The DC input voltage is used for supplying power to the main board. FIG. 42 is a schematic structural diagram of a circuit for supplying power to a main board provided by embodiments of the disclosure. When the DC input voltage is equal to the required voltage of the main board, the main board can be directly powered by the DC input voltage.

Figure 43:
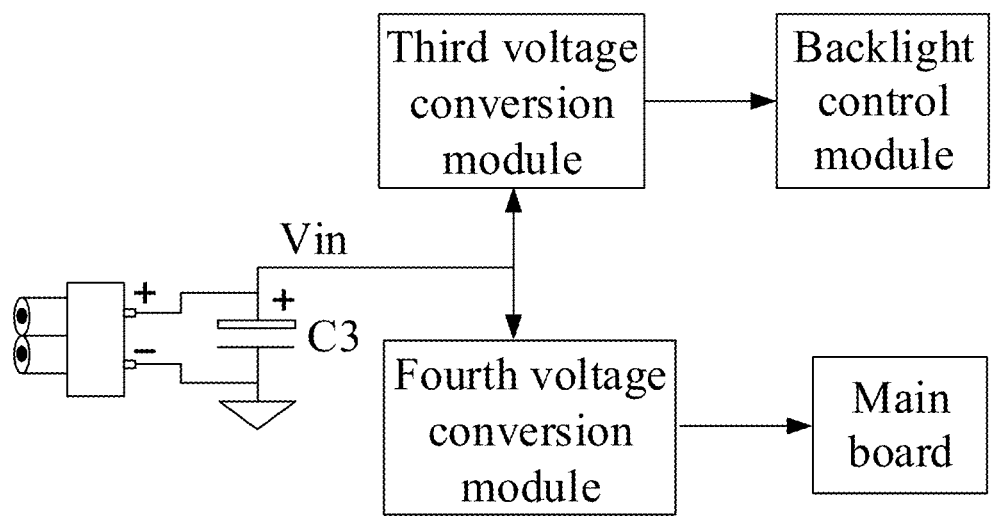
FIG. 43 is a fourth schematic diagram of a circuit for supplying power to a main board.

In some embodiments, the display apparatus provided in the embodiment further includes a fourth voltage conversion module. The fourth voltage conversion module is connected with the power supply interface and the main board, and is configured to output a tenth voltage according to the DC input voltage. The tenth voltage is the required voltage of the main board. FIG. 43 is another schematic structural diagram of a circuit for supplying power to the main board provided by the embodiment of the disclosure. When the DC input voltage does not equal to the required voltage of the main board, the fourth voltage conversion module may be configured to perform DC-DC voltage conversion on the DC input voltage. When the power of the TV is high, in order to reduce the loss on the cable, the voltage is often increased and the current is reduced, so the DC input voltage will be higher than the required voltage of the main board. In some embodiments, since the main board generally requires a fixed voltage, the fourth voltage conversion module may use a buck circuit for stepping down voltage, a boost-buck circuit for stepping up/down voltage, and the like.

Although the disclosure has been described in detail with reference to the aforementioned embodiments, those of ordinary skill in the art should understand that: it is still possible to modify the contents recorded in the aforementioned embodiments, or perform equivalent replacements for some or all of the technical features. However, these modifications or substitutions do not make the essence of the corresponding contents depart from the scope of the disclosure.

What is claimed is:

1. A display apparatus, comprising:
   a circuit board;
   a display panel configured for image display;
   an LED light strip configured to light up the display panel;
   a power supply circuit configured to supply power to a load on the circuit board and the LED light strip;
   the power supply circuit comprises:
   a first power supply branch configured to output a first voltage to the circuit board;
   a second power supply branch configured to output a second voltage to the LED light strip;

a power adjustment module, wherein a first end of the power adjustment module is connected with the first power supply branch and a second end of the power adjustment module is connected with the second power supply branch, and the power adjustment module is configured to control energy transfer between the first power supply branch and the second power supply branch, wherein the power adjustment module is further configured to:
based on that the second voltage is greater than a first preset threshold, control the energy to be transferred from the second power supply branch to the first power supply branch; or
based on that the second voltage is less than a second preset threshold, control the energy to be transferred from the first power supply branch to the second power supply branch.

2. The display apparatus according to claim 1, wherein the power adjustment module comprises:
a buck branch configured to step down a voltage at the second end and output the voltage via the first end; and
a boost branch configured to step up a voltage at the first end and output the voltage via the second end.

3. The display apparatus according to claim 2, wherein the power adjustment module further comprises:
a controller configured to control the buck branch or the boost branch to work according to the second voltage.

4. The display apparatus according to claim 3, wherein the power adjustment module further comprises:
a first switch, a second switch, a capacitor and an inductor, all forming the boost branch or the buck branch;
wherein a first end of the inductor is connected with the first power supply branch, a second end of the inductor is connected with a first end of the first switch and a first end of the second switch, and a second end of the first switch is connected with a first end of the capacitor and the second power supply branch, a second end of the second switch is grounded, a second end of the capacitor is grounded, and the controller is connected with a control end of the first switch and a control end of the second switch.

5. The display apparatus according to claim 3, wherein the power adjustment module further comprises:
a controller, a third switch, a fourth switch and a transformer, all forming the boost branch or the buck branch;
wherein a first end of a primary winding of the transformer is connected with the first power supply branch, a first end of the secondary winding of the transformer is connected with the second power supply branch, and a second end of the primary winding of the transformer is connected with a first end of the third switch, a second end of the secondary winding of the transformer is connected with a first end of the fourth switch, and a second end of the third switch and a second end of the fourth switch are grounded, the controller is connected with a control end of the third switch and a control end of the fourth switch.

6. The display apparatus according to claim 1, further comprising:
an output detection module, wherein a first end of the output detection module is connected with the power adjustment module, and a second end of the output detection module is connected with a voltage conversion module in the power supply circuit;
the output detection module is configured to obtain a power parameter output from the first end or the second end of the power adjustment module, and send a feedback signal to the voltage conversion module according to the power parameter.

7. The display apparatus according to claim 6, wherein the voltage conversion module is configured to adjust a first voltage output from the first power supply branch in response to the power parameter not meeting a preset condition.

8. The display apparatus according to claim 1, further comprising:
a backlight control module configured to control light emitting diodes to emit light, wherein the light emitting diodes are configured to light up the display panel of the display apparatus;
a power supply interface configured to receive a DC input voltage provided by an external adapter;
a first voltage conversion module configured to generate a fifth voltage according to the DC input voltage;
an energy storage element, connected with the first voltage conversion module and configured to store the fifth voltage, wherein the energy storage element and the first voltage conversion module alternately outputs the fifth voltage;
a negative electrode of the backlight control module is provided with the fifth voltage, wherein the fifth voltage serves as a negative reference voltage of the backlight control module; a positive electrode of the backlight control module is provided with the DC input voltage; a sum of an absolute value of the DC input voltage and an absolute value of the fifth voltage is equal to a required voltage of the backlight control module;
a feedback module configured to send a feedback signal generated by the backlight control module to the first voltage conversion module, wherein the feedback signal is configured to instruct the first voltage conversion module to adjust the fifth voltage to adjust the required voltage of the backlight control module.

9. The display apparatus according to claim 8, wherein the first voltage conversion module comprises: a charge pump module;
the charge pump module is configured to generate the fifth voltage in a charging state, and provide the fifth voltage to the negative electrode of the backlight control module in a discharging state;
a first end of the energy storage element is connected with a positive output end of the charge pump module and grounded; a second end of the energy storage element is connected with a negative output end of the charge pump module;
the energy element is configured to store the fifth voltage while the charge pump module being discharged, and provide the fifth voltage to the negative electrode of the backlight control module while the charge pump module being charged;
wherein the feedback signal is configured to instruct the charge pump module to adjust the fifth voltage to adjust the required voltage of the backlight control module.

10. The display apparatus according to claim 9, wherein the charge pump module comprises: a first controller, a first energy storage capacitor, a first switch, a second switch, a third switch, and a fourth switch;
a first end of the first switch is provided with the DC input voltage, a second end of the first switch is connected with a first end of the second switch; a second end of the second switch serves as a positive output end of the charge pump module, and is connected with the first end of the energy storage element and grounded;

a first end of the first energy storage capacitor is connected with the second end of the first switch and the first end of the second switch, and a second end of the first energy storage capacitor is connected with a first end of the third switch and a first end of the fourth switch; a second end of the fourth switch is grounded;

a second end of the third switch serves as a negative output end of the charge pump module, is connected with the second end of the energy storage element, and is configured to output the fifth voltage;

the first controller is connected with control ends of the first switch, the second switch, the third switch, and the fourth switch, and is configured to control switching frequencies of the first switch, the second switch, the third switch, and the fourth switch according to the feedback signal to adjust the fifth voltage;

wherein switching states of the first switch and the second switch are different, the first switch and the fourth switch are turned off or turned on simultaneously, and the second switch and the third switch are turned off or turned on simultaneously.

11. The display apparatus according to claim 9, wherein the feedback module comprises a level conversion circuit;

the level conversion circuit is configured to receive a first feedback signal output from the backlight control module, convert the first feedback signal into a second feedback signal, and output the second feedback signal to the first voltage conversion module;

wherein reference voltages of the first feedback signal and the second feedback signal are different.

12. The display apparatus according to claim 8, wherein the first voltage conversion module comprises: a flyback voltage conversion module;

the flyback voltage conversion module is configured to generate the fifth voltage via a secondary winding while a primary winding is conducting, and deliver the fifth voltage to the negative electrode of the backlight control module;

a first end of the energy storage element is connected with a positive output end of the flyback voltage conversion module and grounded; a second end of the energy storage element is connected with a negative output end of the flyback voltage conversion module; the energy storage element is configured to store the fifth voltage while the primary winding is conducting, and provide the negative electrode of the backlight control module with the fifth voltage while the primary winding is cut off;

wherein the feedback signal is configured to instruct the flyback voltage conversion module to adjust the fifth voltage to adjust the required voltage of the backlight control module.

13. The display apparatus according to claim 12, wherein the flyback voltage conversion module comprises: the primary winding, the secondary winding, a first diode, a second controller, and a fifth switch;

a first end of the primary winding is provided with the DC input voltage, a second end of the primary winding is connected with a first end of the fifth switch, and a second end of the fifth switch is grounded;

the secondary winding is coupled to the primary winding, and a first end of the secondary winding is connected with a positive electrode of the first diode; a negative electrode of the first diode serves as a positive output end of the flyback voltage conversion module and is connected with the first end of the energy storage element and grounded;

a second end of the secondary winding serves as a negative output end of the flyback voltage conversion module, is connected with the second end of the energy storage element, and is configured to output the fifth voltage;

the second controller is connected with a control end of the fifth switch, and is configured to adjust the fifth voltage by controlling a switching frequency of the fifth switch according to the feedback signal.

14. The display apparatus according to claim 8, further comprising: a second diode;

a positive electrode of the second diode is connected with the second end of the energy storage element, and a negative electrode of the second diode is connected with the first end of the energy storage element.

15. The display apparatus according to claim 8, further comprising: a main board;

the main board is connected with the power supply interface, and the DC input voltage is used for supplying power to the main board.

16. The display apparatus according to claim 15, further comprising a second voltage conversion module;

wherein the second voltage conversion module is connected with the power supply interface and the main board, and is configured to output a sixth voltage according to the DC input voltage; wherein the sixth voltage is a required voltage of the main board.

17. The display apparatus according to claim 1, further comprising:

a backlight control module configured to control the light emitting diodes to emit light, wherein the light emitting diodes are configured to light up the display panel of the display apparatus;

a power supply interface configured to receive a DC input voltage provided by an external adapter;

a third voltage conversion module configured to generate an additional voltage according to the DC input voltage, superimpose the additional voltage and the DC input voltage, and output a superimposed ninth voltage; wherein the ninth voltage is a required voltage of the backlight control module;

an energy storage element comprising a first end of connected with the third voltage conversion module and a second end provided with the DC input voltage, and configured for storing the superimposed voltage; wherein the third voltage conversion module and the energy storage element alternately output the ninth voltage;

a feedback module configured to send a feedback signal generated by the backlight control module to the third voltage conversion module, wherein the feedback signal is configured to instruct the third voltage conversion module to adjust the ninth voltage.

18. The display apparatus according to claim 17, wherein the third voltage conversion module comprises: a charge pump module;

the charge pump module is configured to: in a charging state, generate an additional voltage; and in a discharging state, superimpose the additional voltage and the DC input voltage, and output a superimposed ninth voltage to the backlight control module;

the first end of the energy storage element is connected with an output end of the charge pump module; the energy storage element is configured to store the superimposed voltage while the charge pump module being discharged, and superimpose the additional voltage and the DC input voltage while the charge pump module being charged, and output the superimposed ninth voltage to the backlight control module;

wherein the feedback signal is configured to instruct the charge pump module to adjust the ninth voltage by adjusting the additional voltage.

19. The display apparatus according to claim 17, wherein the third voltage conversion module comprises: a flyback voltage conversion module;

the flyback voltage conversion module is configured to superimpose the additional voltage generated by the secondary winding on the DC input voltage while the primary winding being cut off, and output the superimposed ninth voltage to the backlight control module;

the first end of the energy storage element is connected with an output end of the flyback voltage conversion module; the energy storage element is configured to store the additional voltage while the primary winding being cut off, and while the primary winding being conducting, superimpose the additional voltage and the DC input voltage and output the superimposed ninth voltage to the backlight control module;

wherein the feedback signal is configured to instruct the flyback voltage conversion module to adjust the ninth voltage by adjusting the additional voltage.

* * * * *